US011153735B2

(12) United States Patent
Zhang et al.

(10) Patent No.: US 11,153,735 B2
(45) Date of Patent: Oct. 19, 2021

(54) DATA TRANSMISSION METHOD AND APPARATUS

(71) Applicant: Huawei Technologies Co., Ltd., Shenzhen (CN)

(72) Inventors: Wei Zhang, Shenzhen (CN); Yue Ouyang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 16/491,955

(22) PCT Filed: Apr. 21, 2017

(86) PCT No.: PCT/CN2017/081507
§ 371 (c)(1),
(2) Date: Sep. 6, 2019

(87) PCT Pub. No.: WO2018/161414
PCT Pub. Date: Sep. 13, 2018

(65) Prior Publication Data
US 2020/0236523 A1    Jul. 23, 2020

(30) Foreign Application Priority Data
Mar. 7, 2017    (CN) .......................... 201710129934.9

(51) Int. Cl.
*H04W 4/80*    (2018.01)
*G07C 9/00*    (2020.01)
*H04W 68/00*    (2009.01)

(52) U.S. Cl.
CPC .......... *H04W 4/80* (2018.02); *G07C 9/00182* (2013.01); *H04W 68/005* (2013.01); *G07C 2009/00769* (2013.01)

(58) Field of Classification Search
None
See application file for complete search history.

(56) References Cited

U.S. PATENT DOCUMENTS

| 8,370,030 B1 | 2/2013 | Gurin |
| 2013/0300578 A1* | 11/2013 | Uchida ................... H04W 4/20 340/870.02 |

(Continued)

FOREIGN PATENT DOCUMENTS

| CN | 104353236 A | 2/2015 |
| CN | 204706096 U | 10/2015 |

(Continued)

OTHER PUBLICATIONS

Machine Translation and Abstract of Chinese Publication No. CN105205711, Dec. 30, 2015, 10 pages.

(Continued)

*Primary Examiner* — Jay L Vogel
(74) *Attorney, Agent, or Firm* — Conley Rose, P.C.

(57) ABSTRACT

A data transmission method includes receiving, by a first terminal, a first notification message, where the first notification message notifies the first terminal that a target bicycle is in an available state. The method further includes sending, by the first terminal, a mode setting instruction to a second terminal after receiving the first notification message, where the mode setting instruction instructs the second terminal to enter a riding model. The method further includes receiving, by the second terminal, the mode setting instruction from the first terminal, and entering the riding mode.

19 Claims, 43 Drawing Sheets

(56) References Cited

U.S. PATENT DOCUMENTS

| | | | |
|---|---|---|---|
| 2015/0074004 A1* | 3/2015 | Song | G07C 9/00896 705/307 |
| 2015/0143357 A1* | 5/2015 | Shin | G06F 8/65 717/170 |
| 2016/0001743 A1 | 1/2016 | Okada | |
| 2016/0029943 A1* | 2/2016 | Mizuochi | A61B 5/0022 702/141 |
| 2016/0039496 A1* | 2/2016 | Hancock | G01S 19/19 701/60 |
| 2016/0067547 A1* | 3/2016 | Anthony | G01P 15/0891 702/141 |
| 2017/0052537 A1 | 2/2017 | Salinas | |
| 2017/0064433 A1* | 3/2017 | Hirsch | H05K 999/99 |
| 2018/0018840 A1 | 1/2018 | Xia et al. | |
| 2018/0117414 A1* | 5/2018 | Miyasaka | G16H 40/67 |
| 2018/0327063 A1* | 11/2018 | Ikenoya | B63C 11/02 |
| 2019/0193678 A1* | 6/2019 | Leiber | G06Q 10/02 |
| 2019/0213814 A1* | 7/2019 | Han | G07C 9/00571 |

FOREIGN PATENT DOCUMENTS

| | | |
|---|---|---|
| CN | 105046827 A | 11/2015 |
| CN | 105205711 A | 12/2015 |
| CN | 204861547 U | 12/2015 |
| CN | 105282439 A | 1/2016 |
| CN | 105491234 A | 4/2016 |
| CN | 105704131 A | 6/2016 |
| CN | 205365825 U | 7/2016 |

OTHER PUBLICATIONS

Machine Translation and Abstract of Chinese Publication No. CN105491234, Apr. 13, 2016, 19 pages.
Machine Translation and Abstract of Chinese Publication No. CN105704131, Jun. 22, 2016, 23 pages.
Machine Translation and Abstract of Chinese Publication No. CN204706096, Oct. 14, 2015, 23 pages.
Machine Translation and Abstract of Chinese Publication No. CN204861547, Dec. 16, 2015, 10 pages.
Machine Translation and Abstract of Chinese Publication No. CN205365825, Jul. 6, 2016, 9 pages.
Foreign Communication From a Counterpart Application, Chinese Application No. 201780056574.2, Chinese Office Action dated Dec. 4, 2019, 10 pages.
Foreign Communication From a Counterpart Application, PCT Application No. PCT/CN2017/081507, English Translation of International Search Report dated Dec. 1, 2017, 3 pages.
Foreign Communication From a Counterpart Application, PCT Application No. PCT/CN2017/081507, English Translation of Written Opinion dated Dec. 1, 2017, 5 pages.

* cited by examiner

DATA TRANSMISSION METHOD AND APPARATUS

CROSS-REFERENCE TO RELATED APPLICATIONS

This application is a U.S. national stage application of International Patent Application No. PCT/CN2017/081507 filed on Apr. 21, 2017, which claims priority to Chinese Patent Application No. 201710129934.9 filed on Mar. 7, 2017. Both of the aforementioned applications are hereby incorporated by reference in their entireties.

TECHNICAL FIELD

This application relates to the field of communications technologies, and in particular, to a data transmission method and an apparatus.

BACKGROUND

Nowadays, a growing number of people travel by using shared bicycles. As shown in FIG. 1a and FIG. 1b, a process of using a shared bicycle usually includes the following: A user takes out a mobile phone and launches a shared bicycle application (application, APP) on the mobile phone; the user scans a two-dimensional code on the shared bicycle or enters a serial number of the shared bicycle, so as to unlock the shared bicycle; and then the user can use the unlocked shared bicycle.

In addition, a wearable device can obtain physiological data of the user in different motion states. For example, the wearable device such as a smartwatch or a smart band can measure the physiological data of the user, such as a pulse rate and a heart rate. However, due to an algorithm limitation, it is difficult for the wearable device to determine whether the user is riding. Therefore, to record heart rate data of the user during shared bicycle riding, after the user unlocks the shared bicycle, as shown in FIG. 1c, the user needs to manually set the wearable device to a riding mode. As shown in FIG. 1d, after the user ends riding, the user further needs to set the wearable device to exit the riding mode. It can be learned that, in a process of using the wearable device to record the heart rate during riding, the user needs to perform a plurality of operations. This causes inconvenience to the user.

SUMMARY

Embodiments of this application provide a data transmission method and an apparatus to resolve a prior-art problem of complex operations caused because a wearable device needs to be set by a user before entering a riding mode. The data transmission method and the apparatus in the embodiments of this application may be applied to various shared vehicles, such as a shared bicycle.

According to a first aspect, an embodiment of this application provides a data transmission method, where the method is applied to a first terminal, and includes: receiving, by the first terminal, a first notification message used to notify the first terminal that a target bicycle is in an available state; and sending a mode setting instruction to a second terminal according to the first notification message, where the mode setting instruction is used to instruct the second terminal to enter a riding mode.

The first terminal is a device such as a mobile phone, a tablet computer, a notebook computer, an ultra-mobile personal computer (ultra-mobile personal computer, UMPC), a netbook, a personal digital assistant (personal digital assistant, PDA), or the like. The second terminal is a wearable device that can collect physiological data (for example, a heart rate, blood pressure, and blood glucose) of a user, such as a smartwatch or a smart band. The available state is used to indicate that the bicycle is available. Therefore, the first notification message may be sent shortly after the bicycle is unlocked, or may be sent at any moment after the bicycle is unlocked. For example, the terminal receives the first notification message in a user riding process.

It can be learned that, in the data transmission method provided in this embodiment of this application, after the first terminal determines that the bicycle is in the available state, the user does not need to manually set the second terminal to enable the second terminal to enter the riding mode, and the first terminal may send the mode setting instruction to the second terminal. In this way, the second terminal automatically enters the riding mode according to the mode setting instruction. In the method provided in this embodiment of this application, the first terminal can trigger the second terminal to automatically enter the riding mode without needing the user to perform any operation, thereby reducing user operations.

In an implementation, before the receiving, by the first terminal, a first notification message, the method provided in this embodiment of this application further includes: automatically obtaining, by the first terminal, an identity of the target bicycle; sending an unlocking request to a server corresponding to the target bicycle, where the unlocking request carries the identity of the target bicycle and an identity of the first terminal. Then, the first terminal receives the first notification message sent by the server corresponding to the target bicycle, where the first notification message is used to notify the first terminal that the target bicycle is in the available state, and the available state is an unlocked state.

Optionally, if an application corresponding to the target bicycle is installed on the first terminal, that is, the first terminal serves as a client, this embodiment of this application provides a method for automatically unlocking a bicycle. In addition, after the bicycle is automatically unlocked, the first terminal is notified that the bicycle is in an available state. The method includes: automatically obtaining, by the first terminal, the identity of the target bicycle; determining, based on the identity of the target bicycle, an identity of the application corresponding to the target bicycle; launching, according to the identity of the application, the application corresponding to the target bicycle; in this way, after launching the application corresponding to the target bicycle, sending, by the first terminal serving as a client, the unlocking request to the server corresponding to the target bicycle; and then, receiving, by the first terminal, the first notification message sent by the server corresponding to the target bicycle, where the first notification message is used to notify the first terminal that the target bicycle is in the unlocked state.

The first terminal may automatically obtain the identity of the target bicycle in the following two implementations:

1. When a near field communication (near field communication, NFC) module is separately installed on both the first terminal and the target bicycle, and a distance between the first terminal and the target bicycle is less than a distance within which NFC communication can be performed and that is specified in an NFC protocol, the first terminal performs NFC communication with the target bicycle to automatically obtain the identity of the target bicycle.

2. When an NFC module is separately installed on both the second terminal and the target bicycle, the target bicycle can read an identity of the second terminal. Because currently the bicycle usually has a weak processing capability, the bicycle sends the identity of the second terminal to the server corresponding to the bicycle. The server corresponding to the bicycle pre-stores an association relationship among an account registered by a user, the identity of the second terminal, and the identity of the first terminal connected to the second terminal. Therefore, the server corresponding to the bicycle checks whether the identity of the second terminal is stored. If the identity of the second terminal is stored, it indicates that the identity of the second terminal is valid, the identity, of the first terminal, associated with the identity of the second terminal is further determined, and the identity of the target bicycle is sent to the first terminal. In this way, the first terminal obtains the identity of the target bicycle from the server corresponding to the bicycle.

It can be learned that, in this implementation, the first terminal can automatically obtain the identity of the target bicycle. In the entire process, different from operation steps in the prior art, the user does not need to launch an APP, select a two-dimensional code scanning function of the APP, and scan a two-dimensional code of the bicycle or manually enter a bicycle number, thereby further reduce user operations.

In a possible implementation, if an application corresponding to the target bicycle is not installed on the first terminal, but the first terminal pre-stores information about an interface used to communicate with servers corresponding to a plurality types of bicycles, and the like, this embodiment of this application further provides a method for automatically unlocking a bicycle, and the method includes: automatically obtaining, by the first terminal, the identity of the target bicycle; determining, by the first terminal based on the identity of the target bicycle, a target service interface used to communicate with the server corresponding to the target bicycle; sending, by the first terminal, the unlocking request to the server corresponding to the target bicycle through the target service interface, where the unlocking request carries the identity of the target bicycle and the identity of the first terminal; and receiving, by the first terminal, the first notification message sent by the server corresponding to the target bicycle through the target service interface, where the first notification message is used to notify the first terminal that the target bicycle is in the unlocked state.

For specific implementation of automatically obtaining the identity of the target bicycle by the first terminal, refer to the foregoing two methods, and details are not described herein again.

It can be learned that, in this implementation, the first terminal can automatically obtain the identity of the target bicycle, and the bicycle can be unlocked based on a predefined interface while the application of the target bicycle does not need to be installed on the first terminal.

In an implementation, when the user ends riding, the method provided in this embodiment of this application further includes: receiving, by the first terminal, a second notification message, where the second notification message is used to notify the first terminal that the target bicycle is in a non-riding state; and sending, by the first terminal, a third notification message to the second terminal according to the second notification message, where the third notification message is used to notify the second terminal that the riding ends. In this way, after receiving the notification message, the second terminal can automatically exit the riding mode without needing the user to perform any manual operation.

The non-riding state may be a state in which the bicycle is locked, and the third notification message may be sent to the first terminal when the APP of the bicycle ends charging after the user ends the riding, and the first terminal is triggered to notify the second terminal that the riding ends. Alternatively, in a user riding process, when the user does not want to record data such as a heart rate, the user may operate to notify the first terminal that the bicycle is in the non-riding state, and then the first terminal is triggered to notify the second terminal that the riding ends.

According to a second aspect, an embodiment of this application provides a data transmission method, where the method is applied to a second terminal, and the method includes: receiving, by the second terminal, a mode setting instruction sent by a first terminal, where the mode setting instruction is used to instruct the second terminal to enter a riding mode; and entering, by the second terminal, the riding mode according to the mode setting instruction.

In a possible design, after the entering, by the second terminal, the riding mode according to the mode setting instruction, the method further includes: loading, by the second terminal, a display interface in the riding mode, where the display interface is used at least to display user data obtained by the second terminal.

In a possible design, after the entering, by the second terminal, the riding mode according to the mode setting instruction, the method further includes: receiving, by the second terminal, a notification message sent by the first terminal, where the notification message is used to notify the second terminal that riding ends; and exiting, by the second terminal, the riding mode according to the notification message.

According to a third aspect, an embodiment of this application provides a data transmission method applied to a system that includes a terminal and a target bicycle, where the method includes: receiving, by the terminal, a first notification message, where the first notification message is used to notify the terminal that the target bicycle is in an available state; and entering, by the terminal, a riding mode after receiving the first notification message.

The terminal can not only unlock the bicycle, but also obtain physiological data of the user such as a heart rate. For example, the terminal may be a smartwatch, a smart band, or the like on which an application corresponding to the bicycle is installed. For specific implementation of unlocking the target bicycle by the terminal, refer to the foregoing specific implementation of unlocking the target bicycle by the first terminal, and details are not described herein again.

In the data transmission method provided in this embodiment of this application, after receiving the notification message indicating that the bicycle is in the available state, the terminal can enter the riding mode without needing manual setting of the user.

In an implementation, the terminal loads a display interface in the riding mode after entering the riding mode, where the display interface is used at least to display user data obtained by a second terminal.

In an implementation, after riding ends, the method further includes: receiving, by the terminal, a second notification message, where the second notification message is used to notify the terminal that the target bicycle is in a non-riding state; and exiting, by the terminal, the riding mode according to the second notification message.

According to a fourth aspect, a terminal is provided, and as a first terminal, the terminal includes: a receiving unit, configured to receive a first notification message, where the first notification message is used to notify the first terminal that a target bicycle is in an available state; and a sending unit, configured to: send a mode setting instruction to a second terminal according to the first notification message received by the receiving unit, where the mode setting instruction is used to instruct the second terminal to enter a riding mode.

In a possible design, as the first terminal, the terminal further includes: an obtaining unit, configured to automatically obtain an identity of the target bicycle; where the sending unit is further configured to send an unlocking request to a server corresponding to the target bicycle, where the unlocking request carries an identity of the first terminal and the identity of the target bicycle obtained by the obtaining unit; and the receiving unit is further configured to receive the first notification message sent by the server corresponding to the target bicycle, where the first notification message is used to notify the first terminal that the target bicycle is in the available state, and the available state is an unlocked state.

In a possible design, as the first terminal, the terminal further includes: a launching unit, configured to: determine, based on the identity of the target bicycle obtained by the obtaining unit, an identity of an application corresponding to the target bicycle; and automatically launch, according to the identity of the application, the application corresponding to the target bicycle.

In a possible design, the sending unit is specifically configured to: determine, based on the identity of the target bicycle, a target service interface used to communicate with the server corresponding to the target bicycle; and send the unlocking request to the server corresponding to the target bicycle through the target service interface. The receiving unit is specifically configured to receive the first notification message sent by the server corresponding to the target bicycle through the target service interface.

In a possible design, the obtaining unit is specifically configured to: when a distance between the first terminal and the target bicycle is less than or equal to a preset distance, perform near field communication NFC with the target bicycle to automatically obtain the identity of the target bicycle, where the preset distance is a distance within which NFC communication can be performed and that is specified in an NFC protocol.

In a possible design, the receiving unit is further configured to receive a second notification message, where the second notification message is used to notify the first terminal that the target bicycle is in a non-riding state; and the sending unit is further configured to send a third notification message to the second terminal according to the second notification message received by the receiving unit, where the third notification message is used to notify the second terminal that riding ends.

According to a fifth aspect, a terminal is provided, where as a second terminal, the terminal includes: a receiving unit, configured to receive a mode setting instruction sent by the first terminal, where the mode setting instruction is used to instruct the second terminal to enter a riding mode; and a mode setting unit, configured to enter the riding mode according to mode setting instruction received by the receiving unit.

In a possible design, as the second terminal, the terminal further includes: a display unit, configured to load a display interface in the riding mode after the mode setting unit sets the second terminal to the riding mode, where the display interface is used at least to display user data obtained by the second terminal.

In a possible design, the receiving unit is further configured to receive a notification message sent by the first terminal, where the notification message is used to notify the second terminal that riding ends; and the mode setting unit is further configured to exit the riding mode according to the notification message received by the receiving unit.

According to a sixth aspect, a terminal is provided and includes: a receiving unit, configured to receive a first notification message, where the first notification message is used to notify the terminal that a target bicycle is in an available state and a mode setting unit, configured to enter a riding mode after the receiving unit receives the first notification message.

In a possible design, as a second terminal, the terminal further includes: a display unit, configured to load a display interface in the riding mode after the mode setting unit sets the second terminal to the riding mode, where the display interface is used at least to display user data obtained by the second terminal.

In a possible design, the receiving unit is further configured to receive a second notification message, where the second notification message is used to notify the terminal that riding ends; and the mode setting unit is further configured to exit the riding mode according to the second notification message received by the receiving unit.

According to a seventh aspect, a terminal is provided, where as a first terminal, the terminal includes a transceiver, a memory, and a processor, the memory is configured to store computer executable code; and the transceiver is configured to: receive a first notification message, where the first notification message is used to notify the first terminal that a target bicycle is in an available state; and send a mode setting instruction to a second terminal after receiving the first notification message, where the mode setting instruction is used to instruct the second terminal to enter a riding mode.

In a possible design, the processor is configured to automatically obtain an identity of the target bicycle; the transceiver is further configured to send an unlocking request to a server corresponding to the target bicycle, where the unlocking request carries the identity of the target bicycle and an identity of the first terminal; and the transceiver is further configured to receive the first notification message sent by the server corresponding to the target bicycle, where the first notification message is used to notify the first terminal that the target bicycle is in the available state, and the available state is an unlocked state.

In a possible design, the processor is further configured to: determine, based on the identity of the target bicycle, an identity of an application corresponding to the target bicycle; and automatically launch, according to the identity of the application, the application corresponding to the target bicycle.

In a possible design, the processor is further configured to: determine, based on the identity of the target bicycle, a target service interface used to communicate with the server corresponding to the target bicycle; the transceiver is further configured to send the unlocking request to the server corresponding to the target bicycle through the target service interface; and the transceiver is further configured to receive, through the target service interface, the first notification message sent by the server corresponding to the target bicycle.

In a possible design, the processor is further configured to: when a distance between the first terminal and the target bicycle is less than or equal to a preset distance, perform near field communication NFC with the target bicycle to automatically obtain the identity of the target bicycle, where the preset distance is a distance within which NFC communication can be performed and that is specified in an NFC protocol.

In a possible design, the transceiver is further configured to receive a second notification message, where the second notification message is used to notify the first terminal that the target bicycle is in a non-riding state; and the transceiver is further configured to send a third notification message to the second terminal according to the second notification message, where the third notification message is used to notify the second terminal that riding ends.

According to an eighth aspect, a terminal is provided, where as a second terminal, the terminal includes a transceiver, a memory, and a processor, the memory is configured to store computer executable code; the transceiver is configured to receive a mode setting instruction sent by a first terminal, where the mode setting instruction is used to instruct the second terminal to enter a riding mode; and the processor is configured to enter the riding mode according to the mode setting instruction.

In a possible design, as the second terminal, the terminal further includes a display, configured to load a display interface in the riding mode, where the display interface is used at least to display user data obtained by the second terminal.

In a possible design, the transceiver is further configured to receive a notification message sent by the first terminal, where the notification message is used to notify the second terminal that riding ends; and the processor is further configured to exit the riding mode according to the notification message.

According to a ninth aspect, a terminal is provided, where the terminal includes a transceiver, a memory, and a processor, the memory is configured to store computer executable code; the transceiver is configured to receive a first notification message, where the first notification message is used to notify the terminal that a target bicycle is in an available state; and the processor is configured to enter a riding mode after receiving the first notification message.

In a possible design, the terminal further includes a display, configured to load a display interface in the riding mode, where the display interface is used at least to display user data obtained by the second terminal.

In a possible design, the transceiver is further configured to receive a second notification message, where the second notification message is used to notify the terminal that riding ends; and the processor is further configured to exit the riding mode after the second notification message is received.

According to a tenth aspect, a data transmission system is provided, where the system includes the first terminal described in the seventh aspect and the second terminal described in the eighth aspect.

According to an eleventh aspect, a computer readable storage medium is provided, where the computer readable storage medium stores an instruction. When the instruction is executed on a computer, the computer is enabled to perform the method in the first aspect and the possible designs of the first aspect.

According to a twelfth aspect, a computer program product including an instruction is provided. When the instruction is executed on a computer, the computer is enabled to perform the method in the first aspect and the possible designs of the first aspect.

According to a thirteenth aspect, a computer readable storage medium is provided, where the computer readable storage medium stores an instruction. When the instruction is executed on a computer, the computer is enabled to perform the method in the second aspect and the possible designs of the second aspect.

According to a fourteenth aspect, a computer program product including an instruction is provided. When the instruction is executed on a computer, the computer is enabled to perform the method in the second aspect and the possible designs of the second aspect.

According to a fifteenth aspect, a computer readable storage medium is provided, where the computer readable storage medium stores an instruction. When the instruction is executed on a computer, the computer is enabled to perform the method in the third aspect and the possible designs of the third aspect.

According to a sixteenth aspect, a computer program product including an instruction is provided. When the instruction is executed on a computer, the computer is enabled to perform the method in the third aspect and the possible designs of the third aspect.

According to a seventeenth aspect, a bicycle unlocking method is provided. The method is applied to a system that includes a first terminal and a bicycle, and an NFC module is separately installed in the first terminal and the bicycle. The method includes: performing, by the first terminal by using the NFC module, NFC communication with the bicycle to obtain an identity of the bicycle; sending, by the first terminal, an unlocking request to a server corresponding to the bicycle, where the unlocking request carries the identity of the bicycle; and receiving, by the first terminal, a first notification message sent by the server corresponding to the bicycle, where the first notification message is used to notify the first terminal that the bicycle is unlocked.

After receiving the unlocking request sent by the first terminal, the server corresponding to the bicycle sends an unlocking instruction to the bicycle, and when the bicycle replies with a notification that the bicycle is unlocked, the server corresponding to the bicycle sends the first notification message to the first terminal.

In a possible design, before the sending, by the first terminal, an unlocking request to a server corresponding to the bicycle, the method further includes: determining, by the first terminal based on the identity of the bicycle, an identity of an application corresponding to the bicycle; and launching the application. After launching the application, the first terminal, serving as a client, sends the unlocking request to the server corresponding to the bicycle by using the application.

In a possible design, before the sending, by the first terminal, an unlocking request to a server corresponding to the bicycle, the method further includes: determining, by the first terminal based on the identity of the bicycle, a target service interface used to communicate with the server corresponding to the bicycle; sending, by the first terminal, the unlocking request to the server corresponding to the bicycle through the target service interface; and receiving, through the target service interface, the first notification message replied by the server corresponding to the bicycle.

In the method, when the first terminal approaches the bicycle, the bicycle is automatically unlocked by using an NFC technology, a user does not need to launch the APP of the bicycle, scan a two-dimensional code of the bicycle or enter a bicycle number or the like, so that user operations are reduced, and the bicycle can be unlocked quickly and conveniently.

In a possible design, after receiving the first notification message sent by the server of the bicycle, the first terminal sends a mode setting instruction to a second terminal, where the mode setting instruction is used to instruct the second terminal to enter a riding mode.

Correspondingly, in a possible design, the first terminal receives a second notification message sent by the server of the bicycle, where the second notification message is used to notify the first terminal that riding ends, and then the first terminal sends a third notification message to the second terminal, where the third notification message is used to instruct the second terminal to exit the riding mode.

According to an eighteenth aspect, a terminal is provided. As a first terminal, the terminal includes: an obtaining unit, configured to perform NFC communication with a bicycle to obtain an identity of the bicycle; a sending unit, configured to send an unlocking request to a server corresponding to the bicycle, where the unlocking request carries the identity of the bicycle obtained by the obtaining unit; and a receiving unit, configured to receive a first notification message sent by the server corresponding to the bicycle, where the first notification message is used to notify the terminal that the bicycle is unlocked.

In a possible design, the terminal further includes a launching unit, configured to: determine, based on the identity of the bicycle obtained by the obtaining unit, an identity of an application corresponding to the bicycle; and launch the application.

In a possible design, the sending unit is further configured to: determine, based on the identity of the bicycle obtained by the obtaining unit, a target service interface used to communicate with the server corresponding to the bicycle; and send the unlocking request to the server corresponding to the bicycle through the target service interface. The receiving unit is further configured to receive, through the target service interface, the first notification message replied by the server corresponding to the bicycle, where the first notification message is used to notify the terminal that the bicycle is unlocked.

In a possible design, the sending unit is further configured to send a mode setting instruction to a second terminal, so that the second terminal enters a riding mode according to the mode setting instruction. The receiving unit is further configured to receive a second notification message sent by the server of the bicycle, where the second notification message is used to notify the first terminal that riding ends. The sending unit is further configured to send a third notification message to the second terminal, where the third notification message is used to instruct the second terminal to exit the riding mode.

According to a nineteenth aspect, a terminal is provided, and the terminal includes: a transceiver, a processor, and a memory, where the memory is configured to store computer executable code; and the transceiver is configured to: perform NFC communication with a bicycle to obtain an identity of the bicycle; send an unlocking request to a server corresponding to the bicycle, where the unlocking request carries the identity of the bicycle; and receive a first notification message sent by the server corresponding to the bicycle, where the first notification message is used to notify the terminal that the bicycle is unlocked.

In a possible design, the processor is configured to: determine, based on the identity of the bicycle, an identity of an application corresponding to the bicycle; and launch the application.

In a possible design, the processor is further configured to determine, based on the identity of the bicycle, a target service interface used to communicate with the server corresponding to the bicycle. The transceiver is configured to: send the unlocking request to the server corresponding to the bicycle through the target service interface; and receive, through the target service interface, the first notification message replied by the server corresponding to the bicycle.

In a possible design, the transceiver is further configured to: send a mode setting instruction to a second terminal, so that the second terminal enters a ridimg mode according to the mode setting instruction; receive a second notification message sent by the server of the bicycle, where the second notification message is used to notify the first terminal that riding ends; and send a third notification message to the second terminal, where the third notification message is used to instruct the second terminal to exit the riding mode.

According to a twentieth aspect, a computer readable storage medium is provided, where the computer readable storage medium stores an instruction. When the instruction is executed on a computer, the computer is enabled to perform the method in the seventeenth aspect and the possible designs of the seventeenth aspect.

According to a twenty-first aspect, a computer program product including an instruction is provided. When the instruction is executed on a computer, the computer is enabled to perform the method in the seventeenth aspect and the possible designs of the seventeenth aspect.

BRIEF DESCRIPTION OF DRAWINGS

FIG. 5a-1 and FIG. 5a-2 is a schematic flowchart of another data transmission method according to an embodiment of this application;

DESCRIPTION OF EMBODIMENTS

In embodiments of this application, the term "a plurality of" refers to two or more. The terms "first", "second", and the like in the embodiments of this application are merely intended to distinguish between different objects, and impose no limitation on their sequence. For example, a first notification message and a second notification message are only used to distinguish between notification messages sent at different moments for notification of different events, and impose no limitation on their sequence. The term "and/or" in the embodiments of this application describes only an association relationship for describing associated objects and represents that three relationships may exist. For example, A and/or B may represent the following three cases: Only A exists, both A and B exist, and only B exists. In addition, the character "/" in the embodiments of this application generally indicates an "or" relationship between the associated objects.

An embodiment of this application provides a data transmission system, configured to collect user data in a user riding process, where the user data may be physiological data such as a heart rate, blood pressure, and blood glucose.

Figure 2:
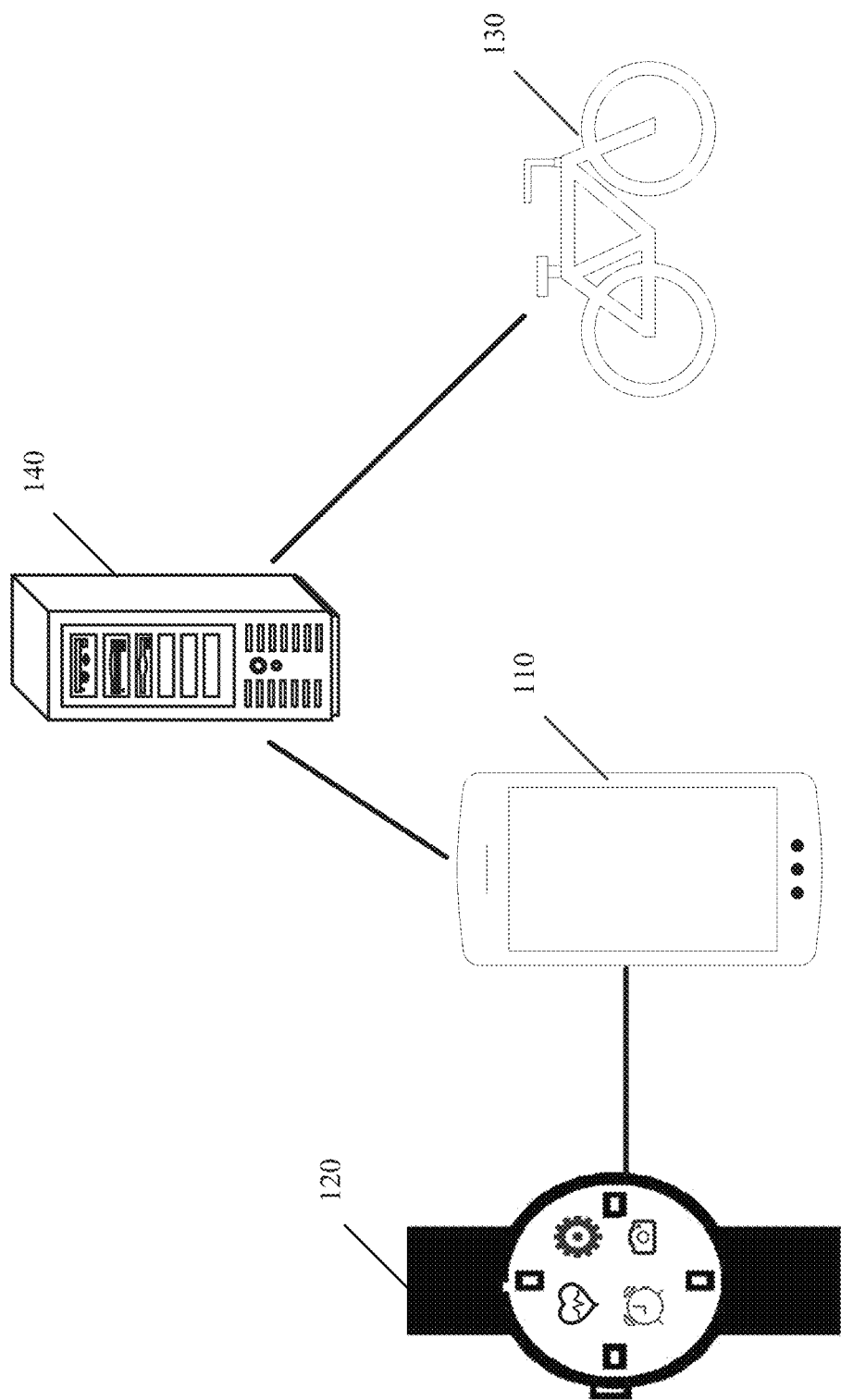
FIG. 2 is a schematic architecture diagram of a data transmission system according to an embodiment of this application.

As shown in FIG. 2, the system includes: a first terminal 110, a second terminal 120, a bicycle 130, and a bicycle server 140. The first terminal 110 may be a device such as a mobile phone, a tablet computer, a notebook computer, an ultra-mobile personal computer, a netbook, or a personal digital assistant. The second terminal 120 may be a wearable device that can collect physiological data (for example, a heart rate, blood pressure, and blood glucose) of a user, such as a smartwatch or a smart band. It can be understood that, in this embodiment of this application, the bicycle 130 may alternatively be another shared vehicle. For example, the bicycle 130 may alternatively be a shared bus, and the bicycle server 140 may alternatively be a shared bus server.

A communication connection may be established between the first terminal 110 and the second terminal 120, between the first terminal 110 and the bicycle 130, between the first terminal 110 and the bicycle server 140, between the second terminal 120 and the bicycle 130, and between the bicycle server 140 and the bicycle 130 for communication between each other. Specifically, in some embodiments of this application, the first terminal 110 is configured to send an unlocking request to the bicycle server 140 after obtaining a bicycle identity (Identity, ID), where the unlocking request includes identities of the first terminal 110 and the bicycle 130, and is used to request to unlock the bicycle 130. After receiving the unlocking request from the first terminal 110, the bicycle server 140 sends an unlocking instruction to the bicycle 130 to instruct to unlock the bicycle 130, and notifies the first terminal 110 that the bicycle 130 is unlocked. After the bicycle 130 is unlocked, the first terminal 110 automatically sends an instruction to the second terminal 120, so that the second terminal 120 automatically enters a riding mode and records physiological data such as a heart rate of the user in the riding mode, and the second terminal 120 may further record data of the user such as a riding speed, a motion track, and duration. The user can view the second terminal to learn of a current physical state, adjust a riding speed, and the like in a timely manner.

A manner of the communication connection in this embodiment of this application may be NFC, Bluetooth (Bluetooth, BT), 2G, 3G, 4G 5G wireless fidelity (wireless fidelity, Wi-Fi), or the like.

Figure 3A:
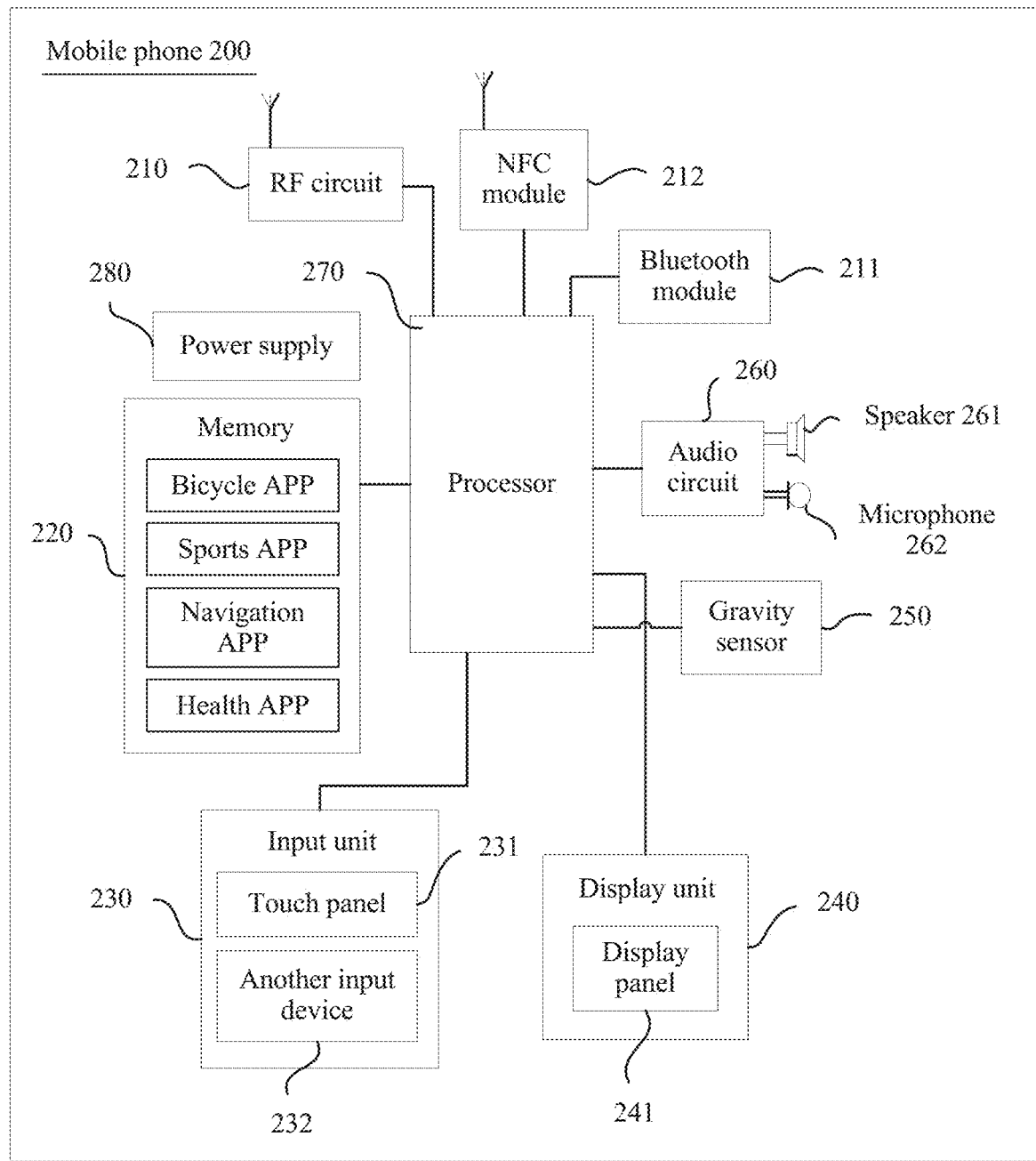
FIG. 3a, FIG. 3b, and FIG. 3c are sequentially schematic structural diagrams of a mobile phone, a smartwatch, and a bicycle according to an embodiment of this application.

With reference to the system architecture shown in FIG. 2, for example, the first terminal is a mobile phone. As shown in FIG. 3a, a mobile phone 200 includes components such as a radio frequency (radio frequency, RF) circuit 210, a Bluetooth module 211, an NFC module 212, a memory 220, an input unit 230, a display unit 240, a gravity sensor 250, an audio circuit 260, a processor 270, and a power supply 280. A person skilled in the art may understand that a structure of the mobile phone shown in FIG. 3a does not constitute a limitation on the mobile phone, and may include more or fewer components than those shown in the figure, or may combine some components, or have different component arrangements.

The following describes each function component of the mobile phone 200.

The RF circuit 210 may be configured to receive and send information, or receive and send a signal in a call process. In particular, after receiving downlink information from a base station, the RF circuit 210 sends the downlink information to the processor 270 for processing. In addition, the RF circuit 210 sends uplink data to the base station. The RF circuit 210 usually includes but is not limited to an antenna, at least one amplifier, a transceiver, a coupler, a low noise amplifier (low noise amplifier, LNA), a duplexer, and the like. In addition, the RF circuit 210 may further communicate with a network and another device through wireless communication. The wireless communication may use any communications standard or protocol, including but not limited to global system for mobile communications (global system for mobile communications, GSM), general packet radio service (general packet radio service, GPRS), code division multiple access (code division multiple access, CDMA), wideband code division multiple access (wideband code division multiple access, WCDMA), long term evolution (long term evolution, LTE), an email, a short message service (short message service. SMS), and the like.

The Bluetooth module 211 may be used by the mobile phone to establish, within a specific distance (within a distance specified in a Bluetooth protocol), a Bluetooth connection to and communicate with another device that supports a Bluetooth function.

The NFC module 212 may be used by the mobile phone to establish an NFC connection to and communicate with another device that supports NFC communication.

Optionally, the mobile phone may further include a module, and the mobile phone may establish a Wi-Fi connection by using the Wi-Fi module and transmit data.

The memory 220 may be configured to store a software program and a module, and the processor 270 performs various function applications of the mobile phone 200 and processes data by running the software program and the module that are stored in the memory 220. The memory 220 may mainly include a program storage area and a data storage area. The program storage area may store an operating system, and an application required by at least one function, such as an audio play function or an image play function. The data storage area may store data (such as audio data, image data, or an address book) created based on use of the mobile phone 200, and the like. In addition, the memory 220 may include a high-speed random access memory, and may further include a non-volatile memory, such as at least one magnetic disk storage device, a flash memory device, or another volatile solid-state storage device.

The input unit 230 may be configured to: receive entered digital or character information, and generate key signal input related to a user setting and function control of the mobile phone 200. Specifically, the input unit 230 may include a touchscreen 231 and another input device 232. The touchscreen 231, also referred to as a touch panel, may collect a touch operation (for example, an operation performed by a user on or near the touchscreen 231 by using any proper object or accessory such as a finger or a stylus) performed by the user on or near the touchscreen 231, and drive a corresponding connection apparatus by using a preset program. Optionally, the touchscreen 231 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into touch coordinates, and sends the touch coordinates to the processor 270. In addition, the touch controller can receive and execute a command sent by the processor 270. In addition, the touchscreen 231 may be implemented in a plurality of types, such as a resistive type, a capacitive type, an infrared type, and a surface acoustic wave type. In addition to the touchscreen 231, the input unit 230 may further include the another input device 232. Specifically, the another input device 232 may include but is not limited to one or more of a physical keyboard, a function key (such as a volume control key or an on/off key), a trackball, a mouse, or a joystick.

The display unit 240 may be configured to display information entered by the user or information provided for the user, and various menus of the mobile phone 200. The display unit 240 may include a display panel 241. Optionally, the display panel 241 may be configured in a form of a liquid crystal display (liquid crystal display, LCD), an organic light-emitting diode (organic light-emitting diode, OLED), or the like. Further, the touchscreen 231 may cover the display panel 241. After detecting a touch operation performed on or near the touchscreen 231, the touchscreen 231 sends the touch operation to the processor 270 to determine a type of a touch event, and then the processor 270 provides corresponding visual output on the display panel 241 based on the type of the touch event. In FIG. 3a, the touchscreen 231 and the display panel 241 are used as two independent components to implement input and output functions of the mobile phone 200. However, in some embodiments, the touchscreen 231 and the display panel 241 may be integrated to implement the input and output functions of the mobile phone 200.

The gravity sensor (gravity sensor) 250 may detect a value of acceleration in each direction (generally, three axes) of the mobile phone, may detect a value and a direction of gravity in a static mode, and may be used for an application that identifies a mobile phone gesture (such as screen orientation switching, a related game, and magnetometer gesture calibration), a function related to vibration identification (such as a pedometer and a strike), and the like.

The mobile phone 200 may further include another sensor, such as a light sensor. Specifically, the light sensor may include an ambient light sensor and an optical proximity sensor. The ambient light sensor may adjust luminance of the display panel 231 based on brightness of ambient light, and the optical proximity sensor may detect whether an object approaches or touches the mobile phone, and may disable the display panel 231 and/or turn off backlight when the mobile phone 200 approaches an ear. For other sensors, such as a gyroscope, a barometer, a hygrometer, a thermometer, and an infrared sensor, that may be further configured in the mobile phone 200, details are not described herein.

The audio circuit 260, a speaker 271, and a microphone 272 may provide an audio interface between the user and the mobile phone 200. The audio circuit 260 may convert received audio data into an electrical signal and transmit the electrical signal to the speaker 271, and the speaker 271 converts the electrical signal into a sound signal for output. In addition, the microphone 272 converts a collected sound signal into an electrical signal, and the audio circuit 260 receives the electrical signal, converts the electrical signal into audio data, and then outputs the audio data to the RF circuit 210, to send the audio data to, for example, another mobile phone, or outputs the audio data to the memory 220 for further processing.

The processor 270 is a control center of the mobile phone 200 and is connected to parts of the entire mobile phone through various interfaces and lines. The processor 270 performs various functions of the mobile phone 200 and processes data by running or executing the software program and/or the module that are/is stored in the memory 220 and by invoking data stored in the memory 220, so as to perform overall monitoring on the mobile phone. Optionally, the processor 270 may include one or more processing units. Optionally, an application processor and a modem processor may be integrated into the processor 270. The application processor mainly processes an operating system, a user interface, an application, and the like. The modem processor mainly processes wireless communication. It may be understood that the modem processor may not be integrated into the processor 270.

The mobile phone 200 further includes the power supply 280 (such as a battery) that supplies power to each component. Optionally, the power supply may be logically connected to the processor 270 by using a power management system, so as to implement functions such as charging and discharging management and power consumption management by using the power management system.

Although not shown in the figure, the mobile phone 200 may further include an antenna, a Wi-Fi module, an NFC module, a global positioning system (global positioning system, GPS) module, a speaker, an accelerometer, a gyroscope, and the like.

Figure 3B:
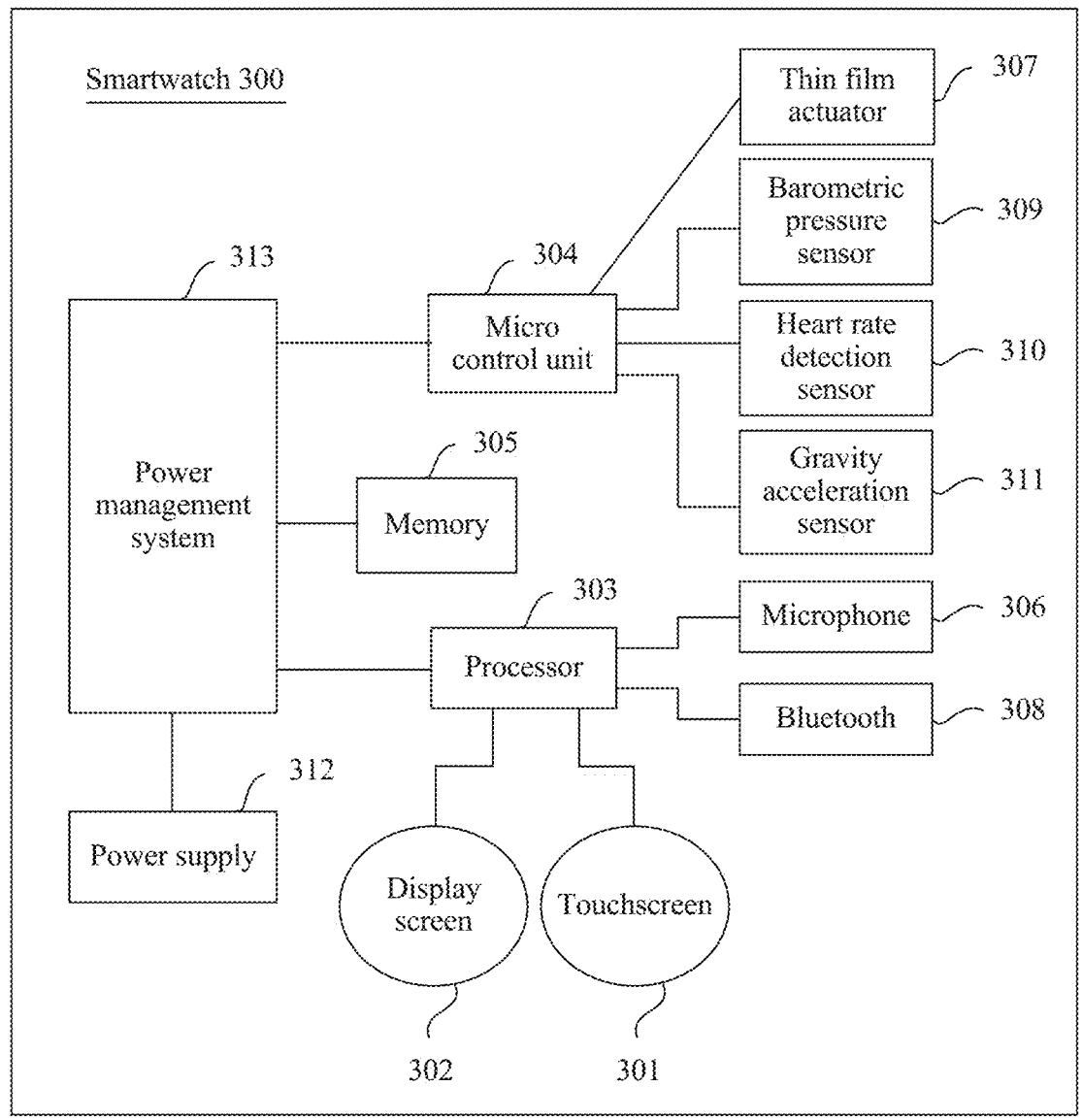

For example, the second terminal is a smartwatch. As shown in FIG. 3b, a smartwatch 300 may include a watch body and a wristband that are interconnected, where the watch body may include a front case (not shown in FIG. 3b), a touchscreen 301 (also referred to as a touchscreen), a display screen 302, a bottom case (not shown in FIG. 3b), a processor 303, a micro control unit (micro control unit, MCU) 304, a memory 305, a microphone (microphone, MIC) 306, a thin film actuator 307, a Bluetooth module 308, a barometric pressure sensor 309, a heart rate detection sensor 310, a gravity sensor 311, a power supply 312, a power management system 313, and the like. Although not shown in the figure, an antenna, a module, an NFC module, a GPS module, a speaker, an accelerometer, a gyroscope, and the like may be included in the smartwatch. A person skilled in the art may understand that a structure of the smartwatch shown in FIG. 3h does not constitute a limitation on the smartwatch, and may include more or fewer components than those shown in the figure, or may combine some components, or have different component arrangements.

The following describes each function component of the smartwatch 300:

The touchscreen 301, also referred to as a touch panel, may collect a touch operation performed by a user of the watch on the touchscreen 301 (for example, an operation performed by the user on or near the touch panel by using any proper object or accessory such as a finger or a stylus), and drive a corresponding connection apparatus by using a preset program. Optionally, the touchscreen 301 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into touch coordinates, and sends the touch coordinates to the processor 303. In addition, the touch controller can receive and execute a command sent by the processor 303. In addition, the touch panel may be implemented in a plurality of types, such as a resistive type, a capacitive type, an infrared type, and a surface acoustic wave type. In addition to the touchscreen 301, the smartwatch may further include another input device, and the another input device may include but is not limited to a function key (such as a volume control key or an on/off key).

The display screen 302 may be configured to display information entered by the user or information provided for the user and various menus of the watch. Optionally, the display screen 302 may be configured in a form of an LCD, an OLED, or the like. Further, the touchscreen 301 may cover the display screen 302. After detecting the touch operation on or near the touchscreen 301, the touchscreen 301 transmits the touch operation to the processor 303 to determine a type of a touch event, and then the processor 303 provides corresponding visual output on the display screen 302 based on the type of the touch event. Although the touchscreen 301 and the display screen 302 in FIG. 3b are used as two independent components to implement input and output functions of the watch, in some embodiments, the touchscreen 301 and the display screen 302 may be integrated to implement the input and output functions of the watch.

The processor 303 is configured to perform system scheduling, control a display screen and a touchscreen, and support processing of the microphone 306, one or more thin film actuators 307, the Bluetooth 308, and the like.

The microphone 306 is also referred to as a microphone. The microphone 306 may convert a collected sound signal into an electrical signal. After receiving the electrical signal, an audio circuit converts the electrical signal into audio data. The audio circuit may alternatively convert the audio data into an electrical signal, and transmit the electrical signal to the speaker, and the speaker converts the electrical signal into a sound signal for output.

For the Bluetooth 308, the smartwatch may exchange information with another electronic device (such as a mobile phone or a tablet computer) by using the Bluetooth 308, and is connected to a network by using the electronic device, so as to connect to a server and process a function such as speech recognition.

The micro control unit 304 is configured to control a sensor, perform an operation on sensor data, communicate with the processor 303, and the like.

The sensor may be the barometric pressure sensor 309, the heart rate detection sensor 310, the gravity acceleration sensor 311, a light sensor, a motion sensor, or another sensor. Specifically, the light sensor may include an ambient light sensor and an optical proximity sensor. For other sensors, such as the gyroscope, a barometer, a hygrometer, a thermometer, and an infrared sensor, that may be further configured in the watch, details are not described herein.

The memory 305 is configured to store a software program and data. The processor 303 performs various function applications of the watch and processes data by running the software program and the data that are stored in the memory. The memory 305 mainly includes a program storage area and a data storage area. The program storage area may store an operating system, and an application required by at least one function (such as an audio play function or an image play function). The data storage area may store data (such as audio data or an address book) created based on use of the watch. In addition, the memory may include a high-speed random access memory, and may further include a non-volatile memory, such as a magnetic disk storage device, a flash memory device, or another volatile solid-state storage device.

The smartwatch 300 further includes the power supply 312 (such as a battery) that supplies power to each component. Optionally, the power supply 312 may be logically connected to the processor 303 by using the power management system 313, to implement functions such as charging and discharging management and power consumption management by using the power management system 313.

Figure 3C:
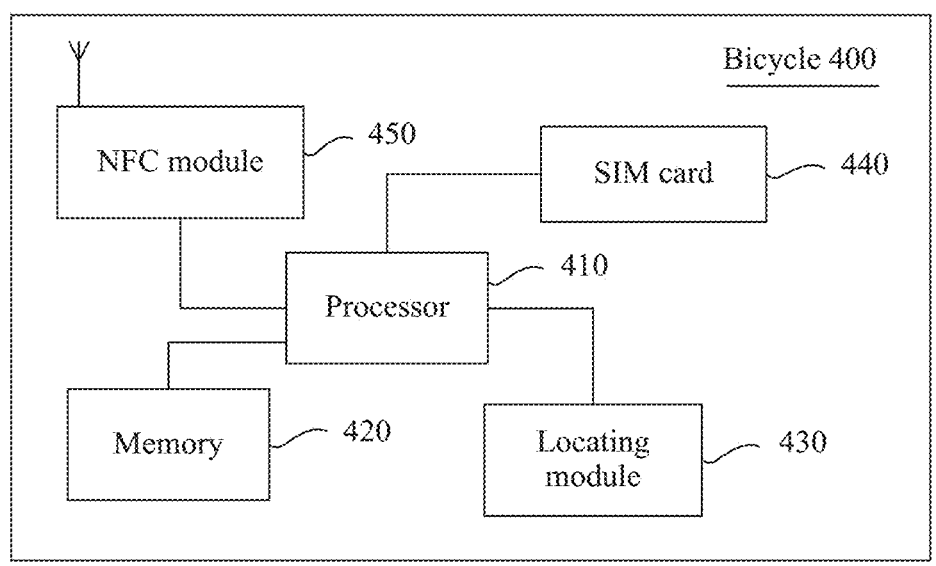

As shown in FIG. 3c, a bicycle 400 includes a bicycle body (not shown in the figure), an intelligent electronic lock (not shown in the figure), and a processor 410, a memory 420, a locating module 430, a subscriber identification module (subscriber identification module, SIM) card 440, and an NFC module 450 that are installed in the bicycle. A person skilled in the art may understand that a structure of the bicycle shown in FIG. 3c does not constitute a limitation on the bicycle, and may include more or fewer components than those shown in the figure, combine some components, or have different component arrangements.

The processor 410 is a control center of the bicycle 400 and is connected to each part of the entire bicycle through various interfaces and lines. The processor 410 performs various functions of the bicycle 400 and processes data by running or executing a software program and/or a module that are/is stored in the memory 420 and by invoking data stored in the memory 420, so as to perform overall monitoring on the bicycle. Optionally, the processor 410 may include one or more processing units.

The memory 420 may be configured to store the software program, the module, and other data, for example, store bicycle location information obtained by the locating module 430. The memory 420 may include a high-speed random access memory, and may further include a non-volatile memory such as at least one magnetic disk storage device, a flash memory device, or another volatile solid-state storage device.

The locating module 430 is configured to locate the bicycle in a riding process. The locating module 430 may be a GPS chip, the BeiDou Navigation Satellite System, the GALILEO System, the Global Navigation Satellite System (global navigation satellite system, GLONASS), or the like.

The SIM card 440 may be an Internet of Things SIM card with an identity, and the SIM card includes an Internet access module. The bicycle may establish a data connection by using the Internet access module in the SINI card and communicate with a server through the established data connection.

The NFC module 450 is configured to carry a unique ID of the bicycle. When the NFC module is installed in a mobile phone, and the mobile phone approaches the bicycle and falls within a communication range specified in an NFC protocol, a bicycle ID may be obtained through NFC communication.

Figure 4:
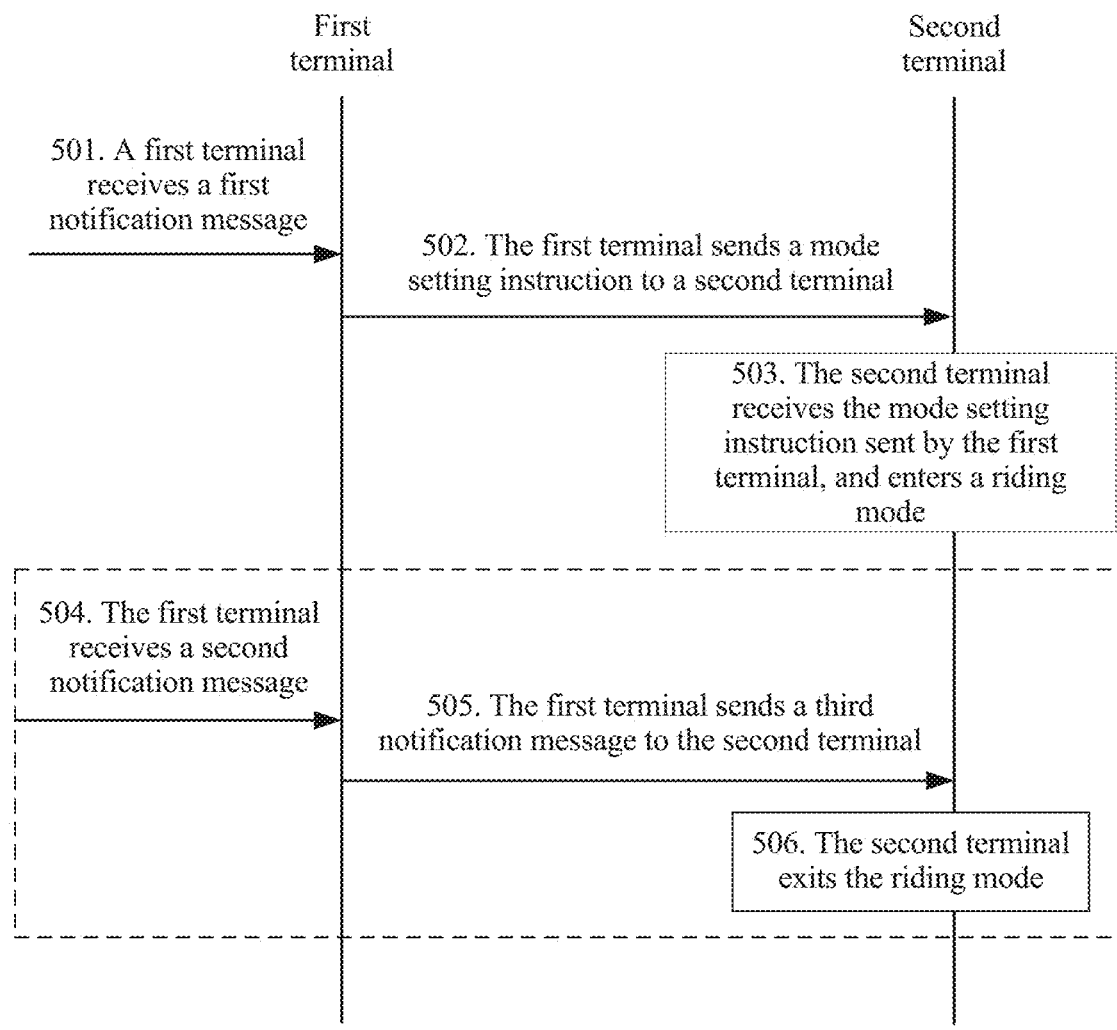
FIG. 4 is a schematic flowchart of a data transmission method according to an embodiment of this application.

An embodiment of this application provides a data transmission method that may be applied to the system shown in FIG. 2. As shown in FIG. 4, the method includes the following steps.

Step 501: A first terminal receives a first notification message.

The first notification message is used to notify the first terminal that a target bicycle is in an available state. The available state may be that the target bicycle is unlocked, or that the target bicycle is unlocked and has reached a specific running speed, and this indicates that a user has started to use the target bicycle. It may be understood that the target bicycle herein may alternatively be a shared vehicle such as a shared car, and methods and apparatuses in the following are also applicable to the shared vehicle such as the shared bus, and details are not described.

Optionally, the first notification message may be sent by a server corresponding to the target bicycle, and the first notification message may be sent when it is detected that the target bicycle is unlocked, or may be sent at any moment after the target bicycle is unlocked. For example, if it is detected that a speed of the bicycle reaches a preset value, it indicates that the user is riding the bicycle. Alternatively, the first notification message may be sent a specific period of time later after the target bicycle is unlocked.

The first notification message may alternatively be sent through triggering by a user operation. If the user wants to record heart rate data in a riding mode when riding starts or after riding for a period of time, the user may operate to send the first notification message to the terminal.

Step 502: The first terminal sends a mode setting instruction to a second terminal according to the first notification message.

The mode setting instruction is used to instruct the second terminal to enter the riding mode. It may be understood that, for the shared bus, the mode setting instruction may be used to instruct the second terminal to enter a driving mode. A connection between the first terminal and the second terminal is pre-established for communication. For example, the first terminal is a mobile phone, and the second terminal is a smartwatch. A Bluetooth connection between the mobile phone and the smartwatch may be pre-established. For specific implementation of the Bluetooth connection, refer to the prior art. After establishing the Bluetooth connection, the first terminal and the second terminal may transmit signaling based on the Bluetooth protocol. For specific implementation, refer to the prior art, and details are not described herein.

Optionally, after receiving the first notification message, the first terminal may pop up a prompt to the user, for example, a prompt message for querying the user whether to set the second terminal to the riding mode. After the user determines to set the second terminal to the riding mode, the first terminal may send the mode setting instruction to the second terminal.

Optionally, after receiving the first notification message, the first terminal may automatically send the mode setting instruction to the second terminal.

Step 503: The second terminal receives the mode setting instruction sent by the first terminal, and enters a riding mode.

Optionally, the second terminal may load a display interface in xe riding mode after entering the riding mode. In a riding process of the user, the second terminal obtains physiological data of the user and displays the obtained physiological data of the user through the display interface. User data obtained by the second terminal includes physiological data such as a heart rate, blood pressure, and blood glucose, and may further include motion data such as riding duration, riding mileage, and a motion track of the user. In this way, the user can view a current physical state of the user and adjust a riding speed, a riding direction, riding duration, and the like of the user through the display interface of the second terminal.

In the method, after the first terminal detects that the bicycle is unlocked, the user does not need to manually set the second terminal to enable the second terminal to enter the riding mode, the first terminal may send the mode setting instruction to the second terminal, and the second terminal enters the riding mode according to the mode setting instruction, so that user operations can be reduced, and user experience is improved.

Optionally, after riding ends, the first terminal may notify the second terminal that the riding ends, so that the second terminal can exit the riding mode. Therefore, the method provided in this embodiment of this application may further include the following steps:

Step 504: The first terminal receives a second notification message.

The second notification message is used to notify the first terminal that the target bicycle is in a non-riding state. The non-riding state may be that the bicycle is locked, or may indicate that a speed of the bicycle is less than a specific value, and this indicates that the user does not ride the bicycle. For example, the user may be pushing the bicycle or the bicycle is unlocked but is not in use.

Optionally, the second notification message may be sent by the server corresponding to the target bicycle, and the second notification message may be sent when it is detected that the target bicycle is locked. For example, it is detected that a speed of the target bicycle is less than a preset value, and this indicates that the user does not ride the bicycle. Alternatively, the second notification message may be sent at any moment after the target bicycle is locked. For example, the second notification message is sent a specific period of time later after the target bicycle is locked.

The second notification message may alternatively be sent through triggering by a user operation. If the user does not want to record heart rate data in the riding mode after riding ends or after riding for a period of time, the user may operate to send the second notification message to the terminal.

Step 505: The first terminal sends a third notification message to the second terminal according to the second notification message.

The third notification message is used to notify the second terminal that the user ends the riding. The third notification message carries an identity of the first terminal, an identity of the second terminal, and a notification event, where the notification event may be an event for notifying the second terminal that the riding ends.

Step 506: The second terminal receives the third notification message sent by the first terminal, and exits the riding mode.

Optionally, a display interface after the second terminal exits the riding mode displays an interface set by default, for example, a standby interface.

Optionally, after the riding ends, the method provided in this embodiment of this application further includes the following: The second terminal reports user data to the first terminal.

In step 504 to step 506, after the riding ends, the first terminal notifies the second terminal that the user ends riding, so that the second terminal can exit the riding mode. In comparison with the prior art in which the user needs to manually exit the riding mode, in the method, the smartwatch can automatically exit the riding mode without needing the user to perform any operation.

Optionally, before the first terminal receives the first notification message, the method further includes the following: The first terminal automatically obtains the identity of the target bicycle; then sends an unlocking request to the server corresponding to the target bicycle, where the unlocking request carries the identity of the target bicycle and the identity of the first terminal; after learning that the target bicycle is unlocked, the server corresponding to the target bicycle sends the first notification message to the first terminal; and the first terminal receives the first notification message sent by the server corresponding to the target bicycle, where the first notification message is used to notify the first terminal that the target bicycle is in the available state, and the available state is an unlocked state.

Figures 1, 5A:
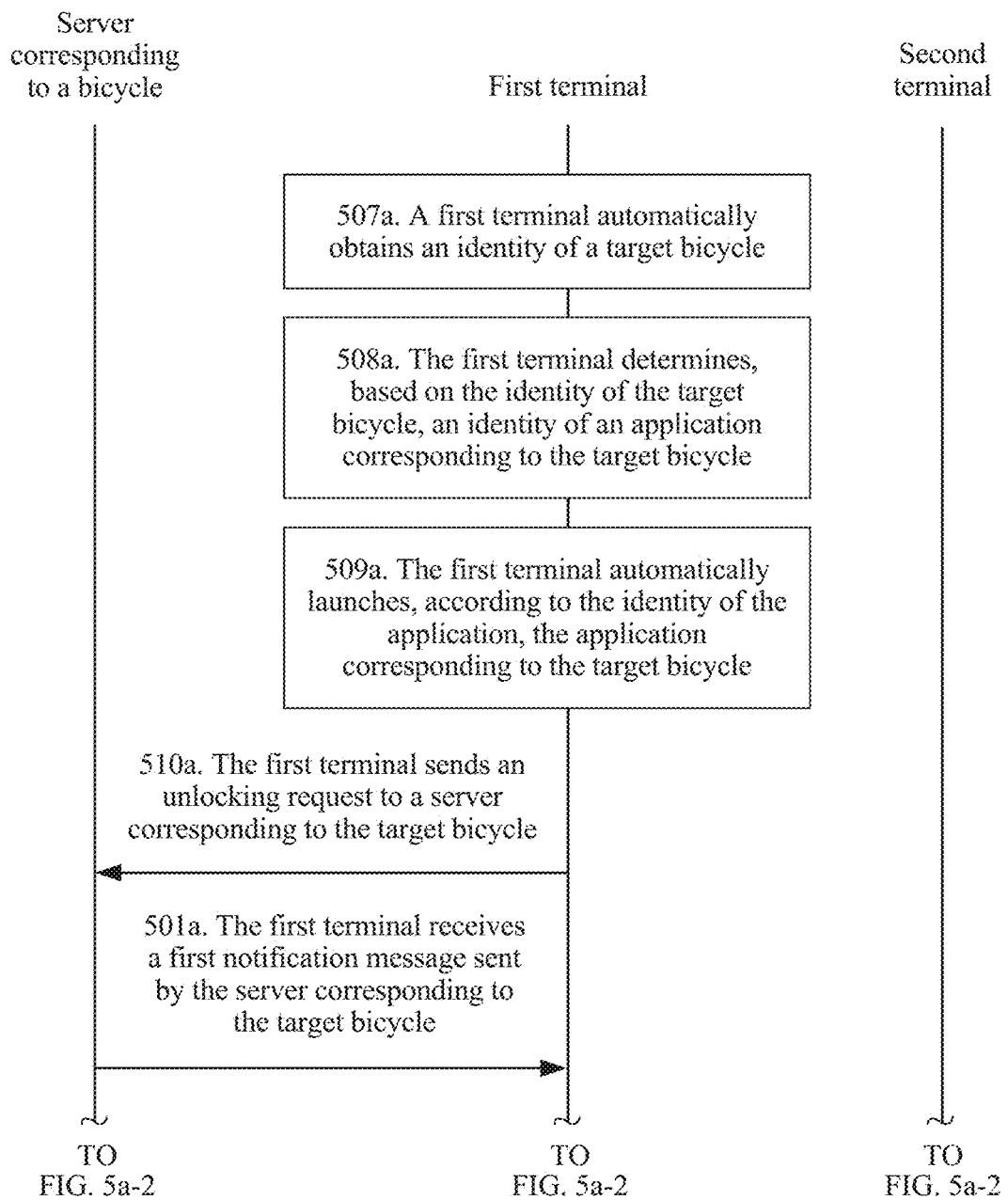
Figures 2, 5A:
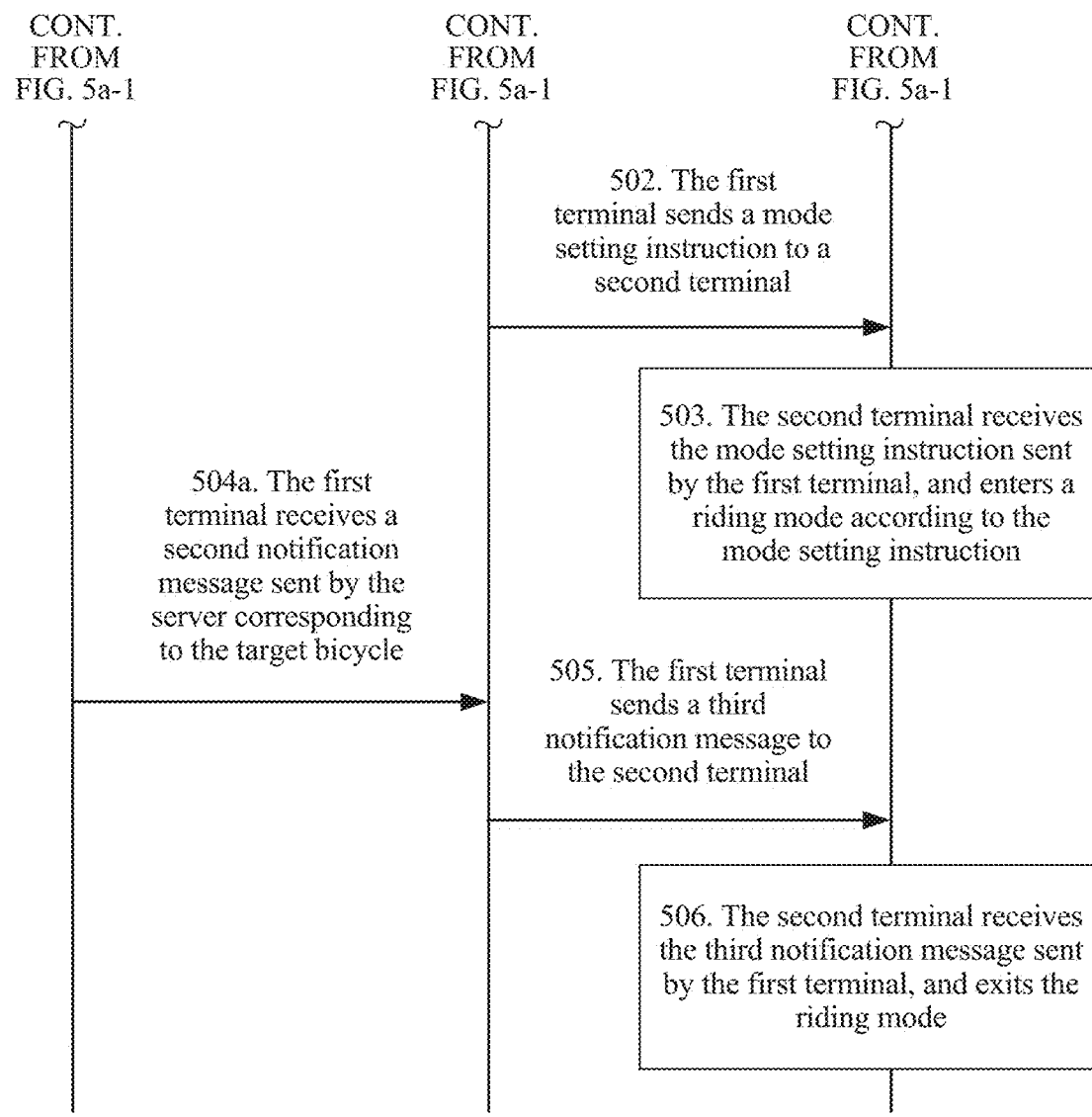

Optionally, when an application corresponding to the bicycle is installed on the first terminal, as shown in FIG. 5*a*-1 and FIG. 5*a*-2, the process of triggering sending of the first notification message specifically includes:

Step 507*a*: The first terminal automatically obtains the identity of the target bicycle.

Step 508*a*: The first terminal determines, based on the identity of the target bicycle, an identity of the application corresponding to the target bicycle.

Step 509*a*: The first terminal automatically launches, according to the identity of the application, the application corresponding to the target bicycle.

Step 510*a*: The first terminal sends the unlocking request to the server corresponding to the target bicycle.

The unlocking request carries the identity of the target bicycle and the identity of the first terminal.

In step 501, "that the first terminal receives the first notification message" is specifically as follows:

Step 501*a*: The first terminal receives the first notification message sent by the server corresponding to the target bicycle.

The first notification message is used to notify the first terminal that the target bicycle is unlocked.

Correspondingly, when the target bicycle is in the non-riding state, for example, the target bicycle is locked, the server corresponding to the target bicycle can detect that the bicycle is in the locked state, and in step 504, "that the first terminal receives the second notification message" is specifically as follows:

Step 504*a*: The first terminal receives the second notification message sent by the server corresponding to the target bicycle.

The second notification message is used to notify the first terminal that the target bicycle is in the non-riding state.

Figure 5B:
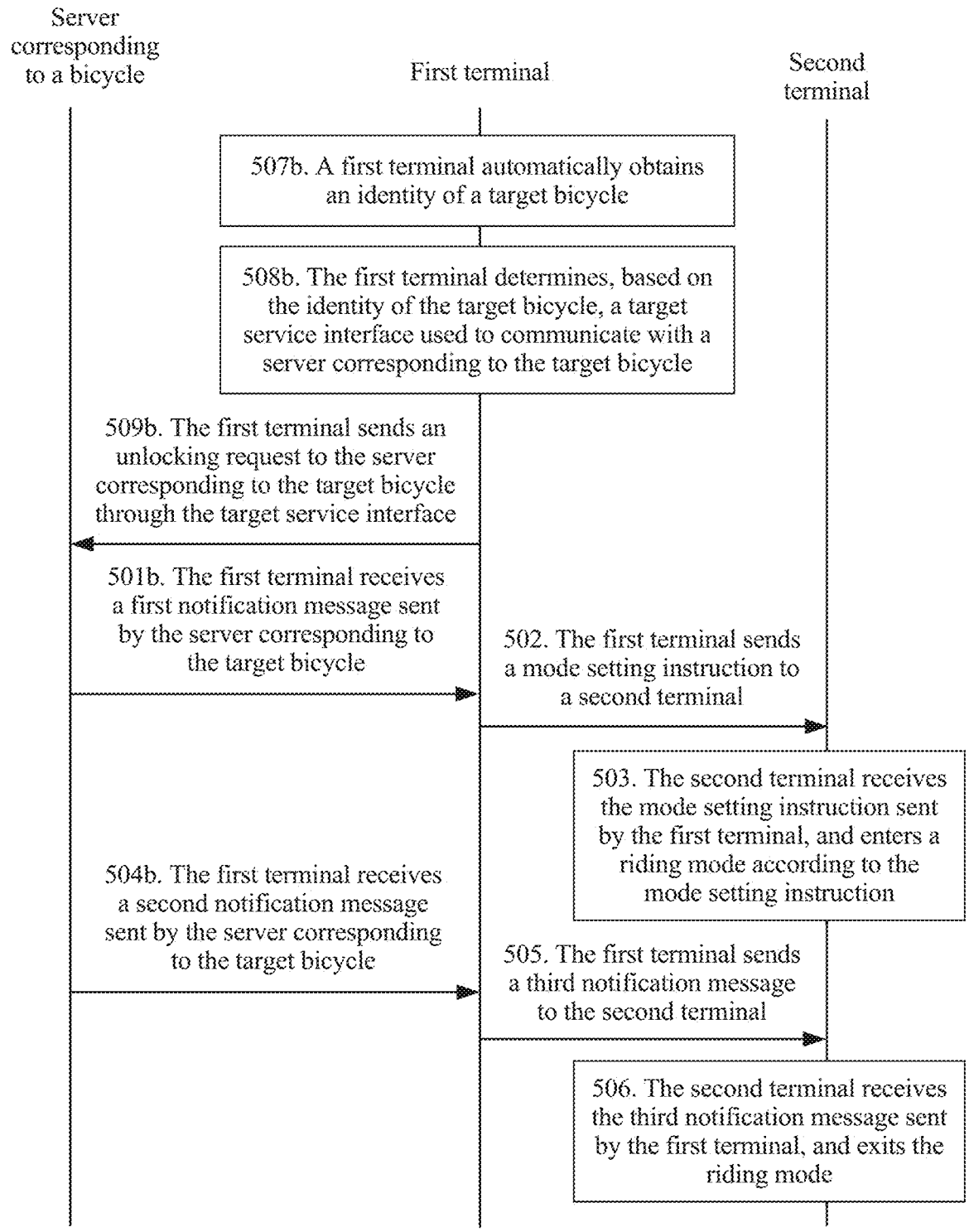
FIG. 5b is a schematic flowchart of still another data transmission method according to an embodiment of this application.

Optionally, when an application corresponding to the bicycle is not installed on the first terminal, as shown in FIG. 5*b*, the process of triggering sending of the first notification message specifically includes:

Step 507*b*: The first terminal automatically obtains the identity of the target bicycle.

Step 508*b*: The first terminal determines, based on the identity of the target bicycle, a target service interface used to communicate with the server corresponding to the target bicycle.

The target service interface may be an interface defined based on a bicycle software development kit (software development kit, SDK) embedded in the mobile phone, or may be a network interface that can be accessed through network communication. In practical application, the mobile phone may store a plurality of types of bicycle SDKs. When it is required to communicate with different types of bicycle servers, different service interfaces are required.

Step 509b: The first terminal sends the unlocking request to the server corresponding to the target bicycle through the target service interface.

The unlocking request carries the identity of the target bicycle and the identity of the first terminal.

In step 501, "that the first terminal receives the first notification message" is specifically as follows:

Step 501b: The first terminal receives the first notification message sent by the server corresponding to the target bicycle through the target service interface.

The first notification message is used to notify the first terminal that the target bicycle is unlocked.

Correspondingly, when the target bicycle is in the non-riding state, for example, the target bicycle is locked, the server corresponding to the target bicycle can detect that the bicycle is in the locked state, and in step 504, "that the first terminal receives the second notification message" is specifically as follows:

Step 504b: The first terminal receives the second notification message sent by the server corresponding to the target bicycle through the target service interface.

The second notification message is used to notify the first terminal that the target bicycle is in the non-riding state.

Figure 6A:
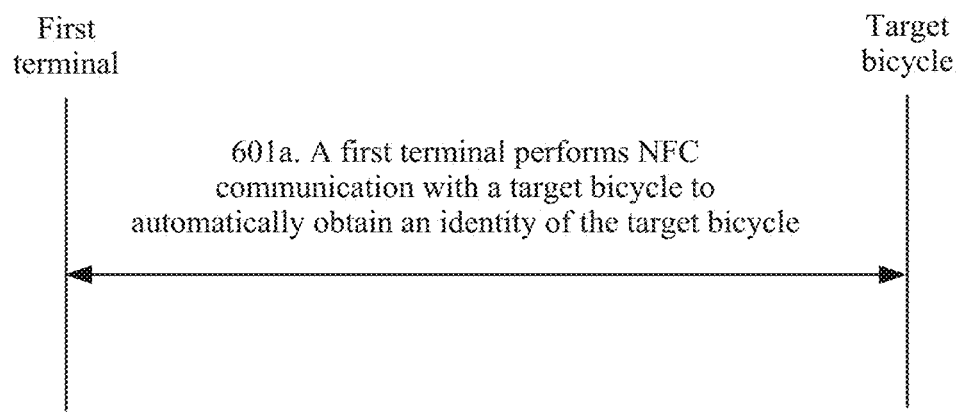
FIG. 6a is a schematic flowchart of a method for obtaining an identity of a target bicycle according to an embodiment of this application.

In an implementation, that the first terminal automatically obtains the identity of the target bicycle in step 507a and step 507b may be implemented in the following two manners:

As shown in FIG. 6a, when an NFC module is separately installed on both the first terminal and the target bicycle, the first implementation includes:

Step 601a: When a distance between the first terminal and the target bicycle is less than a distance within which NFC communication can be performed and that is specified in an NFC protocol, the first terminal performs NFC communication with the target bicycle to automatically obtain the identity of the target bicycle.

In the implementation shown in FIG. 6a, the first terminal can perform NFC communication with the target bicycle to automatically obtain the identity of the target bicycle. In the entire process, the user does not need to launch a bicycle APP and scan a two-dimensional code or enter a bicycle number, and user operations can be reduced.

Figure 6B:
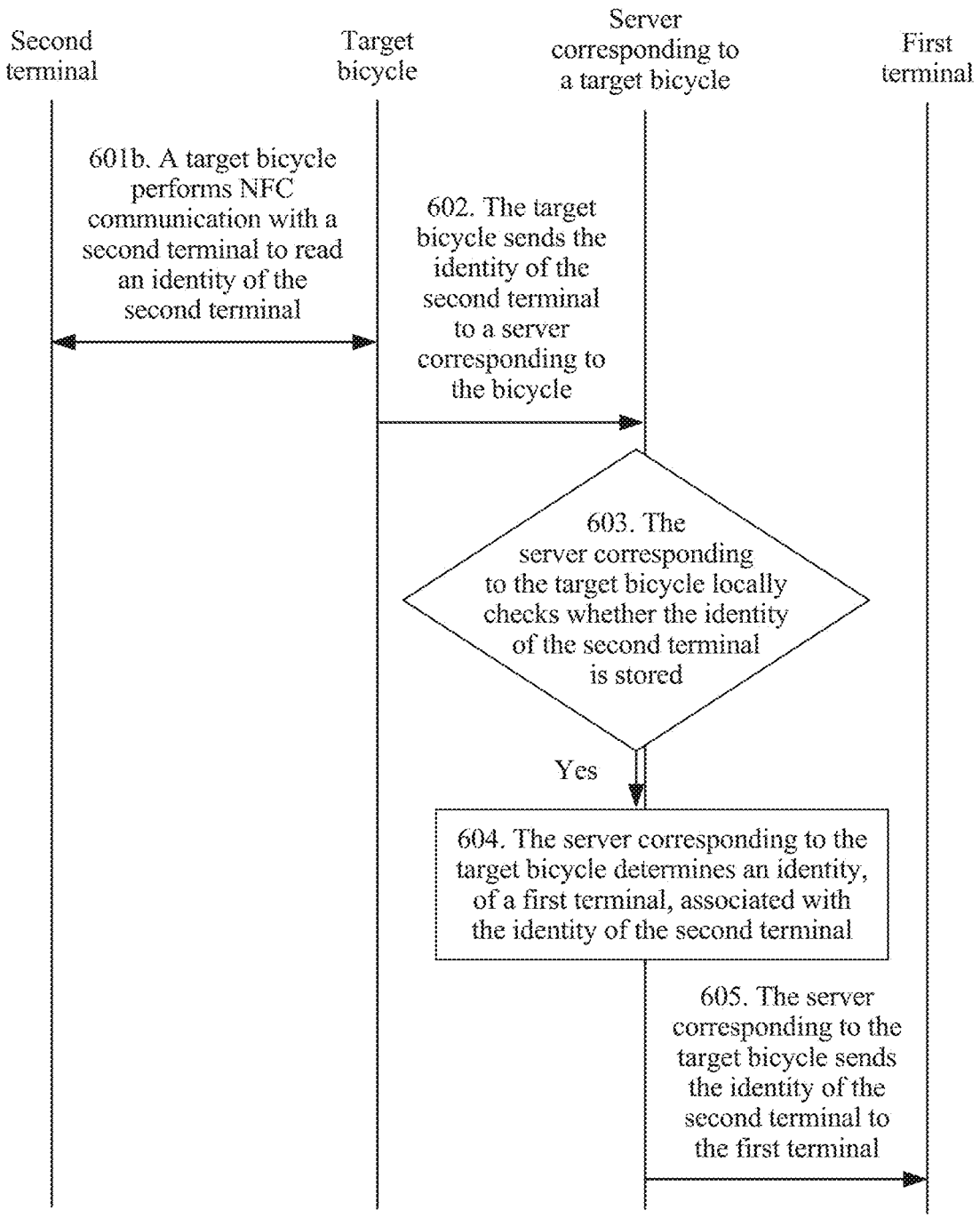
FIG. 6b is a schematic flowchart of another method for obtaining an identity of a target bicycle according to an embodiment of this application.

As shown in FIG. 6b, when an NFC module is separately installed on both the second terminal and the target bicycle, the second implementation includes:

Step 601b: The target bicycle performs NFC communication with the second terminal to read an identity of the second terminal.

Step 602: The target bicycle sends the identity of the second terminal to the server corresponding to the bicycle.

Step 603: The server corresponding to the target bicycle locally checks whether the identity of the second terminal is stored.

If the identity of the second terminal is stored, step 604 below is performed.

Step 604: The server corresponding to the target bicycle determines an identity, of the first terminal, associated with the identity of the second terminal.

Step 605: The server corresponding to the target bicycle sends the identity of the second terminal to the first terminal.

In the implementation shown in FIG. 6b, the bicycle can actively obtain the identity of the second terminal, and when the identity of the second terminal is valid, the server corresponding to the bicycle automatically sends the identity of the bicycle to the first terminal. In the entire process, the user also does not need to launch the bicycle APP and scan the two-dimensional code, and the user operations can be reduced.

In the implementations shown in FIG. 6a and FIG. 6b of this application, the first terminal can automatically obtain the identity of the target bicycle. In the entire process, the user does not need to launch the APP, select an APP function of scanning two-dimensional code, and then scan the two-dimensional code of the bicycle in the prior art, and the user operations are further reduced.

Figure 1A:
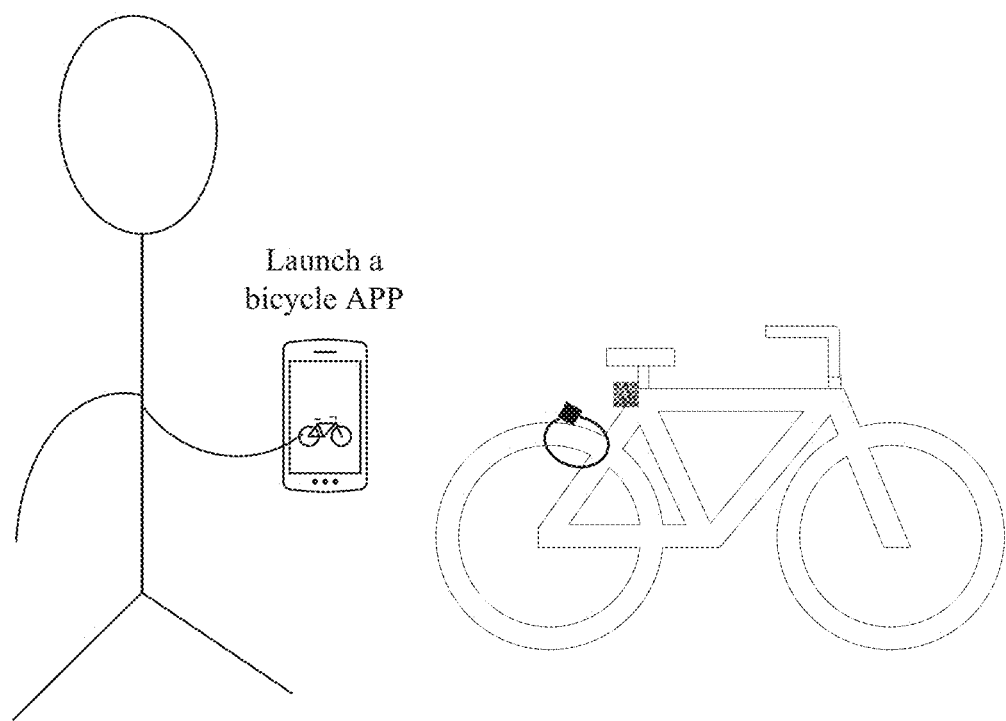
FIG. 1a and FIG. 1b are schematic diagrams of bicycle unlocking processes in the prior art.
Figure 1B:
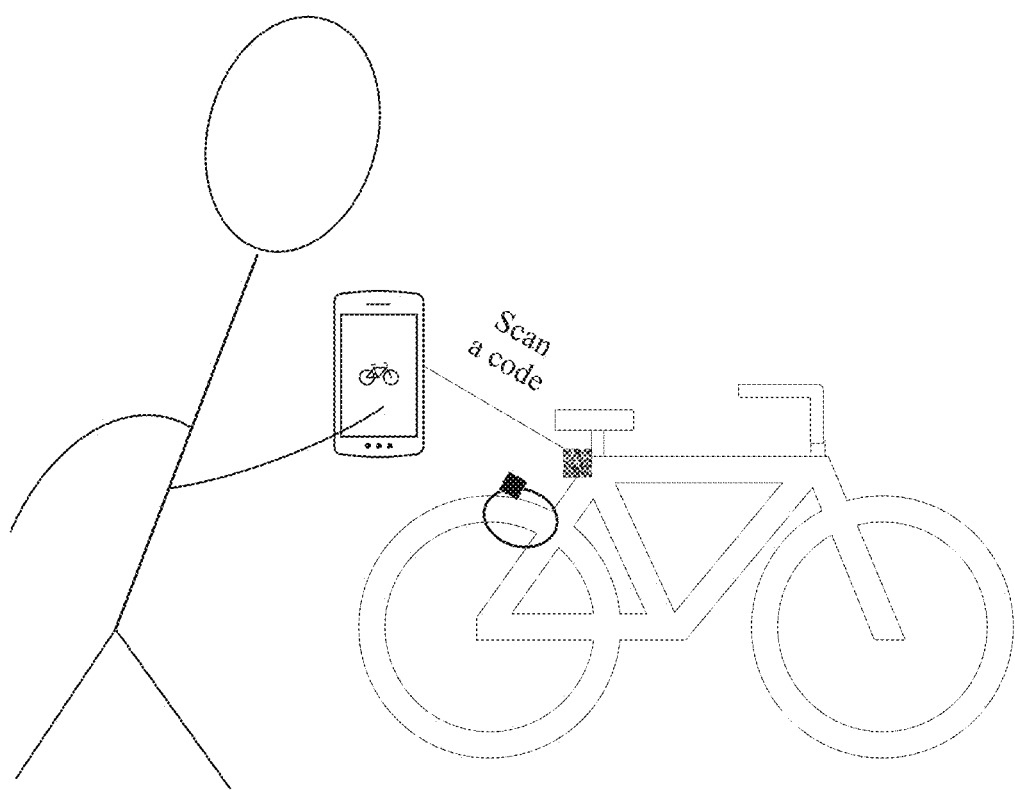
Figure 1C:
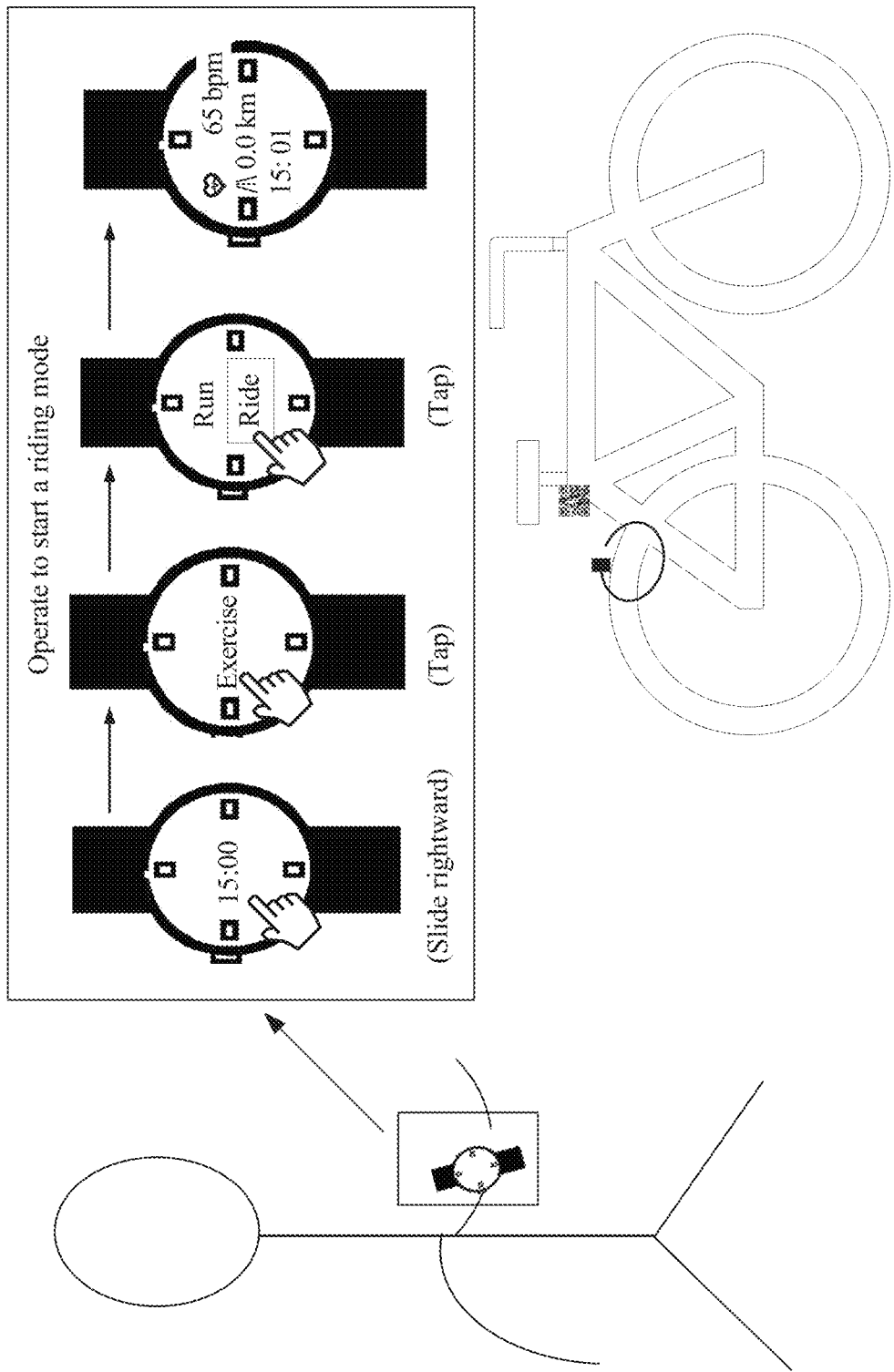
FIG. 1c and FIG. 1d are sequentially schematic diagrams of processes in which a user sets a smartwatch to enter a riding mode and after riding ends, the user sets the smartwatch to exit the riding mode in the prior art.
Figure 1D:
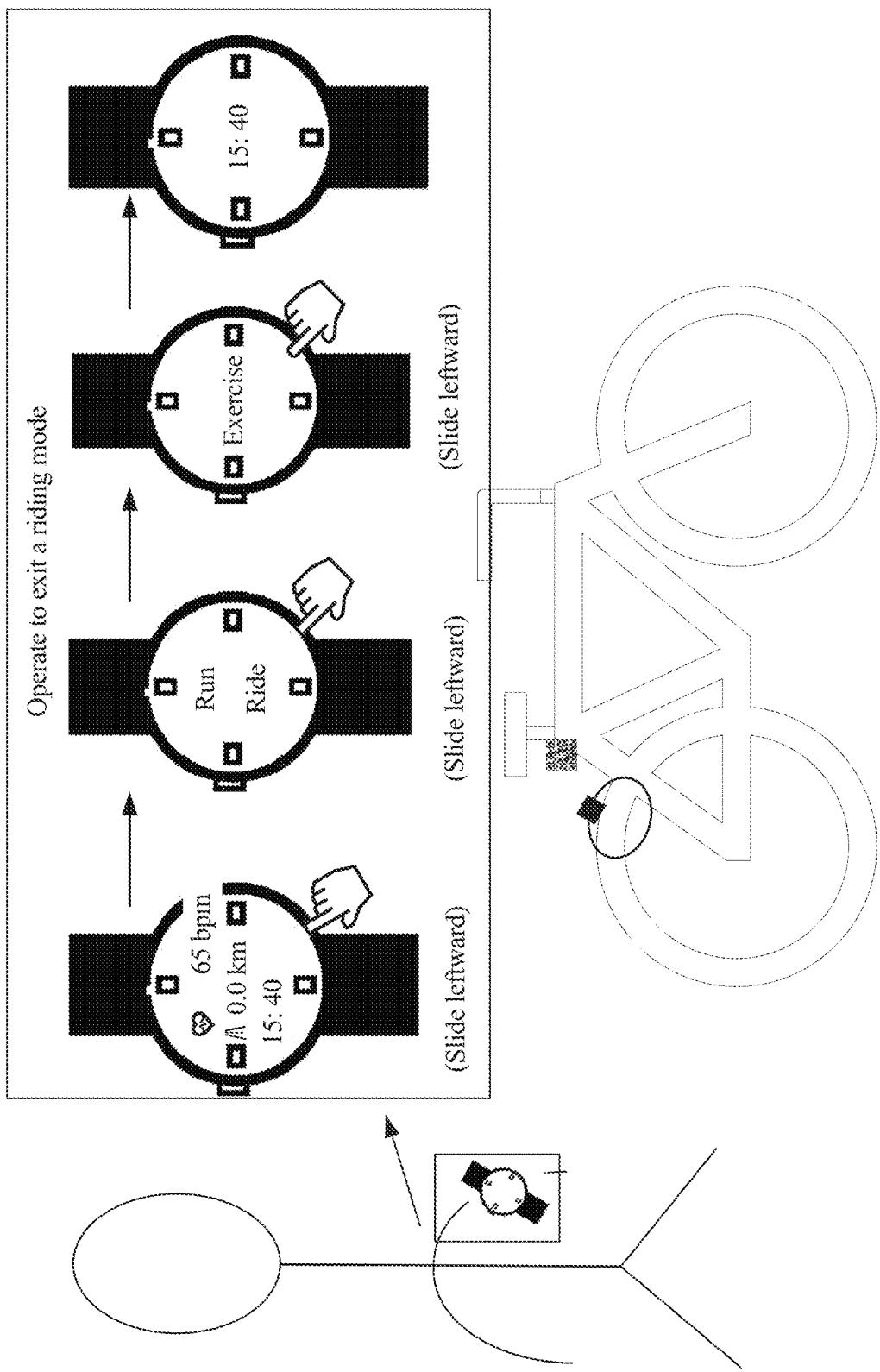
Figure 7A:
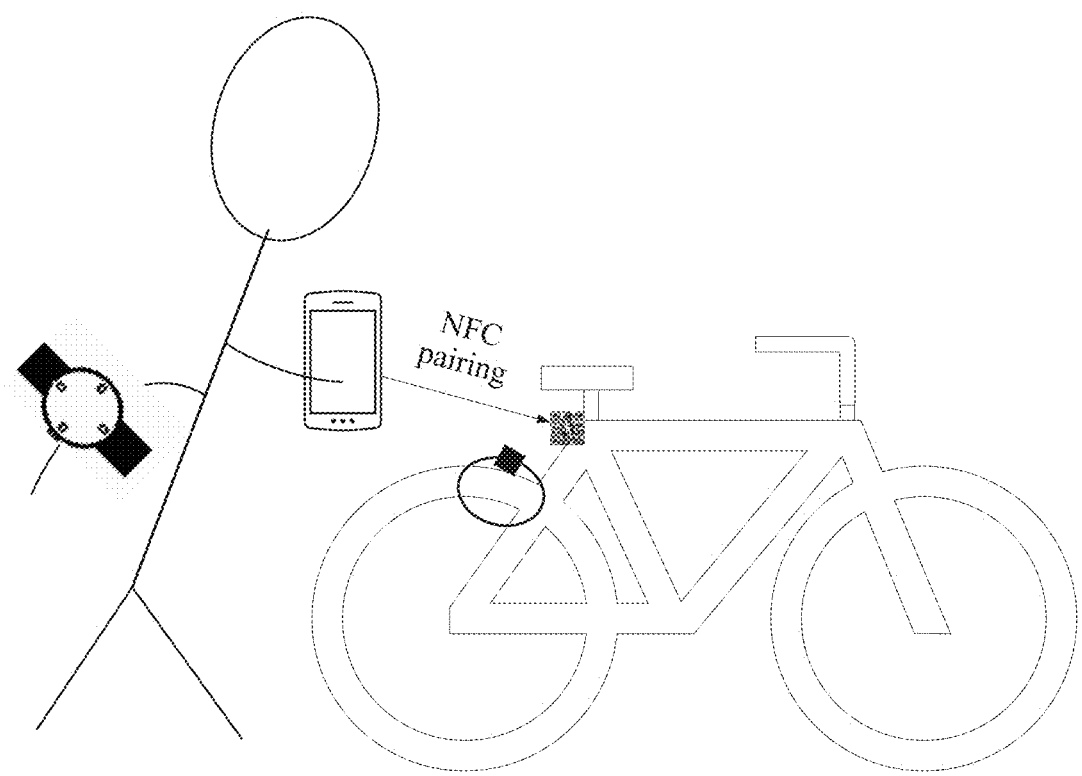
FIG. 7a is a schematic diagram of a bicycle unlocking process according to an embodiment of this application.
Figure 7B:
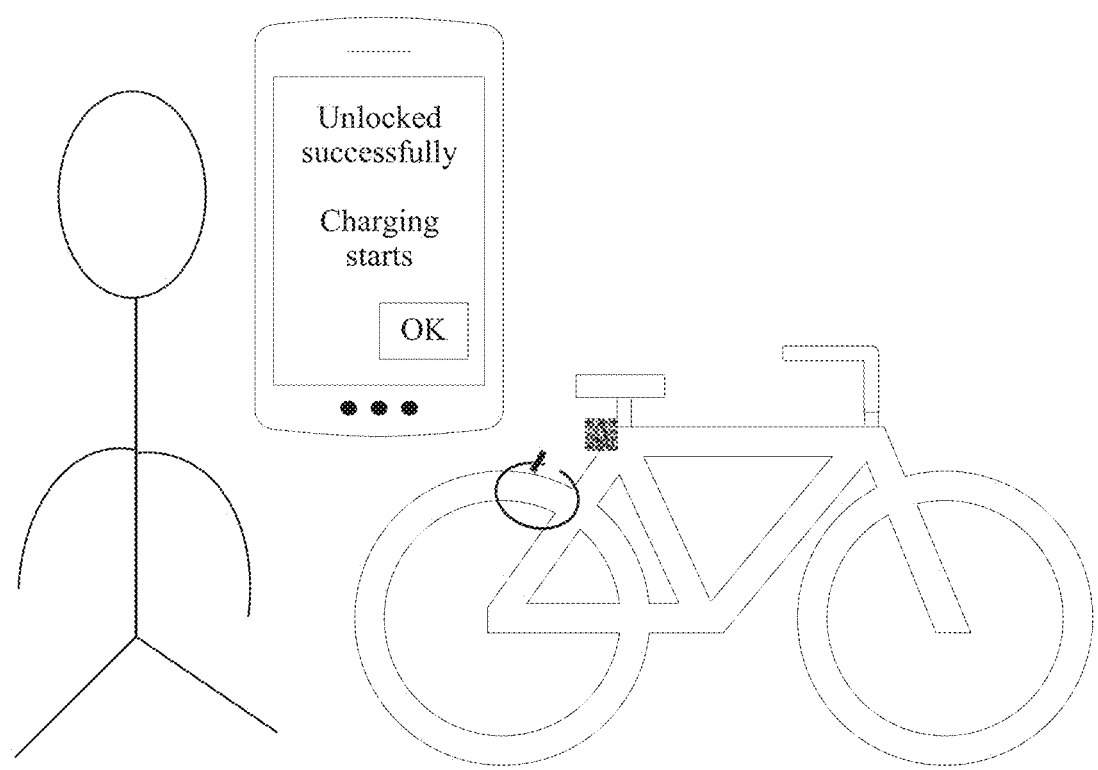
FIG. 7b is a schematic diagram of a display interface on a mobile phone after a bicycle is successfully unlocked according to an embodiment of this application.
Figure 7C:
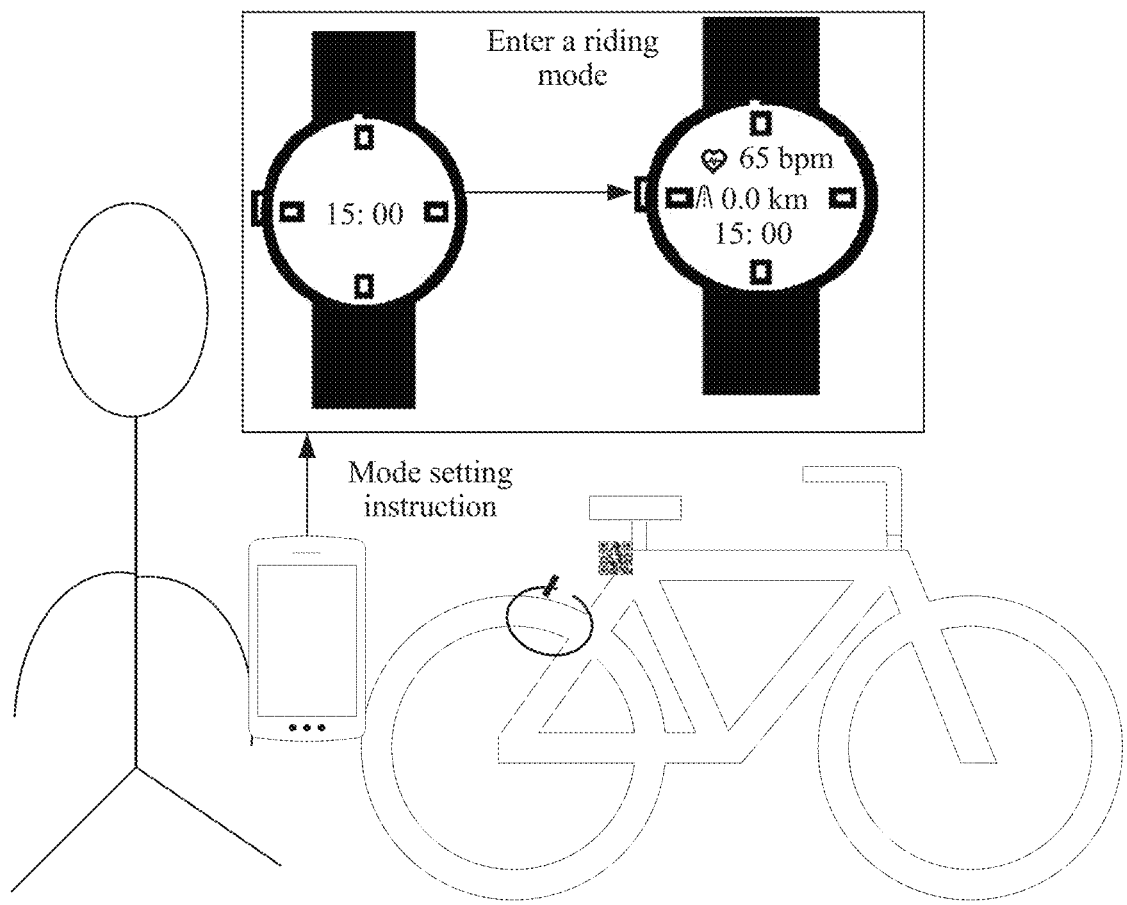
FIG. 7c is a schematic diagram of a process in which a smartwatch enters a riding mode according to an embodiment of this application.
Figure 7D:
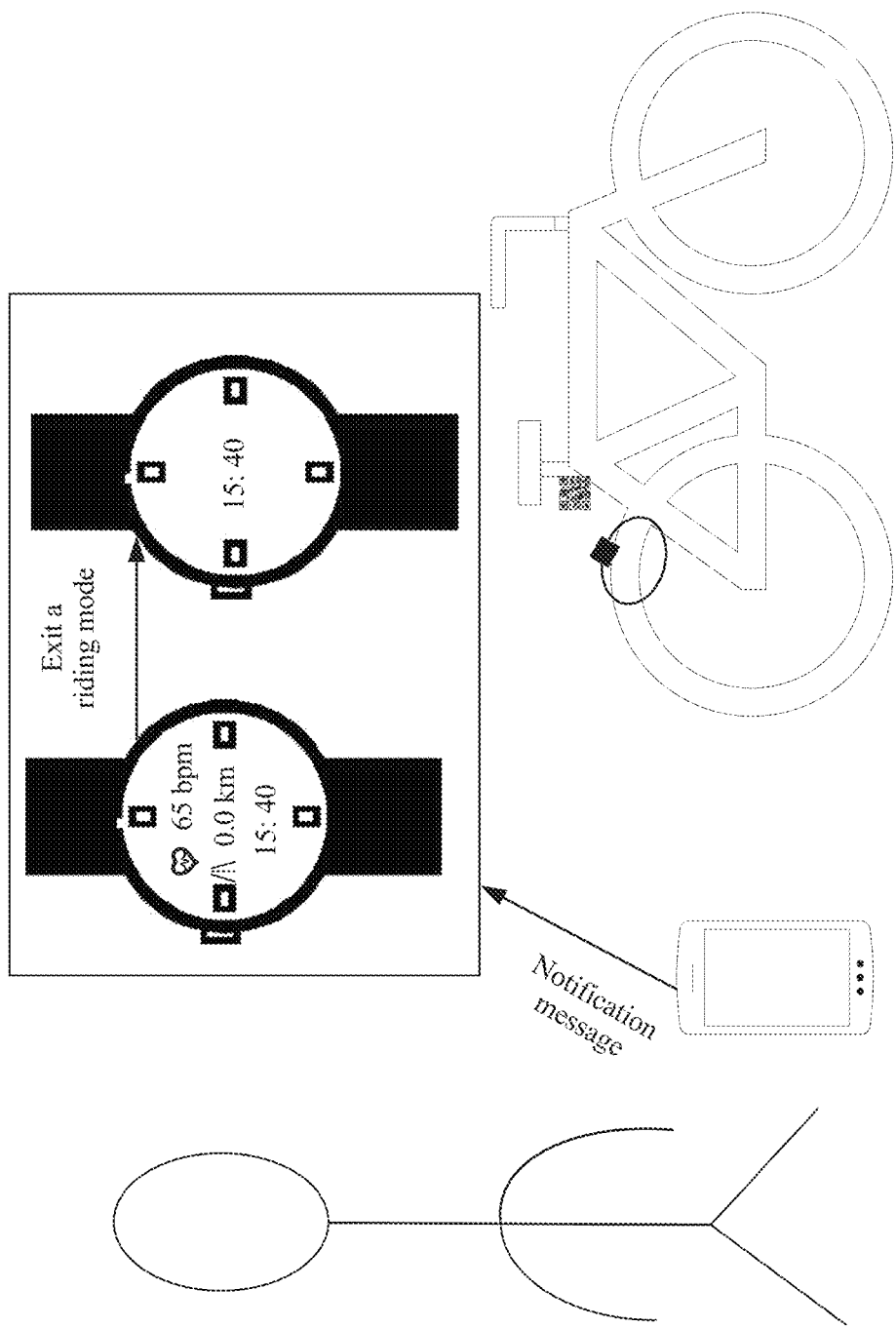
FIG. 7d is a schematic diagram of a process in which a mobile phone sends a notification message to a smartwatch after riding ends, and the smartwatch exits a riding mode after receiving the notification message according to an embodiment of this application.

For example, the first terminal is a mobile phone; the second terminal is a smartwatch; a Bluetooth connection is pre-established between the mobile phone and the smartwatch; an APP corresponding to the bicycle is installed on the mobile phone that serves as a client; the mobile phone can communicate with the server corresponding to the bicycle; and an NFC module is separately installed on both the mobile phone and the smartwatch. In the method of this application, as shown in FIG. 7a, when a user discovers a shared bicycle, the user takes out a mobile phone and approaches the shared bicycle. Because an NFC module is separately installed on both the mobile phone and the shared bicycle, when a distance between the mobile phone and the bicycle is less than or equal to a communication distance specified in an NFC protocol, the mobile phone reads a bicycle ID, after reading the bicycle ID, automatically launches an APP corresponding to the bicycle and installed on the mobile phone, and sends an unlocking request to a server of the bicycle, where the unlocking request carries a mobile phone ID and the bicycle ID. After receiving the unlocking request, the server of the bicycle sends an unlocking instruction to the bicycle and sends a notification to the mobile phone that the bicycle is unlocked (refer to the prior art for a specific implementation process of unlocking the bicycle through signaling interworking among the mobile phone, the server of the bicycle, and the bicycle after the APP corresponding to the bicycle is launched. This specific process is invisible to the user, and is not shown in FIG. 7a). It can be learned that in a bicycle unlocking process, in comparison with the prior art shown in FIG. 1a and FIG. 1b in which the user needs to bring the mobile phone close to the bicycle, launch the APP corresponding to the bicycle, invoke a two-dimensional code scanning function of the APP corresponding to the bicycle, and then scan the two-dimensional code of the bicycle before unlocking the bicycle, in the method, the user only needs to bring the mobile phone close to the bicycle to automatically unlock the bicycle without needing the user to perform any operation. As shown in FIG. 7b, after the bicycle is unlocked, the mobile phone displays an interface indicating that the bicycle is unlocked successfully and charging starts, to notify the user that the bicycle is unlocked. As shown in FIG. 7c, after the bicycle is unlocked, the mobile phone automatically sends an instruction to the watch after receiving a notification from the server of the bicycle that the bicycle is unlocked, where the instruction is used to instruct the watch to enter a riding mode and record user data such as a heart rate of the user in the riding mode. It can be learned that after the bicycle is unlocked, in comparison with the prior art shown in FIG. 1c in which the user needs to manually operate to set a mode of the watch to the riding mode, in this embodiment of this application, the user does not need to perform any operation on the smartwatch, and the terminal can automatically set the mode of the watch to the riding mode after learning that the bicycle is unlocked. As shown in FIG. 7d, after the user locks the bicycle and ends riding, the server corresponding to the bicycle determines that the bicycle is locked, and then sends a notification to the mobile phone to notify the mobile phone that the user ends the riding, then the mobile phone automatically notifies the smartwatch that the riding ends, and the smartwatch may exit the riding mode and report the user data such as the heart rate of the user during the riding to the mobile phone. It can be learned that after the riding ends, in comparison with the prior art shown in FIG. 1d in which the user needs to perform a setting operation to enable the smartwatch to exit the riding mode, in this embodiment of this application, the user does not need to perform any operation, and the mobile phone may automatically notify the smartwatch that the riding ends.

Figure 8A:
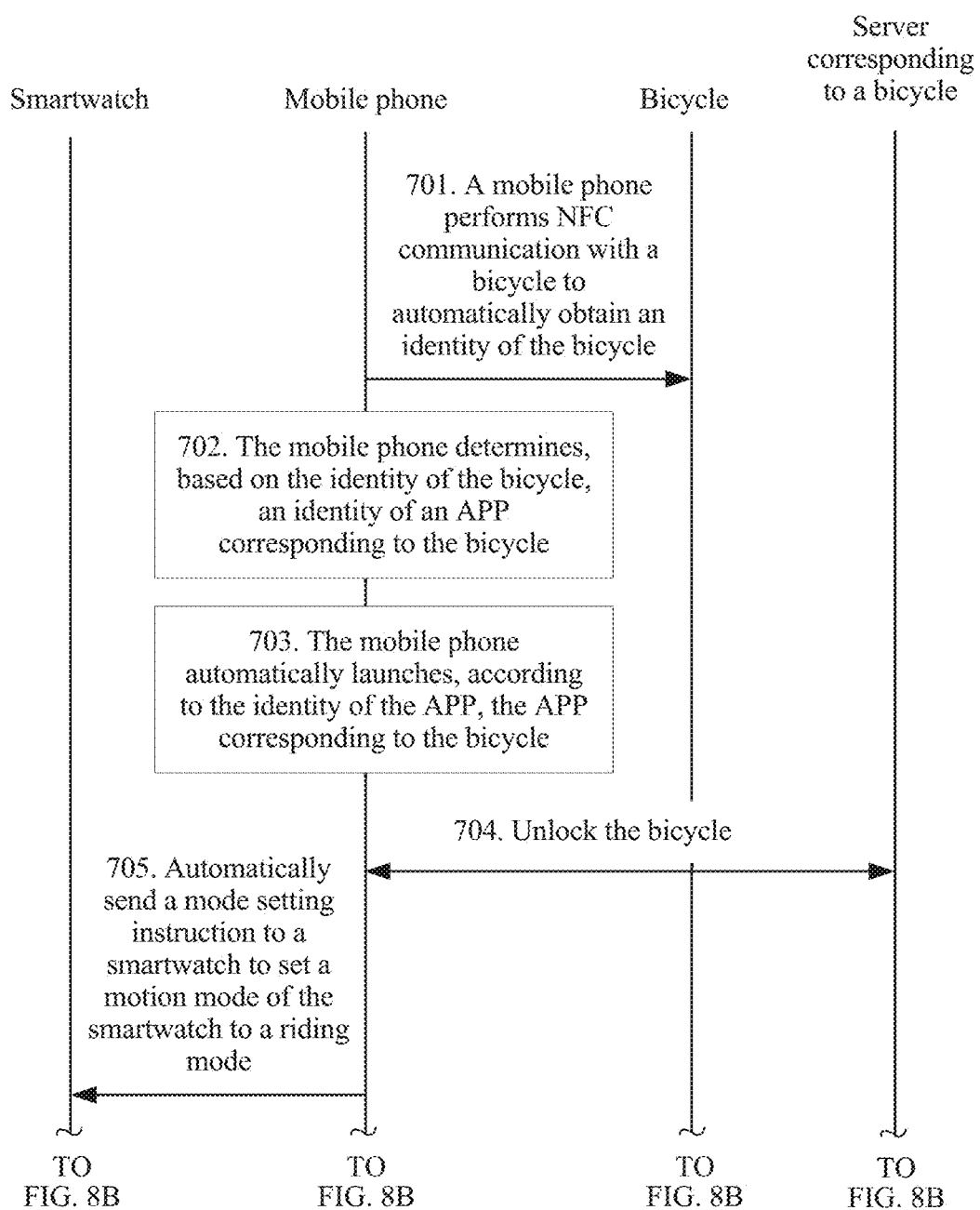
FIG. 8A and FIG. 8B is a schematic flowchart of a data transmission method according to an embodiment of this application.
Figure 8B:
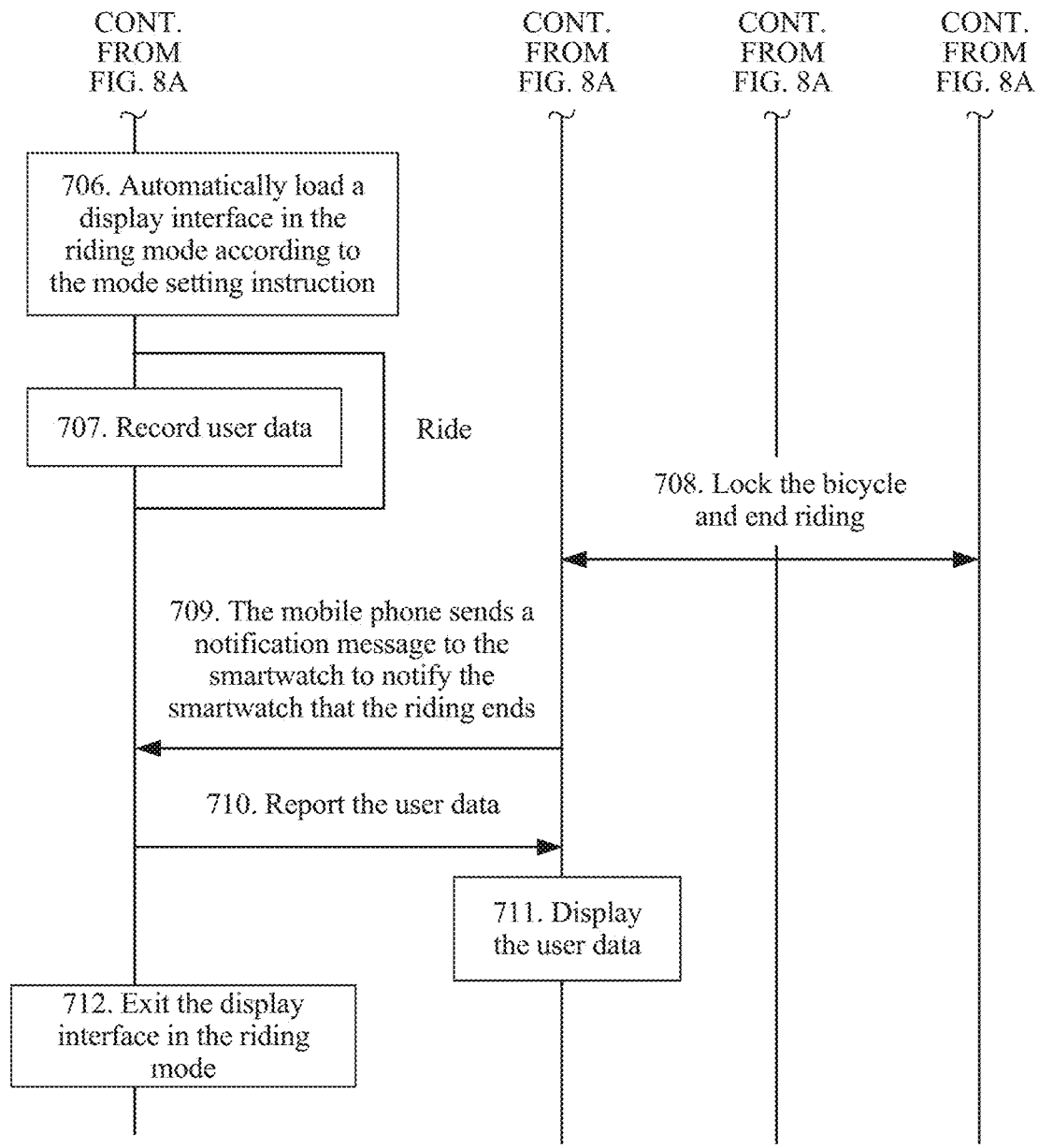

To support an implementation process in FIG. 7a to FIG. 7d, when the method provided in this application is applied to the foregoing application scenario, as shown in FIG. 8A and FIG. 83, the method specifically includes the following steps.

Step 701: When a distance between a mobile phone and a bicycle is less than or equal to a preset distance, the mobile phone performs NFC communication with the bicycle to automatically obtain an identity of the bicycle.

An NFC chip is separately installed in both the mobile phone and the bicycle, and the NFC chip in the bicycle may be located in a smart lock of the bicycle. Each NFC chip has a unique ID used to uniquely identify the bicycle. The preset distance is a distance within which NFC communication can be performed and that is specified in an NFC protocol. For specific implementation of NFC communication, refer to the prior art, and details are not described herein.

In this embodiment of this application, NFC communication between the mobile phone and the bicycle is performed to automatically obtain the identity of the bicycle by performing this step. Therefore, a user does not need to perform steps such as enabling a code scanning function of an APP corresponding to the bicycle in the mobile phone and scanning a two-dimensional code on the bicycle.

Figure 9:
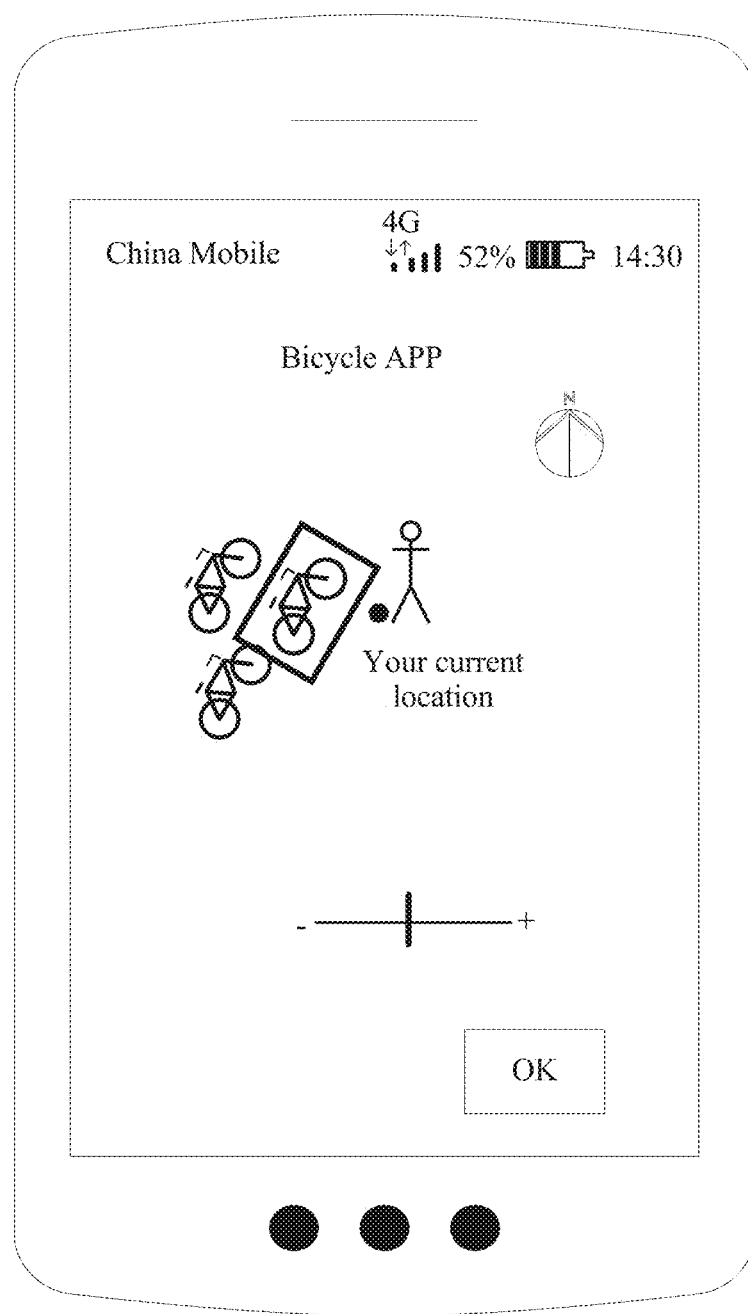
FIG. 9 is a schematic diagram of a preview interface of a target bicycle and a current location of a user according to an embodiment of this application.

Optionally, to avoid a case in which the user actually wants to use a bicycle A, but actually obtains an identity of a bicycle B due to a misoperation, in a possible implementation of this embodiment of this application, as shown in FIG. 9, the mobile phone displays a schematic diagram of a preview of a relative correspondence between the bicycle and a location of the user, where a selected bicycle in a black thick wireframe is a bicycle whose identity is obtained by the mobile phone of the user. The user may view the schematic diagram of the preview to confirm whether the bicycle whose identity is obtained is a bicycle that the user actually wants to use. If the bicycle is the bicycle that the user actually wants to use, the user may tap OK to proceed with a next step, or if the bicycle is not the bicycle that the user actually wants to use, the user may tap Back to further obtain an identity of another bicycle.

Step 702: The mobile phone determines, based on the identity of the bicycle, an identity of an APP corresponding to the bicycle.

In practical application, different types of bicycles belong to different vendors. The user may have installed APPs of a plurality of types of bicycles on the mobile phone. Therefore, after the mobile phone obtains the identity of the bicycle by performing step 701, to unlock the bicycle, the mobile phone needs to perform step 702 to determine the identity of the APP corresponding to the bicycle.

Optionally, after the mobile phone obtains the identity of the bicycle by performing step 701, in a possible implementation of this step, the mobile phone queries a local database or a database on a cloud server to determine whether the identity of the bicycle is stored in the database. If the identity of the bicycle is stored in the database, it indicates that the identity of the bicycle is valid for the mobile phone, and vendor information of the bicycle and the identity of the APP corresponding to the bicycle may be further obtained according to the identity of the bicycle.

The bicycle ID may be stored in the local database of the mobile phone or on the cloud server. The bicycle ID stored locally on the mobile phone and the bicycle ID stored on the cloud server are mutually backed up, and the mobile phone may access the cloud server to compare the obtained bicycle with the bicycle ID stored on the cloud server to verify whether the obtained bicycle ID is valid.

Afterwards, the mobile phone performs the following step 703 according to the identity of the APP corresponding to the bicycle.

Step 703: The mobile phone automatically launches, according to the identity of the APP, the APP corresponding to the bicycle.

In an implementation of this step, in an installation package of the APP corresponding to the bicycle, a trigger condition for launching the APP corresponding to the bicycle is set as follows: The identity of the bicycle is obtained. Then, performing step 703 may be triggered after NFC communication between the mobile phone and the bicycle is performed to obtain the identity of the bicycle.

Optionally, in another implementation of this step, in an installation package of the APP corresponding to the bicycle, a trigger condition for launching the APP corresponding to the bicycle is set as follows: The APP is automatically launched after the identity of the bicycle is obtained; or the APP is launched after the user operates the APP corresponding to the bicycle. Then, the user may set, in a setting option of the APP corresponding to the bicycle, whether to allow the mobile phone to automatically launch the APP corresponding to the bicycle. If the mobile phone is allowed to automatically launch the APP corresponding to the bicycle, the mobile phone performs step 703; or if the mobile phone is not allowed to automatically launch the APP corresponding to the bicycle, after step 702 is performed, before the APP corresponding to the bicycle is launched, the user is notified whether launching the APP corresponding to the bicycle is allowed, and the APP corresponding to the bicycle is launched when the user performs an operation.

In addition, if the mobile phone is in a screen lock state before automatically launching the APP corresponding to the bicycle, the mobile phone further needs to determine whether the APP corresponding to the bicycle is allowed to be launched automatically in the screen lock state. If the APP corresponding to the bicycle is allowed to be launched automatically in the screen lock state, the mobile phone automatically launches the APP corresponding to the bicycle. If the APP corresponding to the bicycle is not allowed to be launched automatically in the screen lock state, the mobile phone needs to prompt the user to unlock the mobile phone before automatically launching the APP corresponding to the bicycle.

Figure 10:
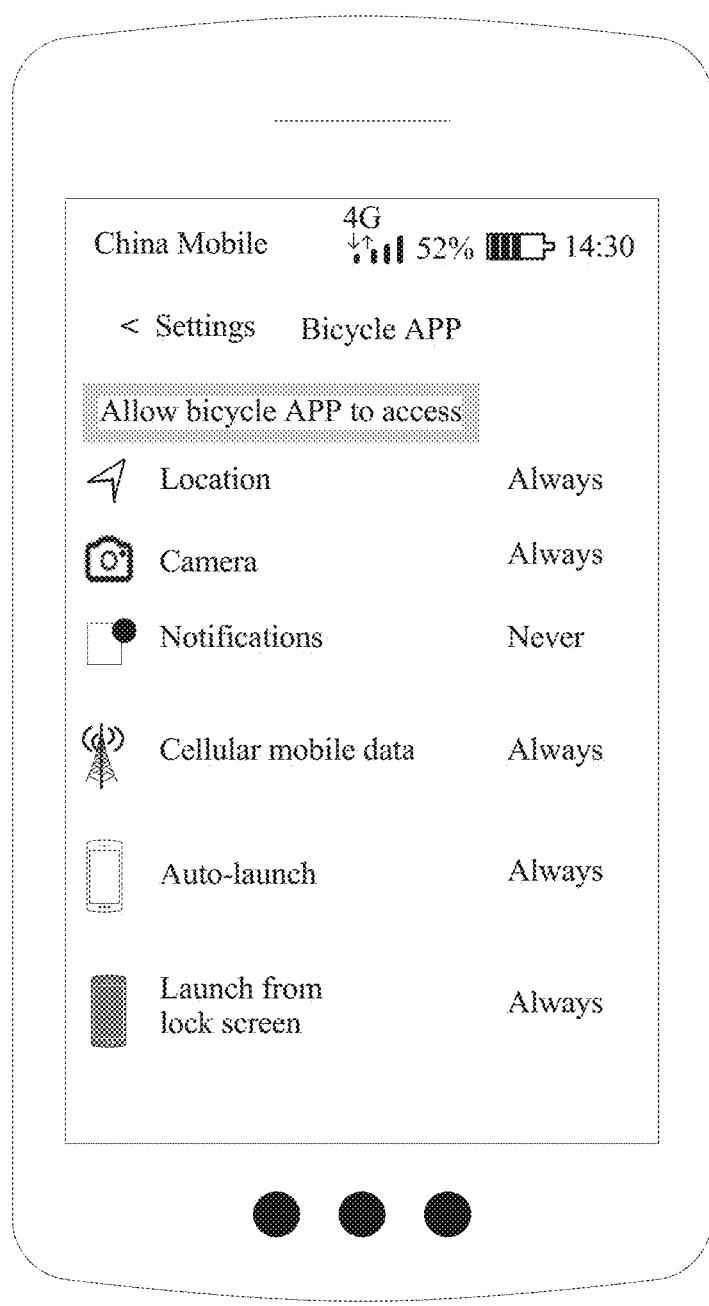
FIG. 10 is a schematic diagram of an interface for setting a launching permission of an APP corresponding to a bicycle according to an embodiment of this application.

For example, as shown in FIG. 10, the user may change a launch permission of the APP corresponding to the bicycle in the setting option of the APP corresponding to the bicycle. The launch permission includes: whether the APP corresponding to the bicycle is allowed to be launched automatically and whether the APP corresponding to the bicycle is allowed to be launched automatically in a screen lock state when the APP corresponding to the bicycle is allowed to be launched automatically. The launch permission may be specifically set to: Always, Just this time, Never, and the like.

It should be noted that Auto-launch shown in FIG. 10 refers to auto-launch after the identity of the bicycle is obtained, but does not refer to auto-launch when the mobile phone is powered on or when a system of the mobile phone is loaded.

After the mobile phone obtains the identity of the bicycle, as a client, the mobile phone may unlock the bicycle by performing the following step 704 with the server corresponding to the bicycle.

Step 704: The mobile phone and a server corresponding to the bicycle perform signaling interworking to unlock the bicycle.

In an implementation of this step, the mobile phone determines, based on the APP corresponding to the bicycle, an address of the server corresponding to the bicycle, and sends an unlocking request to the server corresponding to the bicycle. The unlocking request carries the identity of the bicycle and an identity of the mobile phone. After receiving the unlocking request, the server corresponding to the bicycle sends an unlocking instruction to the bicycle. The bicycle performs unlocking according to the received unlocking instruction, and sends a response to the server corresponding to the bicycle, to reply to the server corresponding to the bicycle that the bicycle is unlocked, and the server corresponding to the bicycle sends a notification message to the mobile phone. The notification message includes the identity of the unlocked bicycle. The notification message is used to notify the mobile phone that the bicycle is unlocked.

For a specific implementation process in which the mobile phone interacts with the server corresponding to the bicycle to unlock the bicycle described in step 704, refer to the prior art, and details are not described herein.

Figure 11:
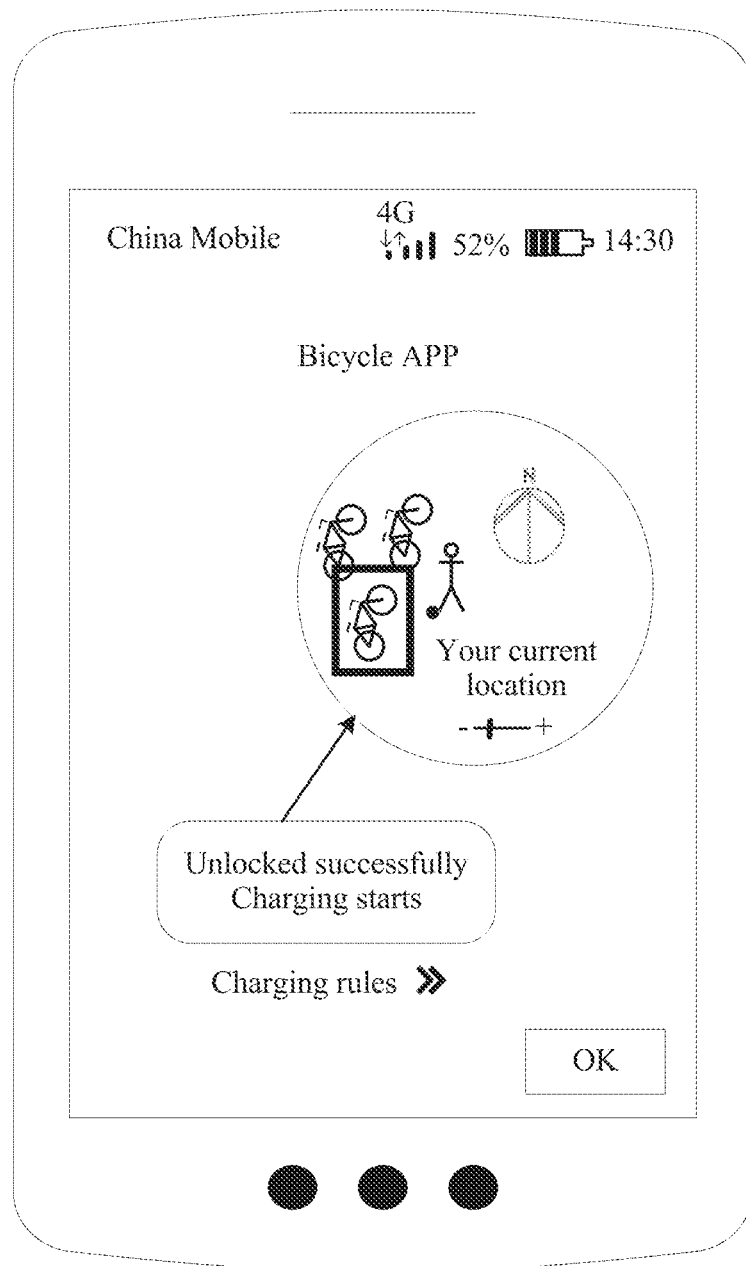
FIG. 11 is a schematic diagram of a prompt interface after a target bicycle is successfully unlocked according to an embodiment of this application.

For example, after the bicycle is successfully unlocked, the APP corresponding to the bicycle displays an interface shown in FIG. 11*a*, to notify the user that the bicycle is unlocked and charging starts. In addition, a schematic diagram of a preview of a relative correspondence between the unlocked bicycle and a current location of the user is shown, and based on the schematic diagram of the preview, the user may confirm that the bicycle is unlocked and may locate the unlocked bicycle.

After the mobile phone determines that the bicycle is unlocked, the mobile phone performs the following step 705 to automatically set a mode of a smartwatch to a riding mode.

Step 705: The mobile phone automatically sends a mode setting instruction to a smartwatch.

The mode setting instruction is used to set a motion mode of the smartwatch to the riding mode.

Optionally, the mode setting instruction includes the identity of the mobile phone, an identity of the smartwatch, and a value of a working mode of the smartwatch, and the smartwatch adjusts its working mode based on the value.

Step 706: The smartwatch loads a display interface in a riding mode according to the mode setting instruction.

The display interface is used to display user data obtained by the smartwatch in a bicycle riding process of the user.

Figure 12A:
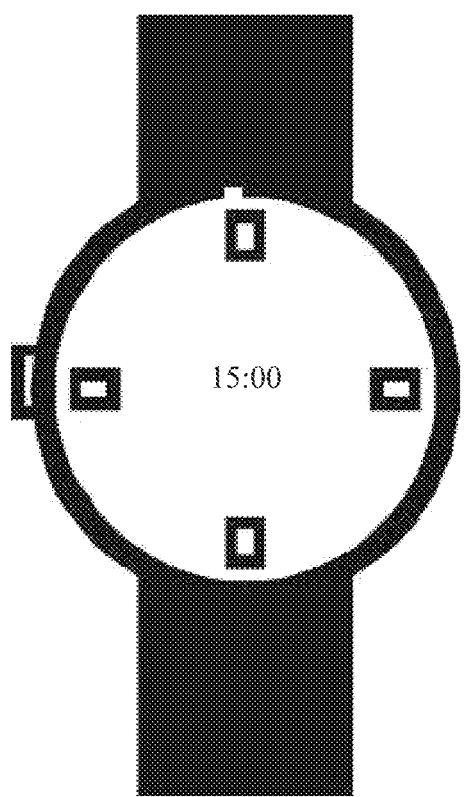
FIG. 12a is a schematic diagram of an interface before a smartwatch receives a mode setting instruction from a mobile phone according to an embodiment of this application.

For example, as shown in FIG. 12*a*, before the smartwatch receives the mode setting instruction sent by the mobile phone, a display interface of the smartwatch is a standby interface. The display interface is similar to that of a common watch and is mainly used to display time. After the smartwatch receives the mode setting instruction sent by the mobile phone, the display interface automatically jumps to a display interface in the riding mode shown in FIG. 12*c* without needing the user to perform any operation, and displayed data includes a current heart rate, ride mileage, and current time. It can be learned that, in FIG. 1*c*, the user needs to perform a setting operation, for example, tap on or slide a currently displayed interface, to enable the smartwatch to jump to the display interface that can record the data such as the heart rate of the user in the riding mode. In the method of this application, the setting operation of the user is omitted, and the smartwatch can automatically enter the riding mode and record the heart rate data in the riding mode.

Figure 12B:
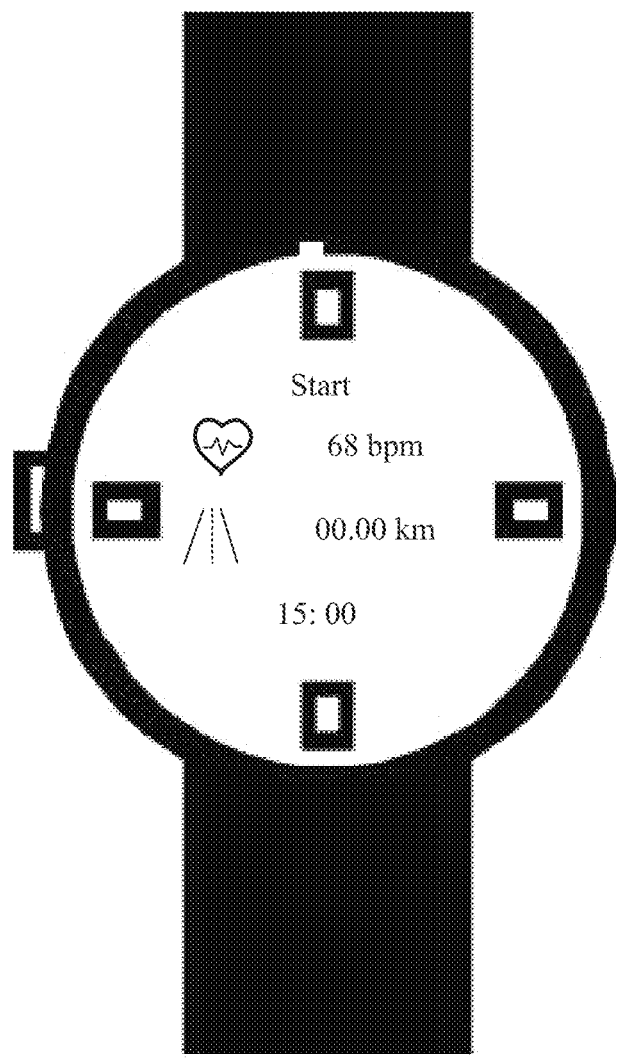
FIG. 12b is a schematic diagram of a display interface in a riding mode automatically loaded after a smartwatch receives a mode setting instruction from a mobile phone according to an embodiment of this application.
Figure 12C:
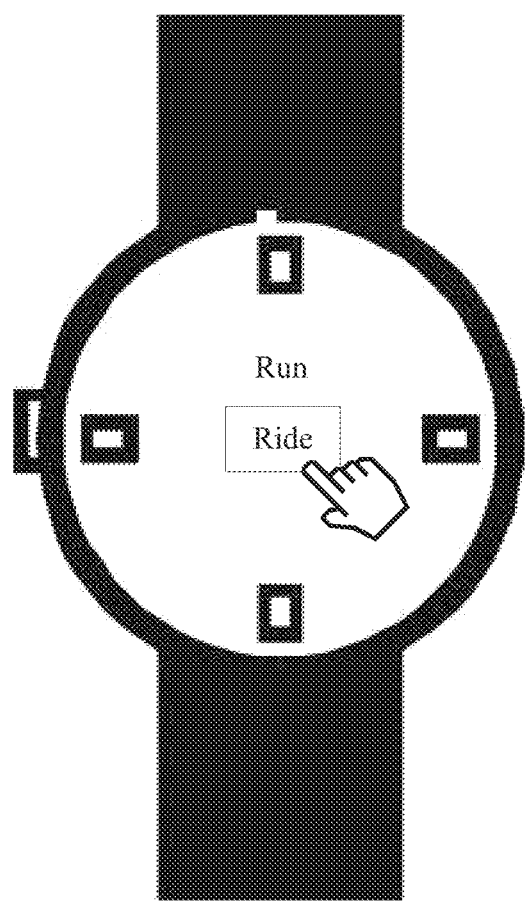
FIG. 12c is a schematic diagram of a display interface in which a smartwatch prompts a user to enter a riding mode after receiving a mode setting instruction from a mobile phone according to an embodiment of this application.

Optionally, before the smartwatch jumps from the standby interface shown in FIG. 12*a* to the display interface in the riding mode shown in FIG. 12*c*, as shown in FIG. 12*b*, the smartwatch prompts the user whether to enter the riding mode, and after confirmation by the user, the display interface jumps to the interface shown in FIG. 12*c*.

Step 707. In a riding process, the smartwatch records user data.

The user data includes physiological data such as a heart rate and blood pressure, and may further include motion data such as a motion track and motion duration.

When the user locks the bicycle, it indicates that the riding ends. The bicycle, the mobile phone, and the server corresponding to the bicycle interact with each other by performing the following step 708 to notify the mobile phone that the bicycle is locked.

Step 708: Lock the bicycle and end riding.

In this embodiment of this application, the step includes the following: After the bicycle detects that the bicycle is locked, the bicycle sends a notification that the riding ends to the server of the bicycle after the bicycle is locked, and then the server of the bicycle sends the notification that the riding ends to the mobile phone. The mobile phone then notifies the smartwatch by performing the following step 709 that the user ends the riding.

Step 709: The mobile phone sends a notification message to the smartwatch.

The notification message is used to notify the smartwatch that the user ends the riding. After receiving the notification message, the smartwatch reports the user data in the riding process to the mobile phone. The smartwatch may further exit the current riding mode and resume a working mode set by default.

Optionally, the notification message carries the identity of the mobile phone, the identity of the smartwatch, an indication field used to notify the smartwatch that the riding ends, and the like.

It can be learned that, in comparison with the prior art shown in FIG. 1 in which the user needs to manually disable the riding mode of the smartwatch after the riding ends, in this embodiment of this application, after the riding ends, the mobile phone automatically notifies the smartwatch that the riding ends and after receiving the notification, the smartwatch may automatically report the user data to the mobile phone and exit the display interface in the riding mode without needing the user to perform any operation.

Step 710: The smartwatch reports the user data to the mobile phone.

Step 711: The mobile phone receives and displays the user data reported by the smartwatch.

Step 712: The smartwatch exits the display interface in the riding mode.

Optionally, in a possible implementation of this embodiment of this application, after the riding ends, the mobile phone synchronizes the user data reported by the smartwatch to the APP corresponding to the bicycle, a sports and health APP installed on the mobile phone, and the like.

Optionally, in another possible implementation of this embodiment of this application, the smartwatch may alternatively report the obtained user data to the mobile phone in real time in the riding process, and the mobile phone displays and synchronizes the user data to the APP corresponding to the shared bicycle, a sports and health APP installed on the mobile phone, and the like.

Figure 13A:
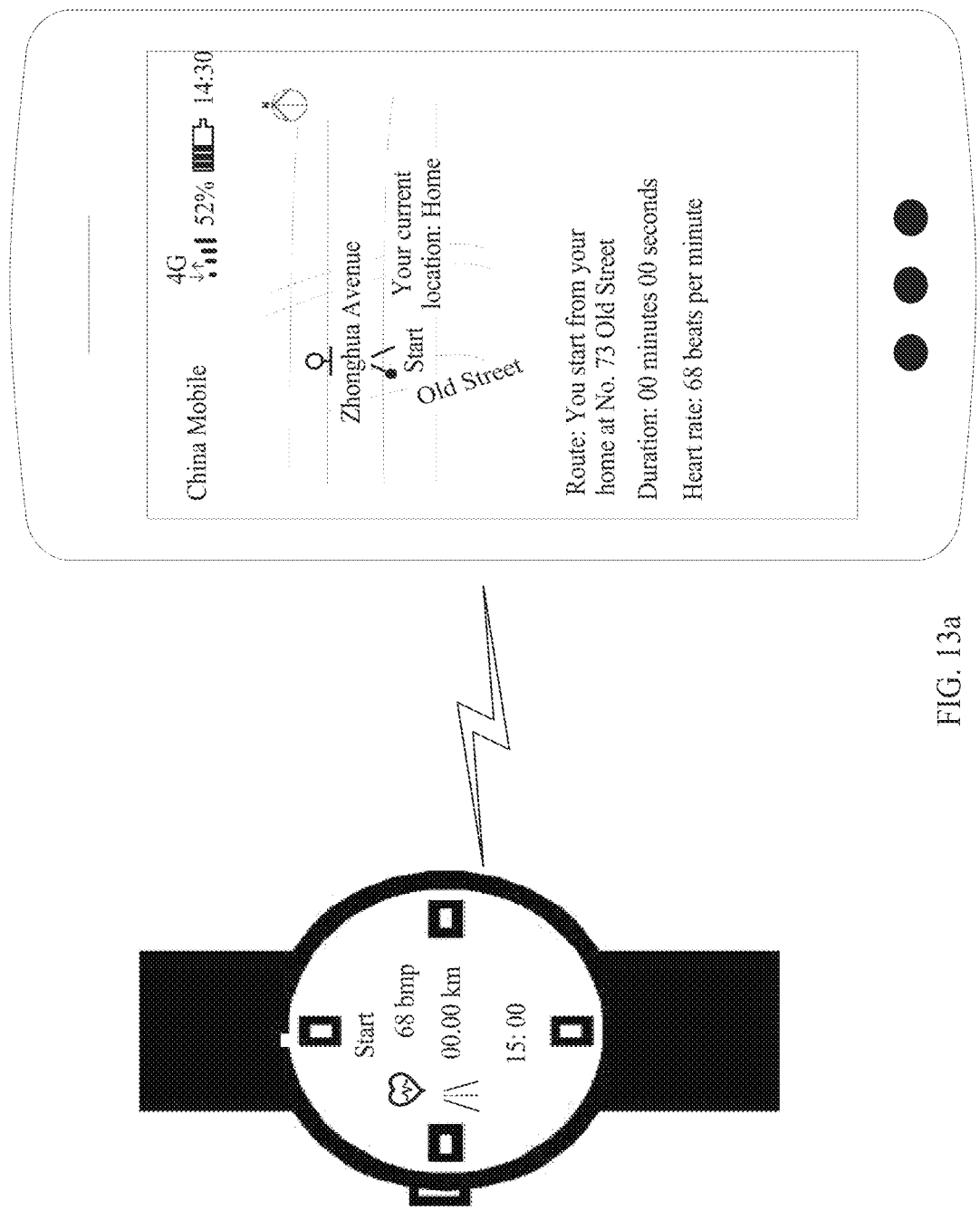
FIG. 13a, FIG. 13b, and FIG. 13c are sequentially schematic diagrams of interfaces of a smartwatch and a mobile phone when riding starts, interfaces of the smartwatch and the mobile phone during riding, and interfaces of the smartwatch and the mobile phone when riding ends according to an embodiment of this application.
Figure 13B:
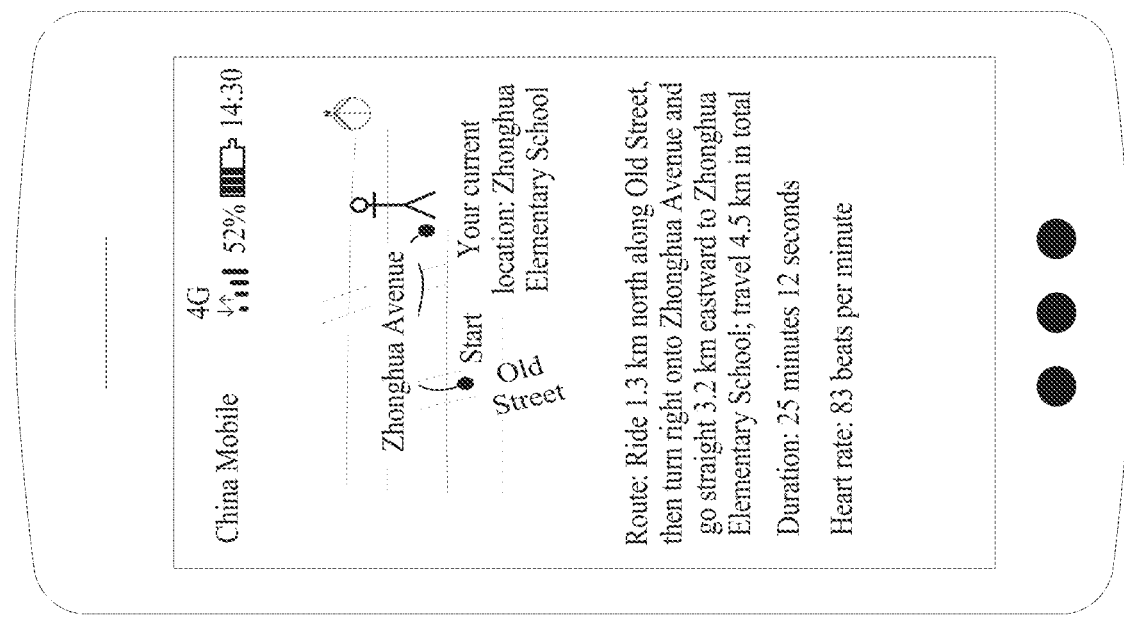
Figure 13B:
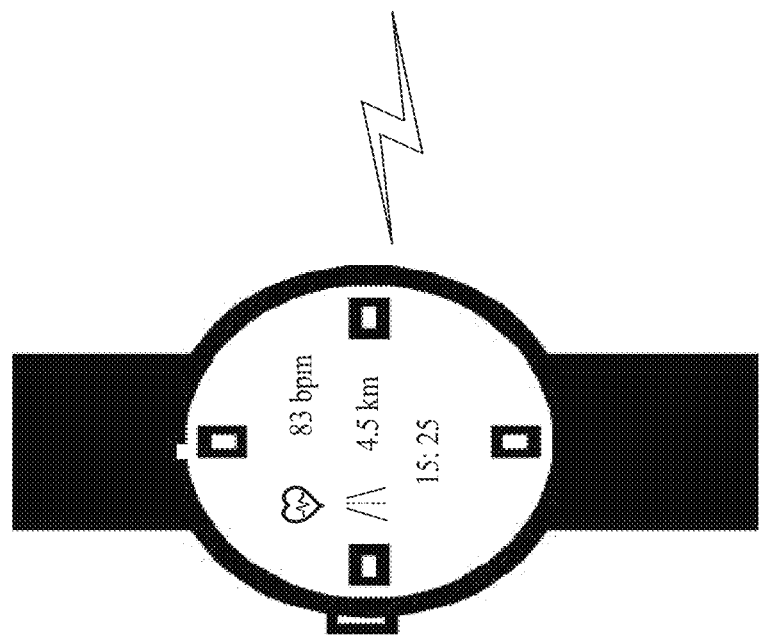
Figure 13C:
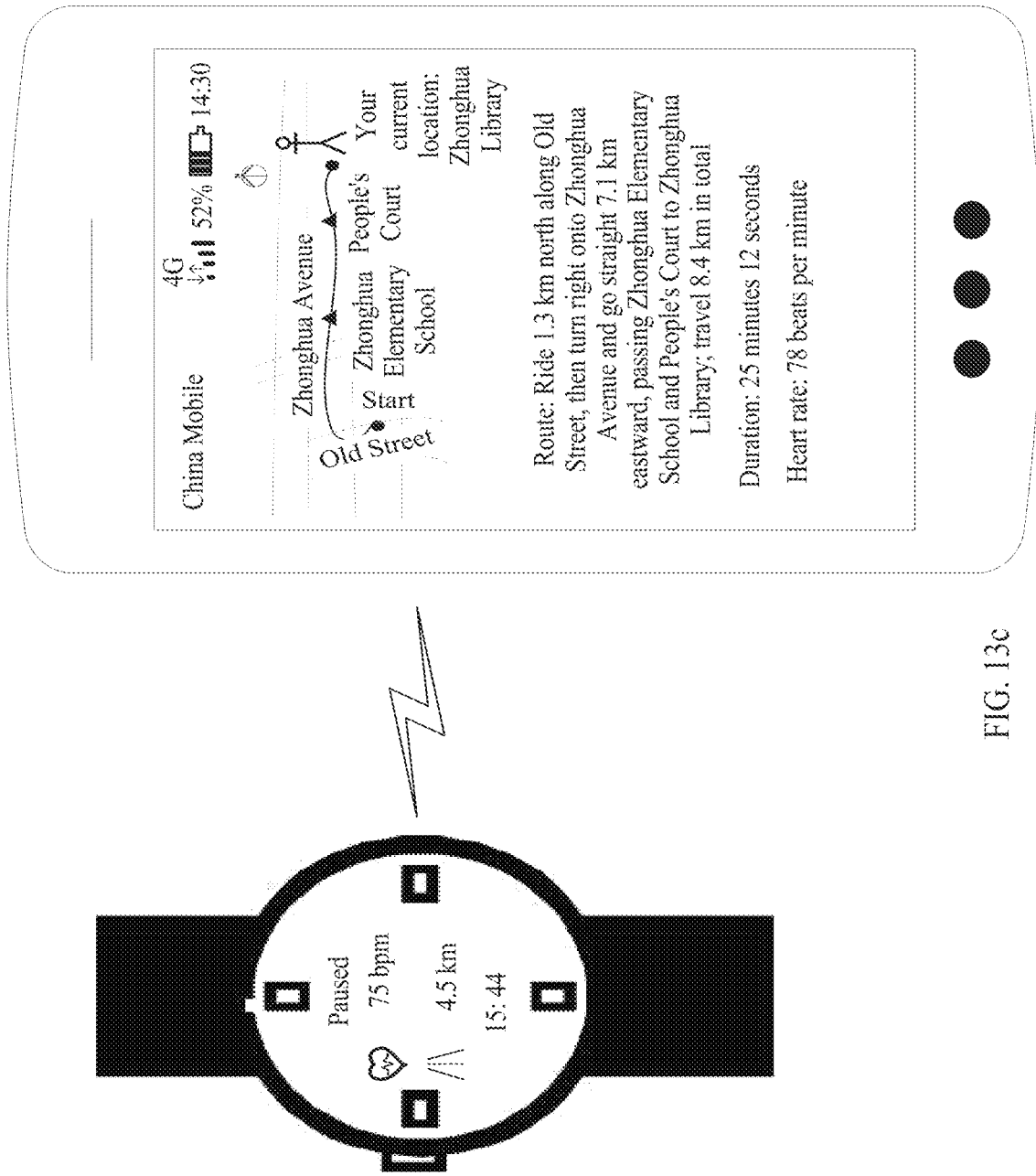

FIG. 13*a* to FIG. 13*c* are respectively schematic diagrams of recording physiological data and motion tracks, such as a riding route and riding duration, at the beginning of riding, in a riding process, and after the riding ends by the smartwatch and the mobile phone by using the foregoing method.

Figure 14A:
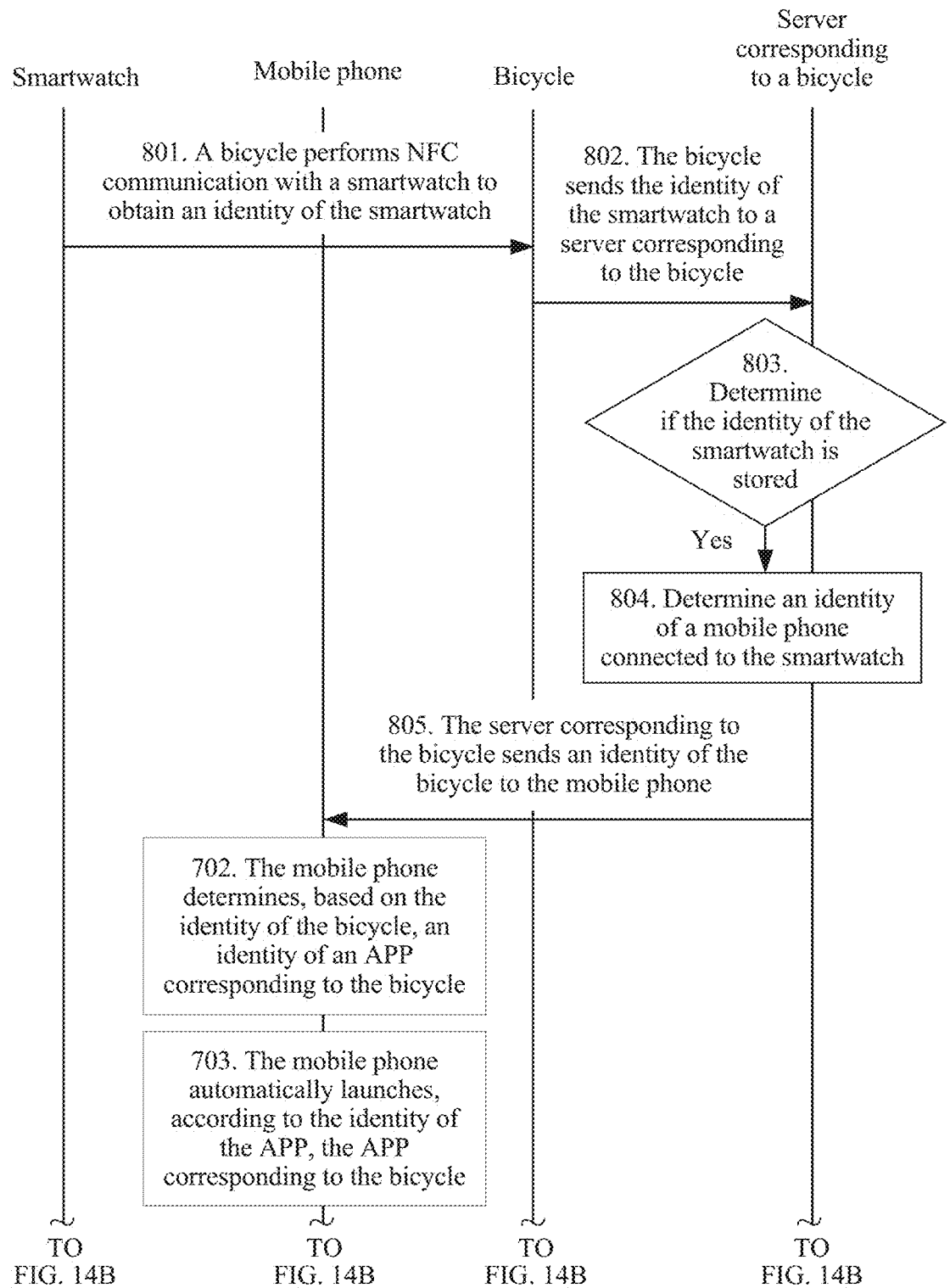
FIG. 14A and FIG. 14B is a schematic flowchart of still another data transmission method according to an embodiment of this application.
Figure 14B:
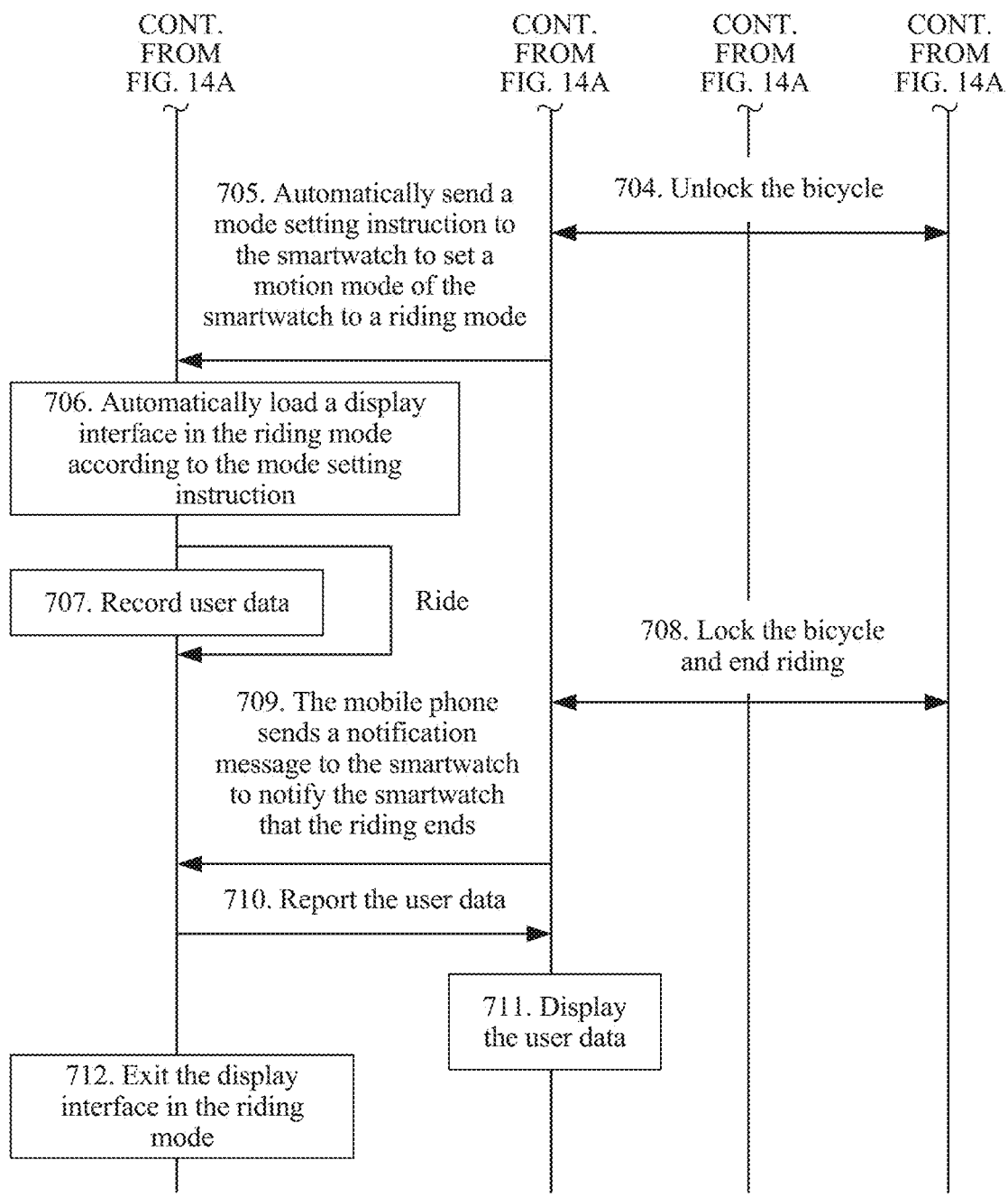

Optionally, when an NFC module is separately disposed in the bicycle and the watch, and the bicycle and the watch can perform NFC communication, an embodiment of this application further provides a data transmission method. As shown in FIG. 14A and FIG. 14B, the method includes the following steps.

Step 801: When a distance between a bicycle and a smartwatch falls within a range of a preset distance, the bicycle performs NFC communication with the smartwatch to obtain an identity of the smartwatch.

The preset distance is a distance within which NFC communication can be performed and that is specified in an NFC protocol. For specific implementation of NFC communication, refer to the prior art, and details are not described herein.

Step 802: The bicycle sends the identity of the smartwatch to a server corresponding to the bicycle.

Step 803: The server corresponding to the bicycle determines, according to the identity of the smartwatch, whether the server corresponding to the bicycle stores the identity of the smartwatch.

As a client on which an application corresponding to the bicycle is installed, a mobile phone usually requires a user to use an account and a password to log in to the application before the user uses the application. Therefore, a correspondence among an account used by the user to register the application corresponding to the bicycle, an identity of the mobile phone of the user, and an identity of a watch connected to the mobile phone may be pre-established and stored on the server. In this way, when this step is performed, the server corresponding to the bicycle confirms whether the identity of the smartwatch is stored, and if the identity of the smartwatch is stored, the following step 804 is performed to further confirm the identity of the mobile phone associated with the smartwatch.

Step 804: The server corresponding to the bicycle determines an identity of a mobile phone connected to the smartwatch.

Step 805: The server corresponding to the bicycle sends an identity of the bicycle to the mobile phone.

After step 805 is performed, step 702 to step 712 may be performed, and details are not described again in this embodiment of this application.

In this embodiment of this application, the bicycle may actively read the identity of the smartwatch by performing NFC communication with the smartwatch. After determining that the identity of the smartwatch is valid, the bicycle sends the identity of the bicycle to the mobile phone connected to the smartwatch, and then after obtaining the identity of the bicycle, the mobile phone can automatically launch the APP corresponding to the bicycle and unlock the bicycle. In addition, a motion mode of the smartwatch is automatically set to a riding mode after the bicycle is unlocked. After riding ends, the mobile phone then automatically notifies the smartwatch that the riding ends, and the smartwatch is triggered to report user data to the mobile phone. It can be learned that in a process from unlocking the bicycle to obtaining motion state data of the user in a riding process, the user does not need to perform any operation, thereby implementing an automatic operation.

It should be noted that in step 801, the bicycle actively reads the identity of the smartwatch because a size of the smartwatch is usually small and it may be inconvenient to install an antenna for reading an NFC identity of the smartwatch. Therefore, due to a limitation of the antenna, usually the bicycle actively reads the identity of the smartwatch. However, with development of technologies, the smartwatch may also actively read the NFC identity of the bicycle, and then may send the NFC identity of the bicycle to the mobile phone, so that step 701 to step 712 may also be performed.

Figure 15A:
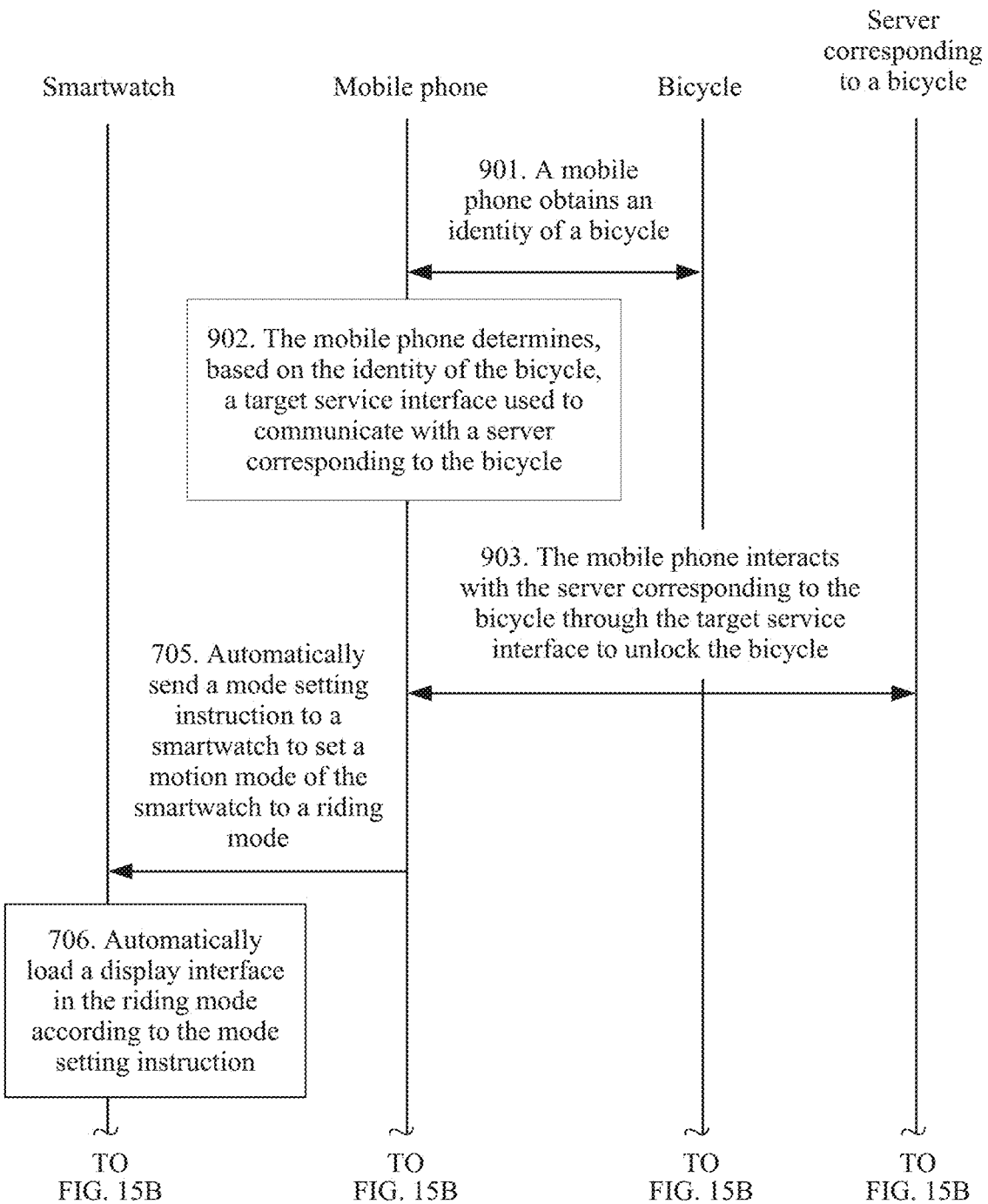
FIG. 15A and FIG. 15B is a schematic flowchart of yet another data transmission method according to an embodiment of this application.
Figure 15B:
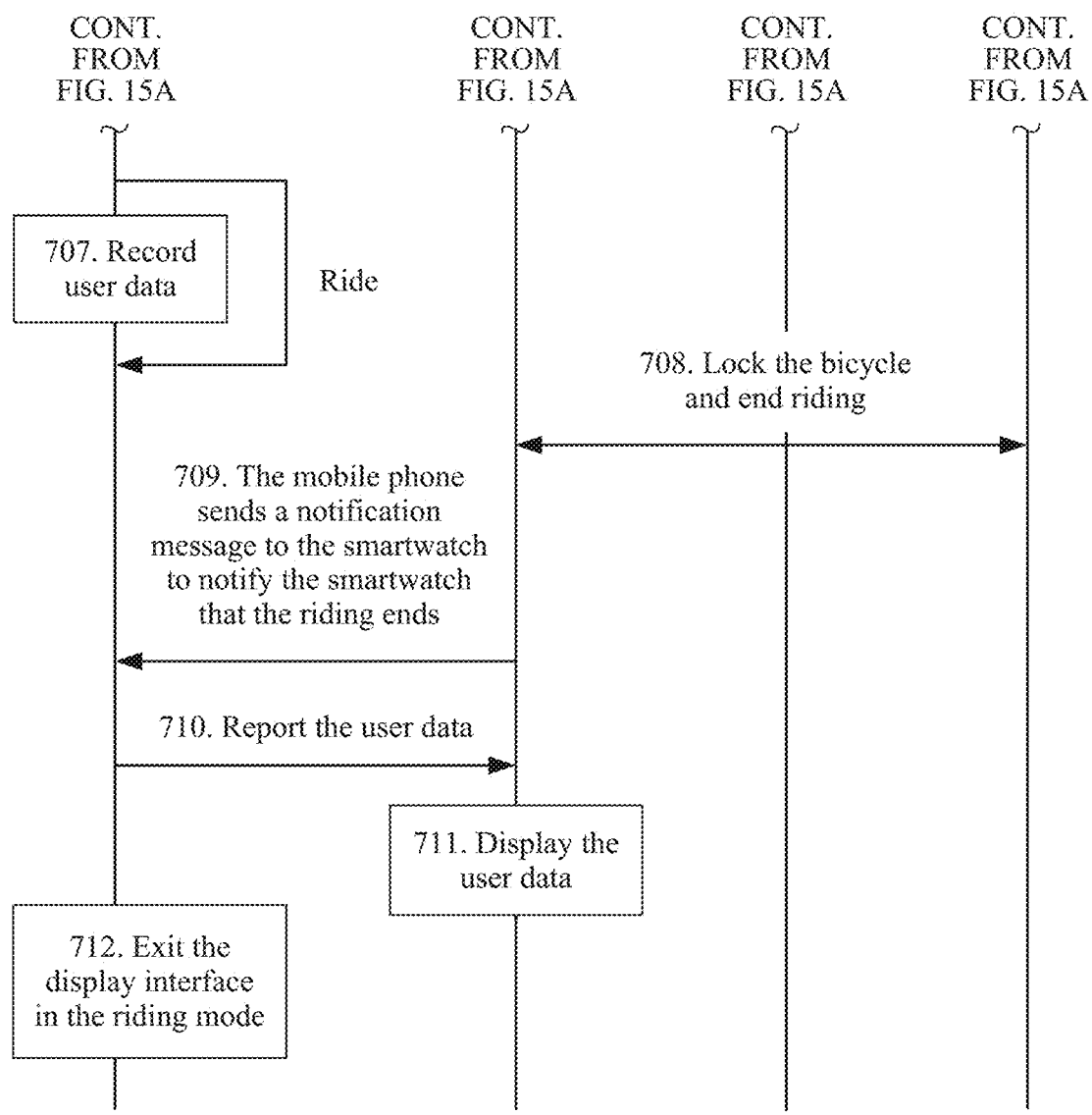

Optionally, if the APP corresponding to the bicycle is not installed on the mobile phone, an embodiment of this application further provides a data transmission method. As shown in FIG. 15A and FIG. 15B, the method includes the following steps.

Step 901: A mobile phone may obtain an identity of a bicycle by performing step 701 or step 801 to step 803.

Step 902: The mobile phone determines, based on the identity of the bicycle, a target service interface used to communicate with a server corresponding to the bicycle.

The target service interface may be an interface defined based on a bicycle SDK embedded in the mobile phone, or may be a network interface that can be accessed through network communication.

Figure 16A:
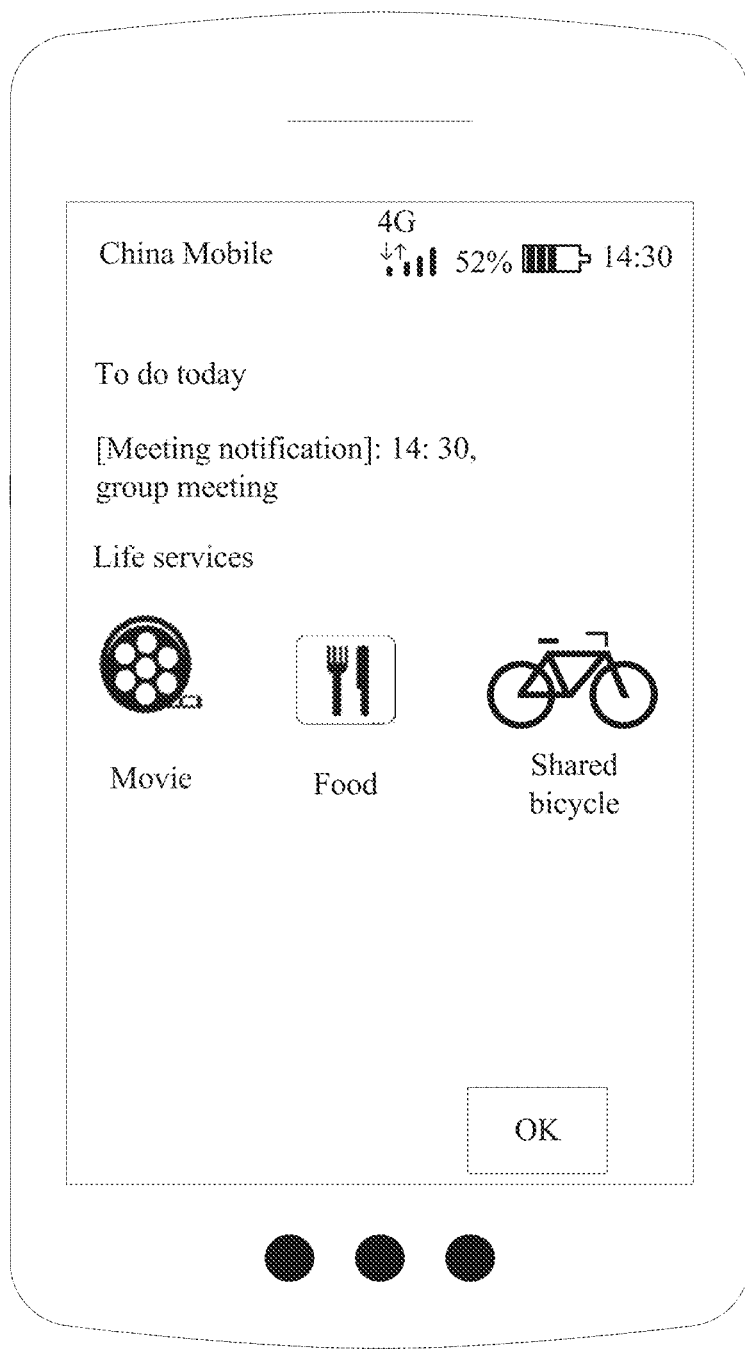
FIG. 16a and FIG. 16b are schematic diagrams of interfaces that provide a shared bicycle quick service according to an embodiment of this application.
Figure 16B:
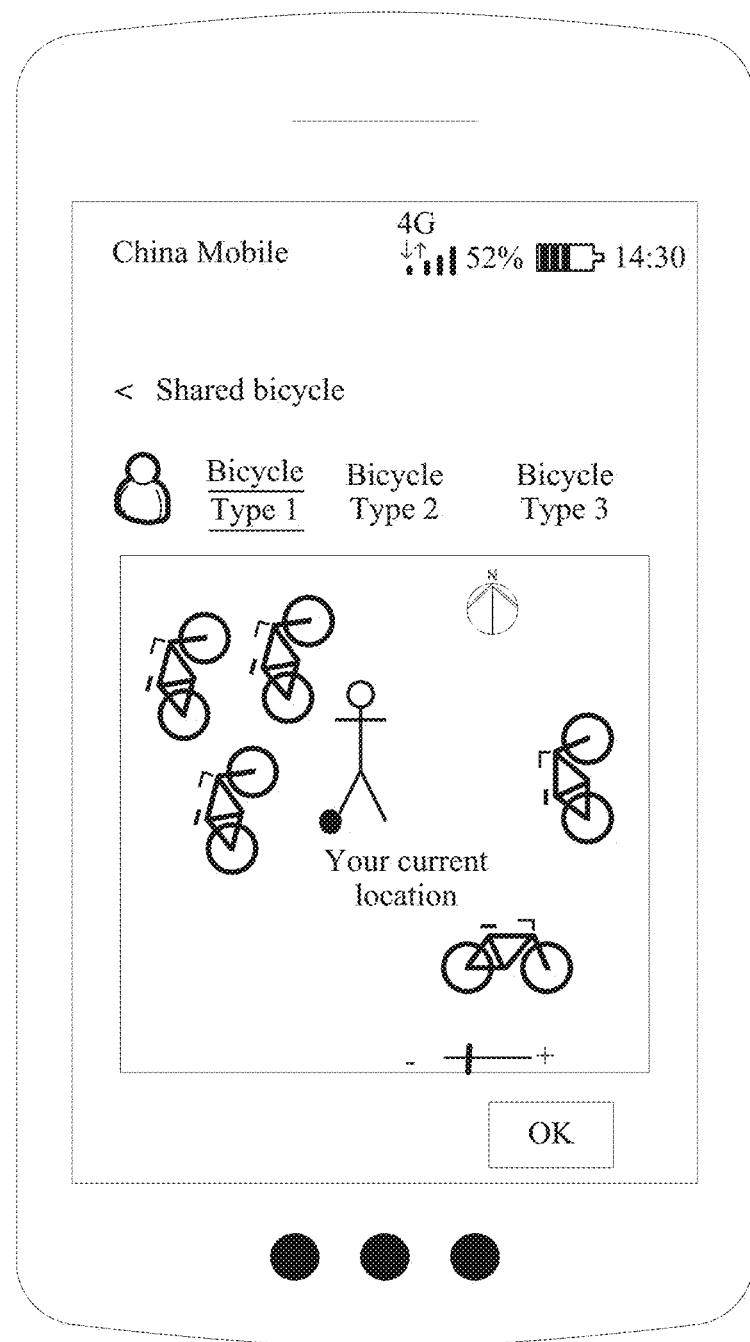

In practical application, the mobile phone may store a plurality of types of bicycle SDKs. As shown in FIG. 16*a*, a quick service interface diagram is provided in this embodiment of this application. In the quick service interface diagram, the mobile phone provides a bicycle service for a user when an APP corresponding to the bicycle is not installed on the mobile phone. In normal use, the user may tap a bicycle icon shown in the quick service interface diagram, and then the mobile phone searches, for the user, for all available bicycles that meet a specific condition (for example, within a distance range from the user) according to the operation of the user. Types of the available bicycles are not limited. For example, the available bicycles not only include bicycles from vendor A, but also include bicycles from vendor B, vendor C, and the like. As shown in FIG. 16*b*, the mobile phone loads a list of all available bicycles and shows a distance between each bicycle and the user, and then the user can unlock a desired target bicycle depending on a need of the user.

Step 903: The mobile phone interacts with the server corresponding to the bicycle through the target service interface to unlock the bicycle.

For a specific implementation process of this step, refer to step 704. A difference lies in that the mobile phone communicates with the server corresponding to the bicycle through the target service interface.

After step 903 is performed, the mobile phone may perform step 705 to step 712, and details are not described again in this embodiment of this application.

Figure 17:
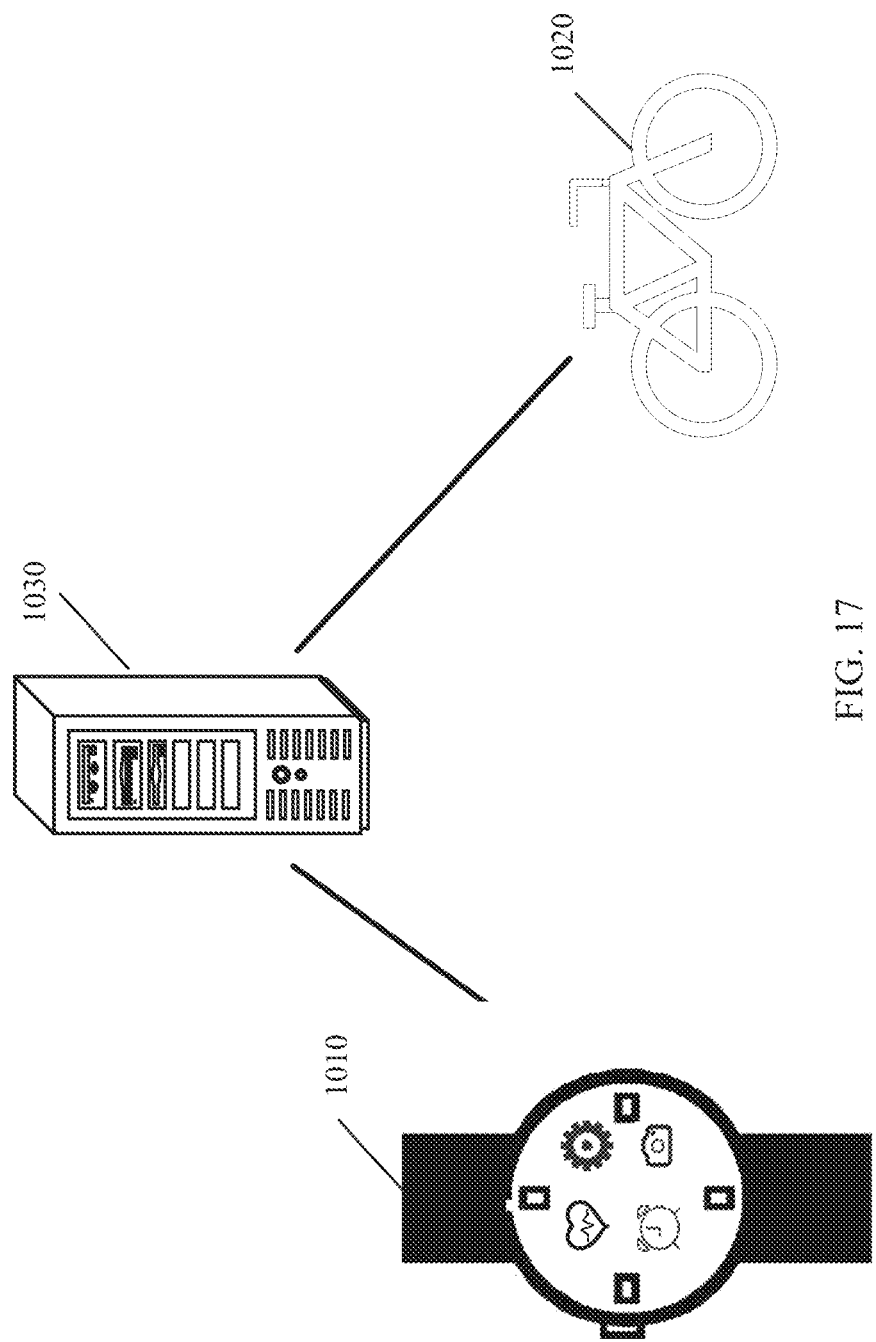
FIG. 17 is a schematic architecture diagram of another data transmission system according to an embodiment of this application.

This application provides another data transmission system. As shown in FIG. 17, the data transmission system includes a terminal 1010, a bicycle 1020, and a server 1030 corresponding to the bicycle. The terminal 1010 is a device that can not only unlock the bicycle but also collect physiological data of a user such as a heart rate, blood pressure, and blood glucose. For example, the terminal 1010 may be a smartwatch or a smart band that can not only unlock the bicycle but also collect the physiological data of the user. An application corresponding to the bicycle may be installed on the smartwatch to unlock the bicycle. With development of science and technologies, a device in a form of a mobile phone, a computer, or the like may also have a function of collecting physiological data such as a heart rate, blood pressure, and blood glucose of the user. Therefore, the terminal 1010 may alternatively be a device such as a mobile phone, a tablet computer, a notebook computer, an ultra-mobile personal computer, a netbook, a personal digital assistant, or the like.

The terminal 1010, the bicycle 1020, and the server 1030 of the bicycle establish connections to communicate with each other. The connection manner may be a Bluetooth connection, a 2G connection, a 3G connection, a 4G connection, a 5G connection, a Wi-Fi connection, or the like.

Figure 18:
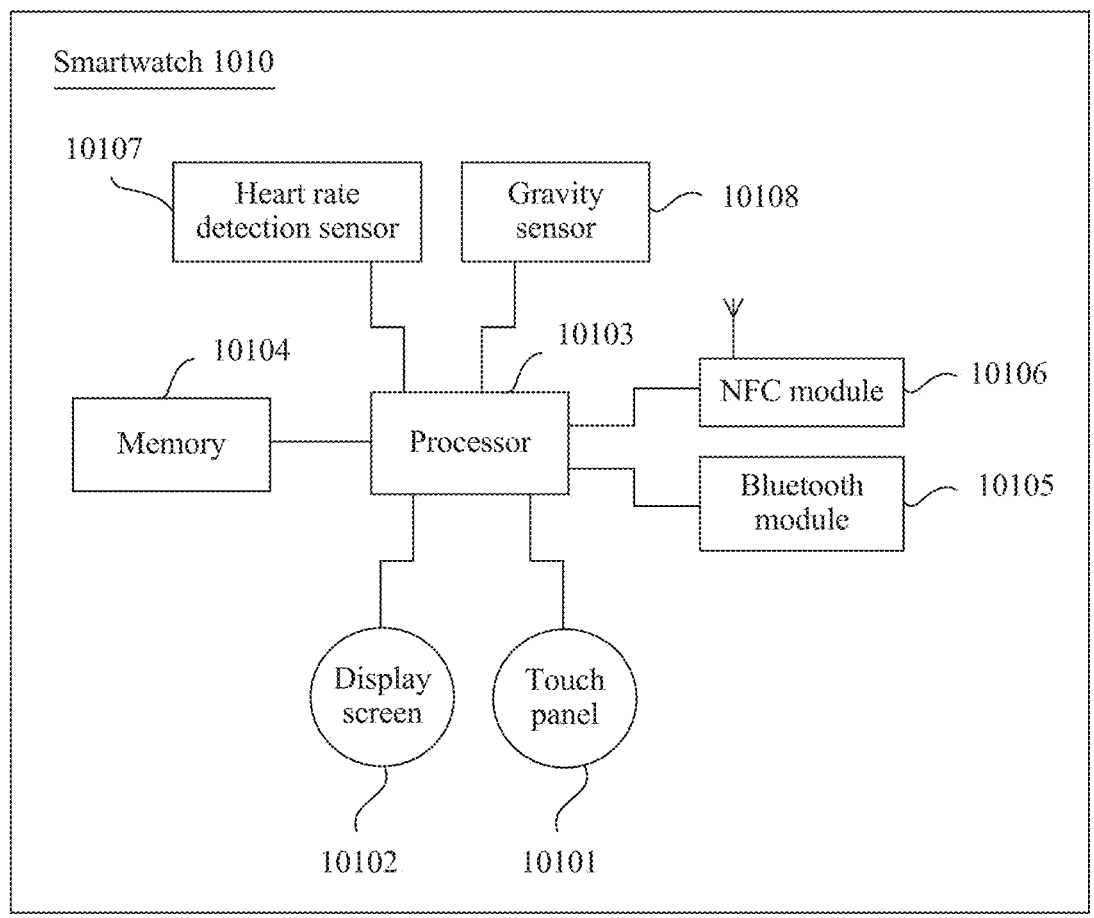
FIG. 18 is a schematic structural diagram of another smartwatch according to an embodiment of this application.

FIG. 18 shows an example in which the terminal 1010 is a smartwatch. The smartwatch includes a touch panel 10101 (also referred to as a touchscreen), a display screen 10102, a processor 10103, a memory 10104, a Bluetooth module 10105, an NFC module 10106, a heart rate detection sensor 10107, a gravity sensor 10108, and the like. Although not shown in the figure, the terminal 1010 may further include an antenna, a Wi-Fi module, a GPS module, a speaker, an accelerometer, a gyroscope, a power supply, a power management system, and the like.

Specifically, for specific implementation of the touch panel 10101, refer to the touchscreen 231 or the touchscreen 301 described above. For specific implementation of the display screen 10102, refer to the display panel 241 or the display screen 302 described above. For specific implementation of the processor 10103, refer to the processor 270 or the processor 303 described above. For specific implementation of the memory 10104, refer to the memory 220 or the memory 305 described above. For specific implementation of the Bluetooth module 10105, refer to the Bluetooth module 211 or 308 described above. For specific implementation of the NFC module 10106, refer to the NFC module 212 described above. For specific implementation of the heart rate detection sensor 10107, refer to the heart rate detection sensor 310 described above. For specific implementation of the gravity sensor 10108, refer to the gravity sensor 250 or the gravity acceleration sensor 311 described above. For specific implementation of the power supply 10109, refer to the power supply 280 described above, and the like. Details are not described again in this embodiment of this application.

For specific implementation of the bicycle 1020, refer to the bicycle 400 described above. Details are not described again in this embodiment of this application.

Figure 19:
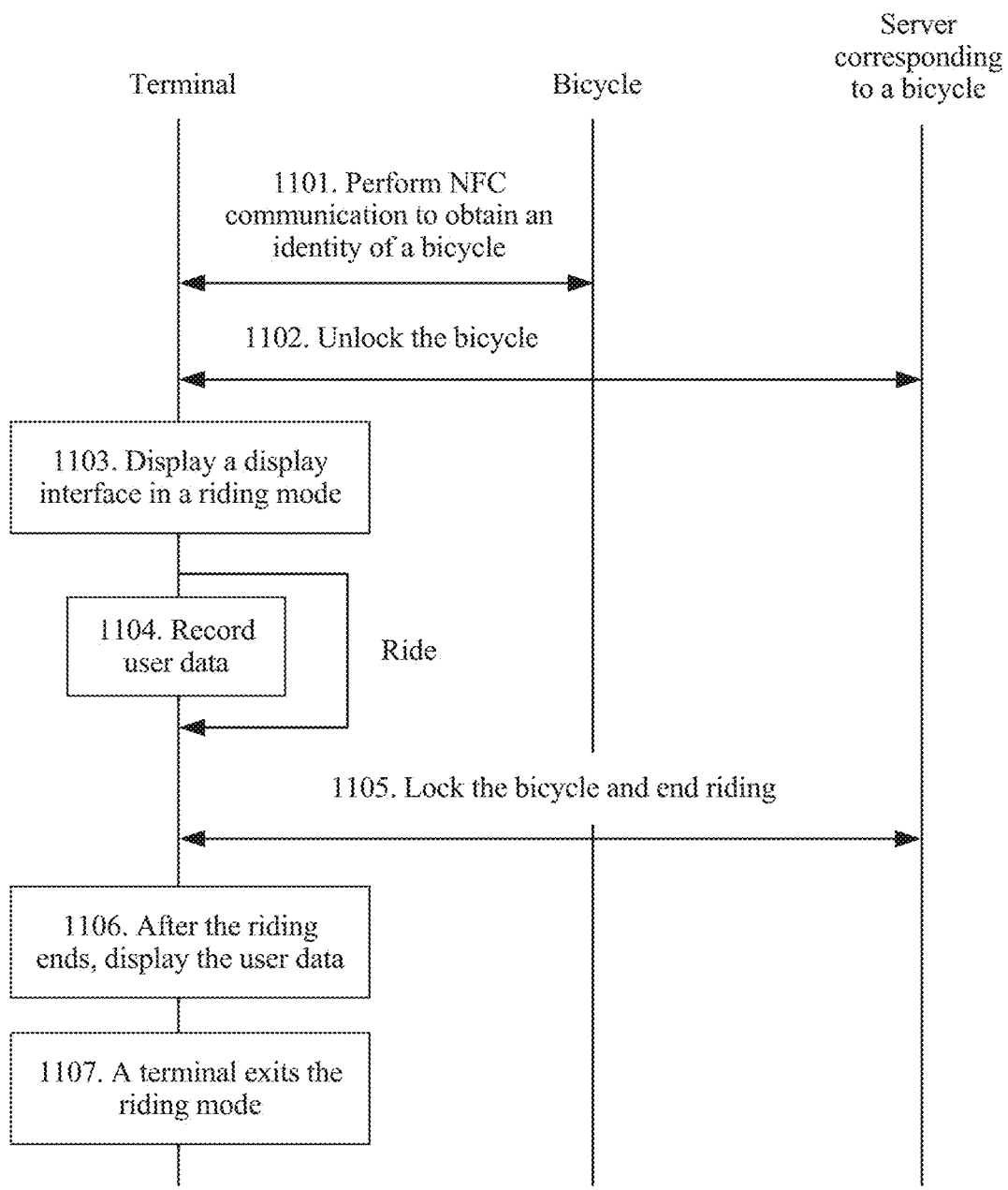
FIG. 19 is a schematic flowchart of a data transmission method in a system architecture shown in FIG. 17 according to an embodiment of this application.

An embodiment of this application provides a data transmission method that may be applied to the system architecture shown in FIG. 17. As shown in FIG. 19, the method includes the following steps:

Step 1101: A terminal performs NFC communication with a bicycle to automatically obtain an identity of the bicycle.

Step 1102: The terminal, the bicycle, and a server of the bicycle interact with each other to unlock the bicycle.

When an APP corresponding to the bicycle is installed on the terminal, for specific implementation of this process, refer to step 702 to step 704. Details are not described herein again. When a plurality of types of quick services are provided on the terminal, for specific implementation of this process, refer to step 902 and step 903. Details are not described herein again.

Step 1103: The terminal displays a display interface in a riding mode.

For specific implementation of this step, refer to step 706, and details are not described herein again.

Step 1104: The terminal records user data in a user riding process.

Step 1105: Lock the bicycle and end riding.

For specific implementation of this step, refer to step 708, and details are not described again in this embodiment of this application.

Step 1106: After the riding ends, the terminal displays user data such as physiological data and a motion track of the user.

For specific implementation of this step, refer to step 711, and details are not described herein again.

Step 1107: The terminal exits the riding mode.

In the data transmission method, after detecting that the bicycle is unlocked, the terminal can enter the riding mode without manual setting of the user, and load the display interface in the riding mode, so as to display the obtained user data in the user riding process through the display interface. In the method provided in this embodiment of this application, when the user starts to use a shared bicycle for riding, user data in the riding process is automatically displayed without needing the user to perform any operation, thereby reducing a user operation.

An embodiment of this application provides a bicycle unlocking method. The method is applied to a system that includes a first terminal and a bicycle, and an NFC module is separately installed in the first terminal and the bicycle. The method includes the following: The first terminal performs, by using the NFC module, NFC communication with the bicycle to obtain an identity of the bicycle, the first terminal sends an unlocking request to a server corresponding to the bicycle, where the unlocking request carries the identity of the bicycle; and the first terminal receives a first notification message sent by the server corresponding to the bicycle, where the first notification message is used to notify the first terminal that the bicycle is unlocked.

Optionally, after receiving the unlocking request sent by the first terminal, the server corresponding to the bicycle sends an unlocking instruction to the bicycle, and when the bicycle replies with a notification that the bicycle is unlocked, the server corresponding to the bicycle sends the first notification message to the first terminal.

Optionally, before the first terminal sends the unlocking request to the server corresponding to the bicycle, the method further includes the following: The first terminal determines, based on the identity of the bicycle, an identity of an application corresponding to the bicycle and launches the application. After launching the application, the first terminal, serving as a client, sends the unlocking request to the server corresponding to the bicycle by using the application.

Optionally, after receiving the first notification message sent by the server of the bicycle, the first terminal sends a mode setting instruction to a second terminal, so that the second terminal enters a riding mode according to the mode setting instruction.

Optionally, the first terminal receives a second notification message sent by the server of the bicycle, where the second notification message is used to notify the first terminal that riding ends, and then the first terminal sends a third notification message to the second terminal, where the third notification message is used to instruct the second terminal to exit the riding mode.

The first terminal may be a device such as a mobile phone, a tablet computer, a notebook computer, an ultra-mobile personal computer, a netbook, or a personal digital assistant. The second terminal is a wearable device that can collect physiological data (for example, a heart rate, blood pressure, and blood glucose) of a user, such as a smartwatch or a smart band.

For specific implementation of the method, refer to the methods shown in FIG. 5, FIG. 5a-1 and FIG. 5a-2, and FIG. 5b. Details are not described herein again.

It should be noted that the first terminal and the second terminal may be a same terminal, and the first terminal enters the riding mode according to the first notification message after receiving the first notification message sent by the server of the bicycle. When receiving the second notification message that is sent by the server of the bicycle and that is used to notify the first terminal that the riding ends, the first terminal exits the riding mode.

The foregoing mainly describes the solutions provided in the embodiments of this application from a perspective of interaction between network elements. It may be understood that, to implement the foregoing functions, each of network elements, such as the bicycle and the terminal, includes a corresponding hardware structure and/or software module for performing each function. A person of ordinary skilled in the art should easily be aware that, with reference to the example units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, various network elements may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example and is only logical function division. There may be another division manner in practical implementation.

Figure 20:
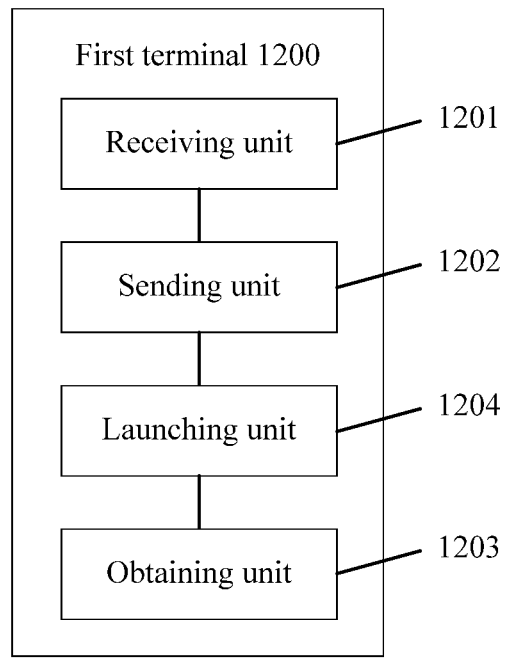
FIG. 20 is a schematic structural diagram of a first terminal according to an embodiment of this application.

When each function module is obtained through division based on each corresponding function, FIG. 20 is a possible schematic structural diagram of the first terminal in the foregoing embodiments. A first terminal 1200 includes a receiving unit 1201 and a sending unit 1202. The receiving unit 1201 is configured to support the first terminal in receiving a first notification message, where the first notification message is used to notify the first terminal that a target bicycle is in an available state. The sending unit 1202 is configured to send a mode setting instruction to a second terminal according to the first notification message received by the receiving unit 1201, where the mode setting instruction is used to instruct the second terminal to enter a riding mode.

Optionally, an obtaining unit 1203 is further included, and is configured to: support the first terminal in automatically obtaining an identity of the target bicycle; for example, when a distance between the first terminal and the target bicycle is less than or equal to a preset distance, perform near field communication NFC with the target bicycle to automatically obtain the identity of the target bicycle, where the preset distance is a distance within which NFC communication can be performed and that is specified in an NFC protocol. A launching unit 1204 is included and is configured to: determine, based on the identity of the target bicycle obtained by the obtaining unit 1203, an identity of an application corresponding to the target bicycle; and launch, according to the identity of the application, the application corresponding to the target bicycle.

All related content of the steps in the foregoing method embodiments may be cited in function descriptions of corresponding function modules. Details are not described herein again.

Figure 20A:
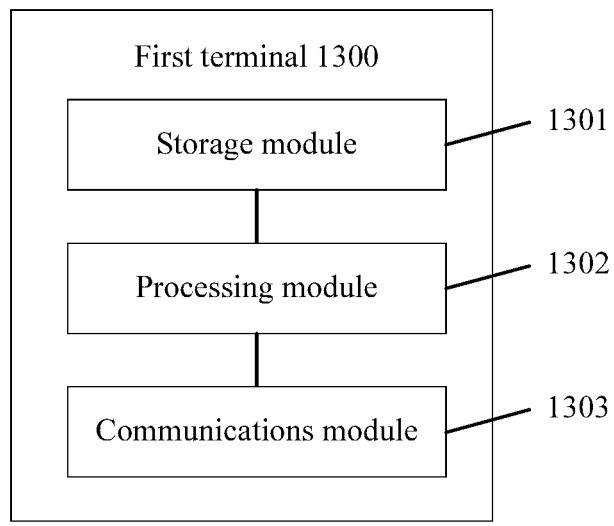
FIG. 20a is another schematic structural diagram of a first terminal according to an embodiment of this application.

When an integrated unit is used, FIG. 20a is a possible schematic structural diagram of the first terminal in the foregoing embodiments. A first terminal 1300 includes a processing module 1302 and a communications module 1303. The processing module 1302 is configured to control and manage an action of the first terminal. For example, the processing module 1302 is configured to support the first terminal in performing processes 507a, 508a, and 509a in FIGS. 507b and 508b in FIG. 5b, and 601a in FIG. 6a and/or is configured to perform another process of the technology described in this specification. The communications module 1303 is configured to support communication between the first terminal and another network entity, for example, communication between the first terminal and the second terminal, the bicycle, and the server corresponding to the bicycle shown in FIG. 2. For example, the communications module 1303 is configured to support the first terminal in performing processes such as process 501 and process 504 in FIG. 4, and processes 501a and 510a in FIG. 5a-1. The first terminal may further include a storage module 1301, configured to store program code and data of the first terminal.

The processing module 1302 may be a processor or a controller, such as a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or a combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 1303 may be a transceiver, a transceiver circuit, a communications interface, or the like. The storage module 1301 may be a memory.

Figure 20B:
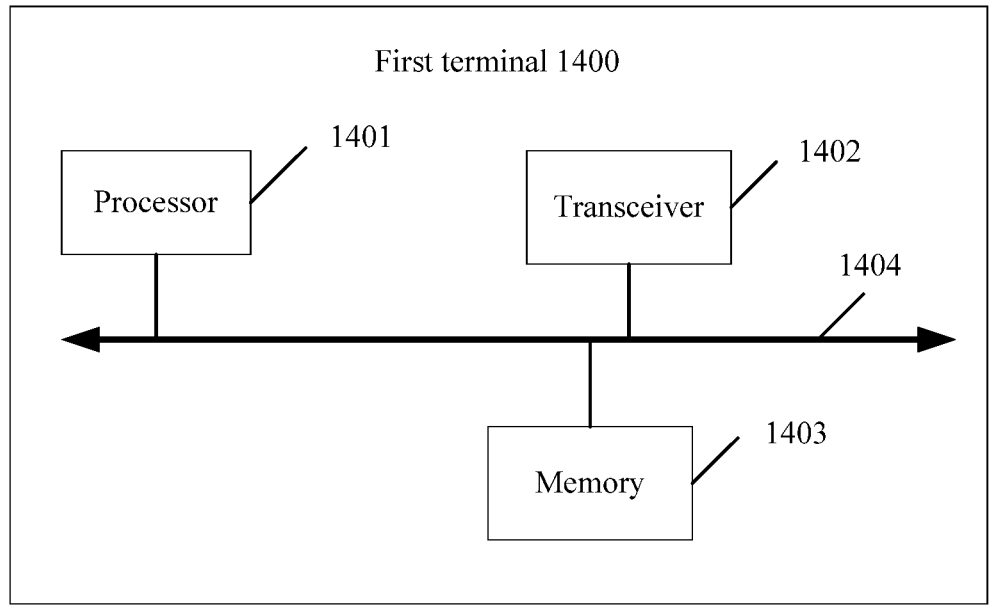
FIG. 20b is still another schematic structural diagram of a first terminal according to an embodiment of this application.

When the processing module 1302 is a processor, the communications module 1303 is a transceiver, and the storage module 1301 is a memory, the first terminal in this embodiment of this application may be a first terminal shown in FIG. 20b.

As shown in FIG. 20b, the first terminal 1400 includes a processor 1401, a transceiver 1402, a memory 1403, and a bus 1404. The transceiver 1402, the processor 1401, and the memory 1403 are interconnected by using the bus 1404. The bus 1404 may be a Peripheral Component Interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 20b, but this does not mean that there is only one bus or only one type of bus.

Figure 21:
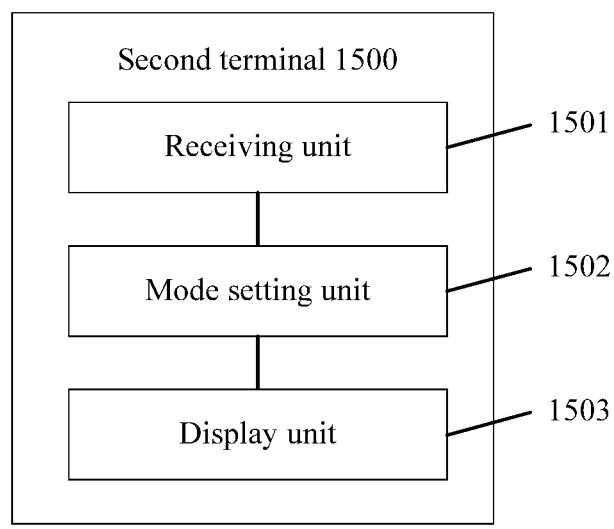
FIG. 21 is a schematic structural diagram of a second terminal according to an embodiment of this application.

FIG. 21 is a possible schematic structural diagram of the second terminal in the foregoing embodiments. A second terminal 1500 includes a receiving unit 1501 and a mode setting unit 1502. The receiving unit 1501 is configured to support the second terminal in receiving a mode setting instruction sent by a first terminal, where the mode setting instruction is used to instruct the second terminal to enter a riding mode. The mode setting unit 1502 is configured to support the second terminal in entering the riding mode according to the mode setting instruction received by the receiving unit 1501.

Optionally, the receiving unit 1502 is further configured to receive a notification message sent by the first terminal, where the notification message is used to notify the second terminal that riding ends. The mode setting unit 1502 is further configured to exit the riding mode according to the notification message received by the receiving unit.

Optionally, the second terminal further includes a display unit 1503, configured to support the second terminal in loading a display interface in the riding mode after the mode setting unit 1502 sets the second terminal to the riding mode, where the display interface is used at least to display user data obtained by the second terminal. All related content of the steps in the foregoing method embodiments may be cited in function descriptions of corresponding function modules. Details are not described herein again.

Figure 21A:
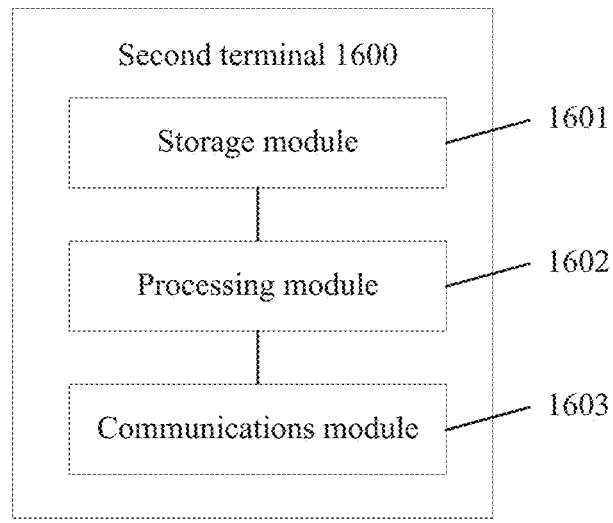
FIG. 21a is another schematic structural diagram of a second terminal according to an embodiment of this application.

When an integrated unit is used, FIG. 21a is a possible schematic structural diagram of the second terminal in the foregoing embodiments. A second terminal 1600 includes a processing module 1602 and a communications module 1603. The processing module 1602 is configured to control and manage an action of the second terminal. For example, the processing module 1602 is configured to support the second terminal in performing processes 503 and 506 in FIG. 4, and/or is configured to perform another process of the technology described in this specification. The communications module 1603 is configured to support communication between a base station and another network entity, for example, communication between the second terminal 1600 and the first terminal, the bicycle, and the server corresponding to the bicycle shown in FIG. 2. For example, the communications module 1603 is configured to support the second terminal in performing processes 501, 504, and 506 in FIG. 4. The second terminal may further include a storage module 1601, configured to store program code and data of the second terminal.

The processing module 1602 may be a processor or a controller, such as a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or a combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 1603 may be a transceiver, a transceiver circuit, a communications interface, or the like. The storage module 1601 may be a memory.

Figure 21B:
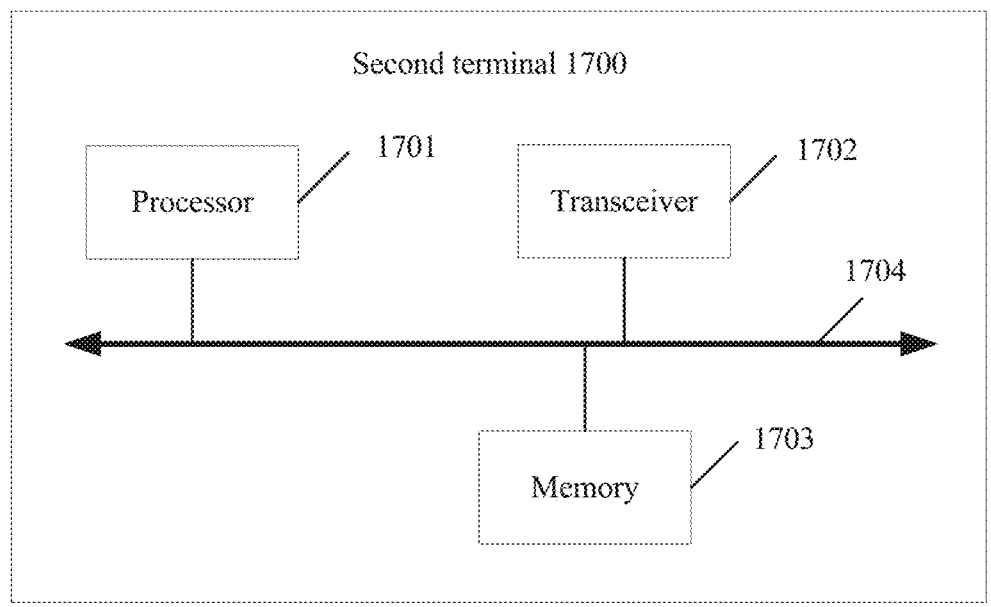
FIG. 21b is still another schematic structural diagram of a second terminal according to an embodiment of this application.

When the processing module 1602 is a processor, the communications module 1603 is a transceiver, and the storage module 1601 is a memory, the second terminal in this embodiment of this application may be a second terminal shown in FIG. 21b.

As shown in FIG. 21b, the second terminal 1700 includes a processor 1701, a transceiver 1702, a memory 1703, and a bus 1704. The transceiver 1702, the processor 1701, and the memory 1703 are interconnected by using the bus 1704. The bus 1704 may be a Peripheral Component Interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 21b, but this does not mean that there is only one bus or only one type of bus.

Figure 22:
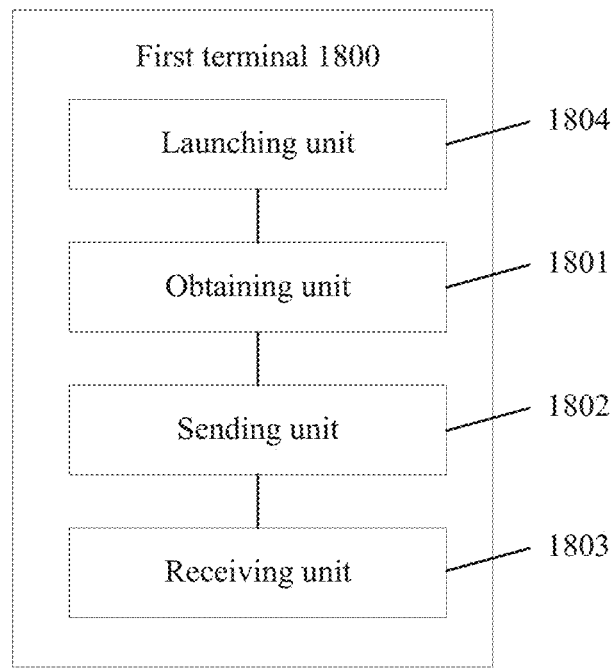
FIG. 22 is a schematic structural diagram of a terminal according to an embodiment of this application.

An embodiment of this application provides a terminal. As shown in FIG. 22, a first terminal 1800 includes: an obtaining unit 1801, configured to perform NFC communication with a bicycle to obtain an identity of the bicycle; a sending unit 1802, configured to send an unlocking request to a server corresponding to the bicycle, where the unlocking request carries the identity of the bicycle obtained by the obtaining unit; and a receiving unit 1803, configured to receive a first notification message sent by the server corresponding to the bicycle, where the first notification message is used to notify the terminal that the bicycle is unlocked. Optionally, the terminal further includes a launching unit 1804, configured to: determine, based on the identity of the bicycle obtained by the obtaining unit, an identity of an application corresponding to the bicycle; and launch the application. The sending unit 1802 is further configured to: determine, based on the identity of the bicycle obtained by the obtaining unit 1801, a target service interface used to communicate with the server corresponding to the bicycle; and send the unlocking request to the server corresponding to the bicycle through the target service interface. The receiving unit 1803 is further configured to receive, through the target service interface, the first notification message replied by the server corresponding to the bicycle.

In a possible design, the sending unit 1802 is further configured to send a mode setting instruction to a second terminal, so that the second terminal enters a riding mode according to the mode setting instruction. The receiving unit 1803 is further configured to receive a second notification message sent by the server of the bicycle, where the second notification message is used to notify the first terminal that riding ends. The sending unit 1802 is further configured to send a third notification message to the second terminal, where the third notification message is used to instruct the second terminal to exit the riding mode.

Figure 22A:
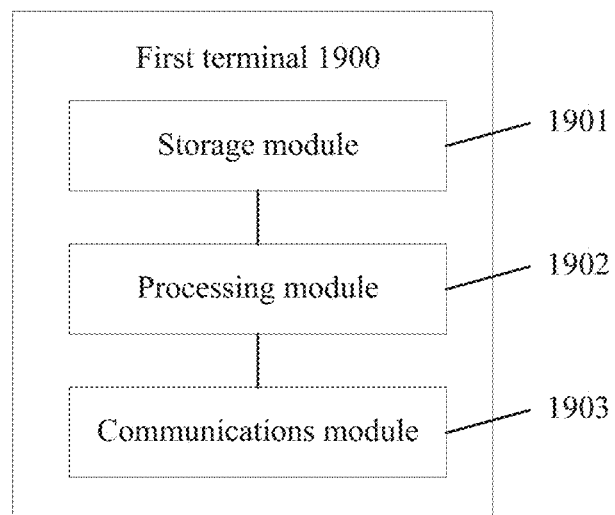
FIG. 22a is another schematic structural diagram of a terminal according to an embodiment of this application.

When an integrated unit is used, FIG. 22a is a possible schematic structural diagram of the terminal in the foregoing embodiments. A first terminal 1900 includes a processing module 1902 and a communications module 1903. The processing module 1902 is configured to control and manage an action of a first terminal. For example, the processing module 1902 is configured to support the terminal in performing processes 507*a* to 509*a* in FIG. 5*a*-1, and/or is configured to perform another process of the technology described in this specification. The communications module 1903 is configured to support communication between the first terminal and another network entity, for example, communication between the first terminal 1900 and a bicycle and a server corresponding to the bicycle. The terminal may further include a storage module 1901, configured to store program code and data of the terminal.

The processing module 1902 may be a processor or a controller, such as a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or a combination thereof. The processor or the controller may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 1903 may be a transceiver, a transceiver circuit, a communications interface, or the like. The storage module 1901 may be a memory.

Figure 22B:
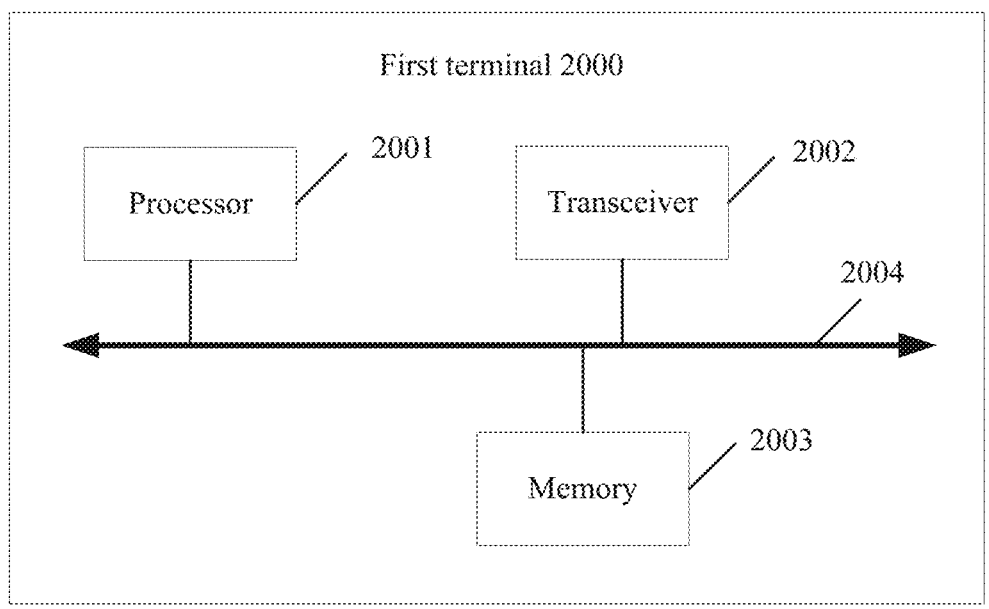
FIG. 22b is still another schematic structural diagram of a terminal according to an embodiment of this application.

When the processing module 1902 is a processor, the communications module 1903 is a transceiver, and the storage module 1901 is a memory, the first terminal 1900 in this embodiment of this application may be a terminal shown in FIG. 22*b*.

As shown in FIG. 22*b*, a terminal is provided and includes: a transceiver 2002, a processor 2001, a memory 2003, and a bus 2004. The transceiver 2002, the processor 2001, and the memory 2003 are interconnected by using the bus 2004.

The memory 2003 is configured to store computer executable code. The transceiver 2002 is configured to: perform NFC communication with a bicycle to obtain an identity of the bicycle; send an unlocking request to a server corresponding to the bicycle, where the unlocking request carries the identity of die bicycle; and receive a first notification message sent by the server corresponding to the bicycle, where the first notification message is used to notify the terminal that the bicycle is unlocked.

Optionally, the processor 2001 is configured to: determine, based on the identity of the bicycle, an identity of an application corresponding to the bicycle; and launch the application.

Optionally, the processor 2001 is further configured to determine, based on the identity of the bicycle, a target service interface used to communicate with the server corresponding to the bicycle. The transceiver 2002 is configured to: send the unlocking request to the server corresponding to the bicycle through the target service interface; and receive, through the target service interface, the first notification message replied by the server corresponding to the bicycle.

Optionally, the transceiver 2002 is further configured to: send a mode setting instruction to a second terminal, so that the second terminal enters a riding mode according to the mode setting instruction; receive a second notification message sent by the server of the bicycle, where the second notification message is used to notify the first terminal that riding ends; and send a third notification message to the second terminal, where the third notification message is used to instruct the second terminal to exit the riding mode.

Method or algorithm steps described with reference to the content disclosed in this application may be implemented by hardware, or may be implemented by a processor by executing a software instruction. The software instruction may include a corresponding software module. The software module may be stored in a random access memory (random access memory, RAM), a flash memory, a read-only memory (read-only memory, ROM), an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may be a component of the processor. The processor and the storage medium may be located in the ASIC.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made within the spirit and principle of this application shall fall within the protection scope of this application.

What is claimed is:

1. A data transmission method implemented by a first terminal, wherein the data transmission method comprises:
sending an unlocking request to a server corresponding to a target bicycle, wherein the unlocking request carries an identity of the target bicycle and an identity of the first terminal;
receiving, from the server, a first notification message that notifies the first terminal that the target bicycle is in an unlocked state; and
automatically sending a mode setting instruction to a wearable device in response to receiving the first notification message, wherein the mode setting instruction instructs the wearable device to start a program for collecting data of a user of the first terminal during use of the target bicycle and is different than the first notification message.

2. The data transmission method of claim 1, wherein before receiving the first notification message, the data transmission method further comprises automatically obtaining the identity of the target bicycle.

3. The data transmission method of claim 2, wherein before sending the unlocking request, the data transmission method further comprises: determining, based on the identity of the target bicycle, an identity of an application corresponding to the target bicycle; and launching, according to the identity of the application, the application corresponding to the target bicycle.

4. The data transmission method of claim 2, wherein before sending the unlocking request, the data transmission method further comprises determining, based on the identity of the target bicycle, a target service interface used to communicate with the server corresponding to the target bicycle, wherein sending the unlocking request comprises sending the unlocking request to the server corresponding to the target bicycle through the target service interface, and wherein receiving the first notification message comprises receiving the first notification message from the server corresponding to the target bicycle through the target service interface.

5. The data transmission method of claim 2, wherein automatically obtaining the identity of the target bicycle comprises performing near field communication (NFC) with the target bicycle to automatically obtain the identity of the target bicycle when a distance between the first terminal and the target bicycle is less than or equal to a preset distance, and wherein the preset distance is a distance within which NFC communication is to be performed and that is specified in an NFC protocol.

6. The data transmission method of claim 1, wherein after sending the mode setting instruction to the wearable device, the data transmission method further comprises:
receiving, from the server, a locked state notification message that notifies the first terminal that the target bicycle is locked; and
automatically sending a third notification message to the wearable device in response to receiving the locked state notification message from the server, wherein the third notification message notifies the wearable device that riding ends.

7. The data transmission method of claim 2, wherein automatically obtaining the identity of the target bicycle comprises performing near field communication (NFC) with the target bicycle to automatically obtain the identity of the target bicycle when a distance between the first terminal and the target bicycle is equal to a preset distance, and wherein the preset distance is a distance within which NFC communication is to be performed and is specified in an NFC protocol.

8. A system, comprising:
a first terminal configured to:
send an unlocking request to a server corresponding to a target bicycle, wherein the unlocking request carries an identity of the target bicycle and an identity of the first terminal;
receive, from the server, a first notification message that notifies the first terminal that the target bicycle is in an unlocked state; and
automatically send a mode setting instruction to a wearable device in response to receiving the first notification message from the server, wherein the mode setting instruction instructs the wearable device to start a program for collecting data of a user of the first terminal during use of the target bicycle and is different than the first notification message; and a wearable device communicatively coupled to the first terminal and configured to:
receive the mode setting instruction from the first terminal; and
start the program.

9. The system of claim 8, wherein after starting the program, the wearable device is further configured to:
obtain the data; and
load a display interface to display the data.

10. The system of claim 8, wherein after starting the program, the wearable device is further configured to:
receive a second notification message from the first terminal, wherein the second notification message notifies the second terminal that riding ends; and
exit a riding mode according to the second notification message.

11. A first terminal, comprising:
a transceiver;
a processor coupled to the transceiver; and
memory coupled to the processor and configured to store a computer executable code that, when executed by the processor, causes the first terminal to be configured to:
send, using the transceiver, an unlocking request to a server corresponding to a target bicycle, wherein the unlocking request carries an identity of the target bicycle and an identity of the first terminal;
receive, using the transceiver and from a server, a first notification message that notifies the first terminal that a target bicycle is in an unlocked state; and
automatically send, using the transceiver, a mode setting instruction to a wearable device in response to receiving the first notification message from the server, wherein the mode setting instruction instructs the wearable device to start a program for collecting data of a user of the first terminal during use of the target bicycle and is different than the first notification message.

12. The first terminal of claim 11, wherein the computer executable code further causes the first terminal to be configured to automatically obtain the identity of the target bicycle.

13. The first terminal of claim 12, wherein the computer executable code further causes the first terminal to be configured to: determine, based on the identity of the target bicycle, an identity of an application corresponding to the target bicycle; and launch, according to the identity of the application, the application corresponding to the target bicycle.

14. The first terminal of claim 12, wherein the computer executable code further causes the first terminal to be configured to: determine, based on the identity of the target bicycle, a target service interface used to communicate with the server corresponding to the target bicycle; send, using the transceiver, the unlocking request to the server corresponding to the target bicycle through the target service interface; and receive, using the transceiver through the target service interface, the first notification message from the server corresponding to the target bicycle.

15. The first terminal of claim 12, wherein the computer executable code further causes the first terminal to be configured to perform near field communication (NFC) with the target bicycle to automatically obtain the identity of the target bicycle when a distance between the first terminal and the target bicycle is less than or equal to a preset distance, and wherein the preset distance is a distance within which NFC communication is to be performed and is specified in an NFC protocol.

16. The first terminal of claim 11, wherein the computer executable code further causes the first terminal to be configured to:
- receive, using the transceiver, a second notification message that notifies the first terminal that the target bicycle is in a non-riding state; and
- send, using the transceiver, a third notification message to the wearable device according to the second notification message, wherein the third notification message notifies the wearable device that riding ends.

17. The first terminal of claim 12, wherein the computer executable code further causes the first terminal to be configured to perform near field communication (NFC) with the target bicycle to automatically obtain the identity of the target bicycle when a distance between the first terminal and the target bicycle is equal to a preset distance, and wherein the preset distance is a distance within which NFC communication is to be performed and specified in an NFC protocol.

18. The first terminal of claim 11, wherein the first terminal is a personal electronic communications device.

19. The first terminal of claim 11, wherein the data is physiological data of the user.

\* \* \* \* \*

UNITED STATES PATENT AND TRADEMARK OFFICE
CERTIFICATE OF CORRECTION

PATENT NO. : 11,153,735 B2  
APPLICATION NO. : 16/491955  
DATED : October 19, 2021  
INVENTOR(S) : Wei Zhang and Yue Ouyang Page 1 of 1

It is certified that error appears in the above-identified patent and that said Letters Patent is hereby corrected as shown below:

On the Title Page

Item (57) Abstract, Line 8: "riding model." should read "riding mode."

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*